United States Patent [19]

Libeer et al.

[11] 3,931,156

[45] Jan. 6, 1976

[54] METHINE DYES

[75] Inventors: Marcel Jan Libeer; Henri Depoorter; Gerrit Godfried Van Mierlo, all of Mortsel-Antwerp; Raymond Gerard Lemahieu, Wervik-West-Flanders, all of Belgium

[73] Assignee: Agfa-Gevaert N.V., Mortsel, Belgium

[22] Filed: Apr. 30, 1973

[21] Appl. No.: 355,770

Related U.S. Application Data

[60] Continuation of Ser. Nos. 547,140, Feb. 2, 1966, abandoned, and Ser. No. , , Division of Ser. No. 197,925, May 28, 1962, Pat. No. 3,243,298.

[30] Foreign Application Priority Data

May 29, 1961 United Kingdom .............. 19269/61

[52] U.S. Cl. ................ 260/240.4; 96/123; 96/126; 96/127; 96/131; 96/139; 260/240 E; 260/240.1; 260/240.6; 260/240.65; 260/240.7; 260/240.9; 260/288 R; 260/293.59; 260/309

[51] Int. Cl. ...................... C09b 23/10; C09b 23/14

[58] Field of Search......... 260/240.1, 240.6, 240.65, 260/240.7, 240.9, 240.4

[56] References Cited

UNITED STATES PATENTS

| | | | |
|---|---|---|---|
| 3,243,298 | 3/1966 | Libeer et al. | 96/105 |
| 3,337,540 | 8/1967 | Libeer et al. | 260/240 |
| 3,505,319 | 4/1970 | Oliver | 211/60 |

OTHER PUBLICATIONS

Nair et al, J. Am. Chem. Soc. Vol. 83, pp. 3518 to 3521 (1961).

Chemical Abstracts, Vol. 58, cols. 14164 to 14169 (1963) (Abst. of Belgian Patent 618,235 granted 9-1-7-62).

*Primary Examiner*—John D. Randolph
*Attorney, Agent, or Firm*—A. W. Breiner

[57] ABSTRACT

The invention relates to a new class of pyrrolobenzimidazole, benzimidazoloisoquinoline and dipyrodinobenzodiimidazole in cyanine sensitizing dyes derived therefrom and their use in silver halide emulsions, and to methods for preparation of such new dyes.

7 Claims, No Drawings

METHINE DYES

This is a continuation of U.S. Ser. No. 547,140 filed Feb. 2, 1966, now abandoned. The invention is a divisional of the invention claimed and described in application Ser. No. 197,925 filed May 28, 1962, now U.S. Pat. No. 3,243,298.

This invention relates to new methine dyes, to processes for making them and to photographic emulsions containing them.

According to one feature of the present invention there are provided methine dyes containing at least one heterocyclic nucleus derived from 1,2 condensed benzimidazole compounds to one of the following general formulae

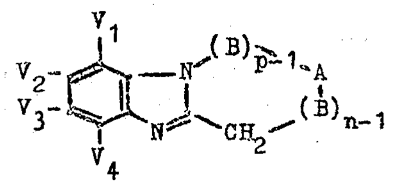

and

I

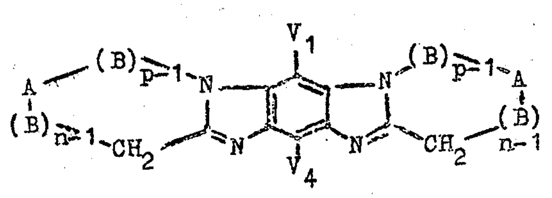

II wherein:

$V_1$, $V_2$, $V_3$ and $V_4$ each represent (the same or different) a hydrogen atom, an alkyl radical, an aryl radical, an aralkyl radical, a substituted alkyl radical e.g. a trifluoromethyl radical, a substituted aralkyl radical, a substituted aryl radical, a halogen atom, a hydroxyl group, an alkoxy group, an acyloxy group, a nitrile group, a carboxyl group, a carbalkoxy group, a carbamyl group, a substituted carbamyl group, a nitrogen containing group such as an amino group, an acylamino group, a sulphonylamino group, a hydrazino group, an alkyl sulphonyl group, a sulphonic acid group, a sulphonic acid ester group, a sulphonamide group, an acyl group, an arylazo group or the atoms necessary to complete an adjacent benzene nucleus, $(B)_{n-1}$ represents (in the case $n>1$) one or more equally or differently substituted and/or not substituted methylene groups, $(B)_{p-1}$ represents (in the case $p>1$) one or more equally or differently substituted and/or not substituted methylene groups, $p$ and $n$ each represents a positive integer of at least 1 and $n+p \leq 5$, and A represents a methylene group, a substituted methylene group, an hetero atom such as oxygen and sulfur, a group such as -N-Y wherein Y represents an alkyl radical, an aralkyl radical, an aryl radical, a carbalkoxy radical, or a

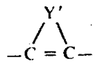

group wherein Y′ represents the atoms necessary to close an aromatic nucleus, a substituted aromatic nucleus, a heterocyclic nucleus or a substituted heterocyclic nucleus.

More particularly we provide symmetrical and asymmetrical methine dye salts represented by the following general formulae:

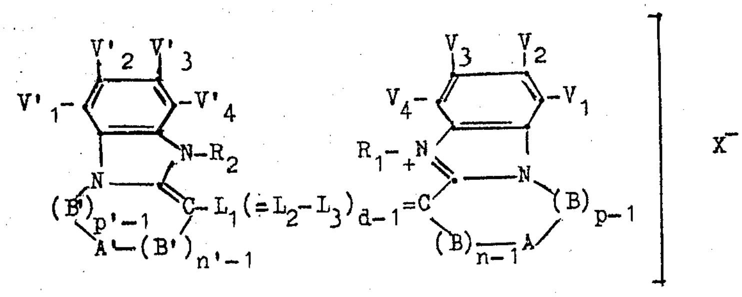

III

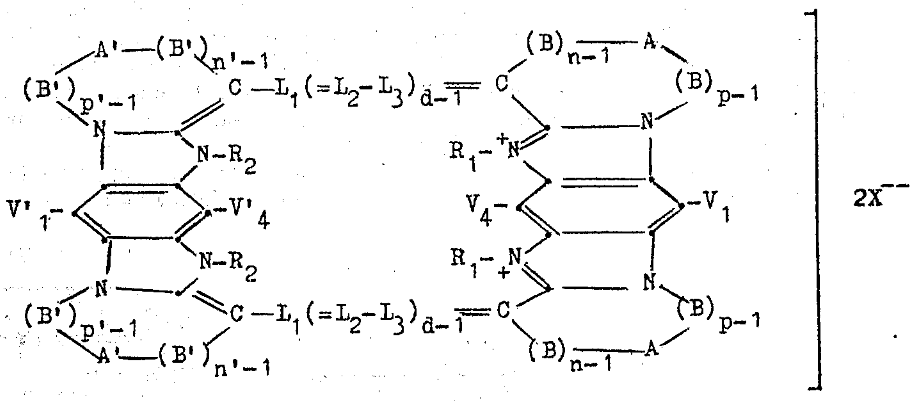

IV

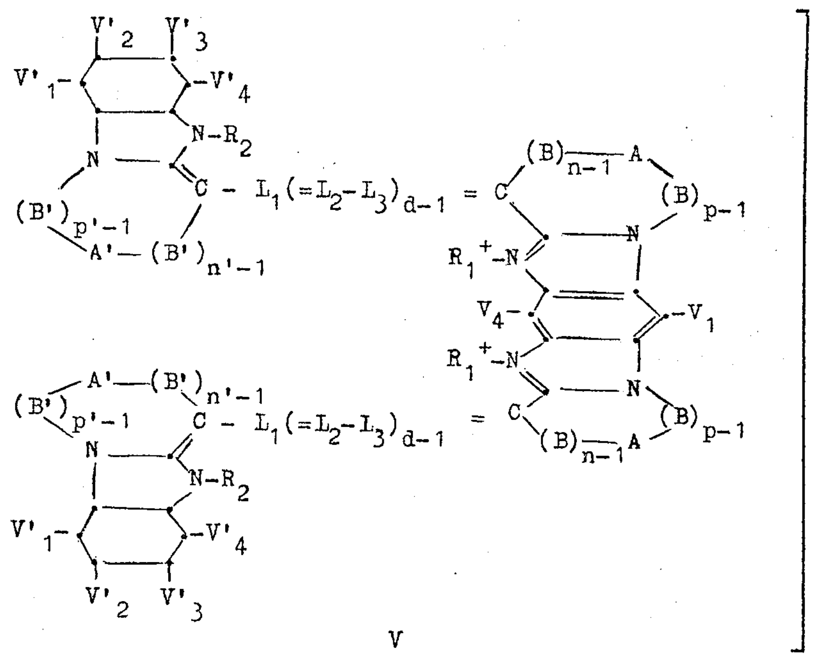

$2X^{--}$

V wherein:

$V_1$, $V_2$, $V_3$, $V_4$, A, $(B)_{n-1}$, $(B)_{p-1}$ have the same values as in the general formulae I and II described above, $V'_1$, $V'_2$, $V'_3$, $V'_4$, A', $(B')_{n-1}$, $(B')_{p-1}$ are defined as $V_1$, $V_2$, $V_3$, $V_4$, A, $(B)_{n-1}$, $(B)_{p-1}$ but may have respectively either or not the same value as $V_1$, $V_2$, $V_3$, $V_4$, A, $(B)_{n-1}$, $(B)_{p-1}$, in the same molecule.

$R_1$ and $R_2$ each represent respectively a substituent of the type contained in cyanine dyes on the cyanine nitrogen atom, e.g., an alkyl group such as a methyl group, an ethyl group, a propyl group, an isopropyl group, a butyl group, an isobutyl group, a substituted alkyl group such as an allyl group (vinyl methyl), a β-hydroxyethyl group, a β-acetoxyethyl group, an alkylene sulphonic acid group as described in the French Pat. Specification No. 1,223,289 and the German Pat. Specification No. 929,080 such as a sulphoethyl group, a sulphopropyl group, a sulphobutyl group, an alkylene sulphate group as described in the French Pat. Specification No. 1,149,769 such as a propylsulphate group or a butylsulphate group, a benzyl group (phenyl methyl), a carboxymethyl group, a carboxymethyl group as described in the German Pat. Specification No. 704,141, a carboxybenzyl group, a sulphobenzyl group, the group $-A-CO-O-B-SO_2-OH$ wherein A and B have the same significance as set forth in Belgian Pat. Specification No. 568,759 such as a sulphocarbomethoxy methyl group, an ω-sulphocarbopropoxy methyl group, an ω-sulphocarbobutoxy methyl group, a p-(ω-sulphocarbobutoxy)-benzyl group, the group $-A-W-NH-V-B$ wherein A, W, V and B have the same significance as set forth in Belgian Pat. Specification No. 569,130 such as a N-(methylsulphonyl)-carbamyl methyl group, γ-(acetyl-sulphonamido)-propyl, a θ-(acetylsulphonamido)-butyl group, the group $$-A-P(=O)(OH)_2$$

wherein A has the same significance as described in the Belgian Patent Specification No. 568,840, an aryl group such as a phenyl group, a carboxyphenyl group, or a cycloalkyl group such as a cyclohexyl group;

$L_1$, $L_2$ and $L_3$ each represents a methine group (e.g. $=CH-$, $=C.CH_3-$, $=C.C_2H_5-$, $=C.C_3H_7-$, $=C.CH_2C_6H_5-$, $=C.C_6H_5-$, $=C.O-alkyl-$, $=C.S.-alkyl-$, $=C.Se\text{-}alkyl$, $=C.O\text{-}acyl\text{-}$, $=C.COO-C_2H_5-$, $=C.NHR'-$, $$=\underset{|}{C}.NHCOR, \quad =\underset{|}{C}.CONHR$$

(wherein R and R' are a hydrogen atom, an alkyl group or an aryl group), $=C.(CH=)_rD-$ (wherein D represents a heterocyclic radical, and r represents zero or an integer from 1 to 6), or a methine group which forms part of a heterocyclic or isocyclic ring such as a cyclopentadiene ring,

*d* represents an integer from 1 to 3, and $X^-$ represents an anion such as a chloride ion, a bromide ion, an iodide ion, a perchlorate ion, a benzene sulphonate ion, a p-tolusulphonate ion, a methylsulphate ion, an ethylsulphate ion, and a propylsulphate ion.

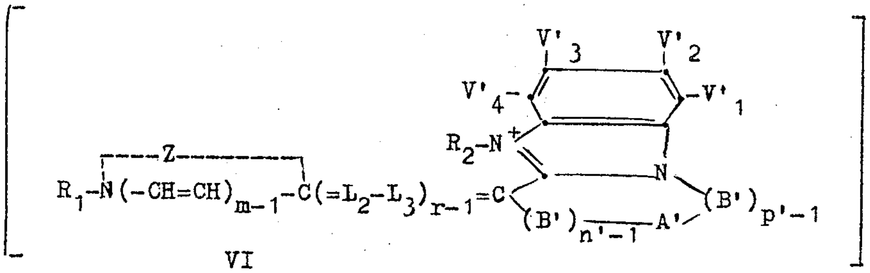

$X^-$

VI

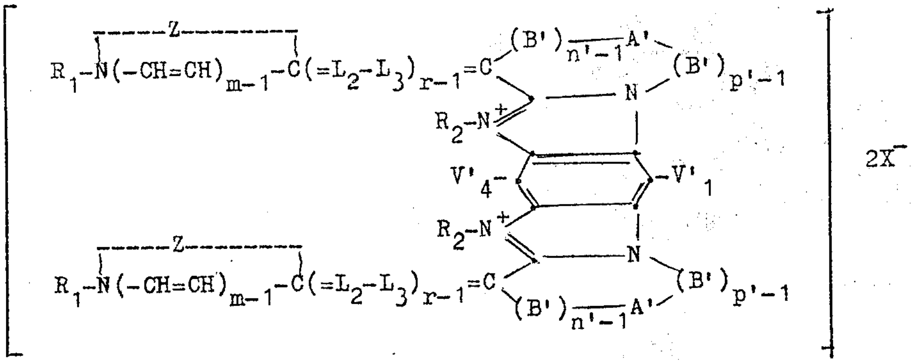

VII wherein:

$V'_1$, $V'_2$, $V'_3$, $V'_4$, $L_2$, $L_3$, $A'$, $(B')_{n'-1}$, $(B')_{p'-1}$, $R_1$, $R_2$ and X have the same values as described in formulae III, IV and V,

*r* represents an integer from 1 to 4,

*m* represents an integer from 1 to 2,

Z represents the non-metallic atoms necessary to complete a heterocyclic nucleus containing 5 or 6 atoms in the heterocyclic ring e.g. a nucleus of the thiazole series (e.g. thiazole, 4-methylthiazole, 4-phenylthiazole, 5-methylthiazole, 5-phenylthiazole, 4,5-dimethylthiazole, 4,5-diphenylthiazole, 4-(2-thienyl)-thiazole), those of the benzothiazole series (e.g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, 4,5,6,7-tetrahydrobenzothiazole, 5,6-dimethoxybenzothiazole, 5,6-dioxymethylenebenzothiazole, 5-hydroxybenzothiazole, 6-hydroxybenzothiazole, 5,6-dimethylbenzothiazole), those of the naphthothiazole series (e.g. naphtho[2,1-d] thiazole, naphtho[1,2-d]thiazole, 5-methoxynaphtho[1,2-d]thiazole, 5-ethoxynaphtho[1,2-d]thiazole, 8-methoxynaphtho[2,1-d]thiazole, 7-methoxynaphtho[2,1-d]thiazole), those of the thionaphtheno[7',6',d]-thiazole series (e.g. 4'-methoxythionaphtheno[7',6',d]thiazole), those of the oxazole series (e.g. 4-methyloxazole, 5-methyloxazole, 4-phenyloxazole, 4,5-diphenyloxazole, 4-ethyloxazole, 4,5-dimethyloxazole, 5-phenyloxazole), those of the benzoxazole series (e.g., benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 6-methoxybenzoxazole, 5-hydroxybenzoxazole, 6-hydroxybenzoxazole), those of the naphthoxazole series (e.g., naphtho[2,1-d]oxazole, naphtho[1,2-d]oxazole), those of the selenazole series (e.g., 4-methylselenazole, 4-phenylselenazole), those of the benzoselenazole series (e.g., benzoselenazole, 5-chlorobenzoselenazole, 5 -methoxybenzoselenazole, 5-hydroxybenzoselenazole, 4,5,6,7-tetrahydrobenzoselenazole), those of the naphthoselenazole series (e.g., naphtho[2,1-d]selenazole, naphtho[1,2-d]selenazole), those of the thiazoline series (e.g., thiazoline, 4-methylthiazoline, 4-hydroxymethyl-4-methylthiazoline, 4,4-bis-hydroxymethylthiazoline, 4-acetoxymethyl-4-methylthiazoline, 4,4-bis-acetoxymethylthiazoline), those of the thiazolidine series (e.g. 2-benzothiazolylidene-4-thiazolidone), those of the oxazoline series (e.g. oxazoline, 4-hydroxymethyl-4-methyloxazoline, 4,4-bis-hydroxymethyloxazoline, 4-acetoxymethyl-4-methyloxazoline, 4,4-bis-acetoxymethyloxazoline), those of the oxazolidine series, those of the selenazoline series (e.g. selenazoline), those of the 2-quinoline series (e.g. the quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline etc.), those of the 4-quinoline series (e.g. quinoline, 6-methoxyquinoline, 7-methylquinoline, 8-methylquinoline), those of the 1-isoquinoline series (e.g. isoquinoline, 3,4-dihydroisoquinoline), those of the 3-isoquinoline series (e.g. isoquinoline) those of the 3,3-dialkylindolenine series (e.g. 3,3-dimethylindolenine, 3,3,5-trimethylindolenine, 3,3,7-trimethylindolenine), those of the pyridine series (e.g. pyridine, 5-methylpyridine), or those of the benzimidazole series (e.g. 1-ethylbenzimidazole, 1-phenylbenzimidazole, 1-ethyl-5,6-dichlorobenzimidazole, 1-hydroxyethyl-5,6-dichlorobenzimidazole, 1-ethyl-5-chlorobenzimidazole, 1-ethyl-5,6-dibromobenzimidazole, 1-ethyl-5-chloro- 6-aminobenzimidazole, 1-ethyl-5-chloro-6-bromobenzimidazole, 1-ethyl-5-phenylbenzimidazole, 1-ethyl-5-fluorobenzimidazole, 1-ethyl-5-cyanobenzimidazole, 1-(β-acetoxyethyl)-5-cyanobenzimidazole, 1-ethyl-5-chloro-6-cyano benzimidazole, 1-ethyl-5-fluoro-6-cyano benzimidazole, 1-ethyl-5-acetyl-benzimidazole, 1-ethyl-5-chloro-6-fluorobenzimidazole, 1-ethyl-5-carboxybenzimidazole, 1-ethyl-7-carboxybenzimidazole, 1-ethyl-5-carbethoxybenzimidazole, 1-ethyl-7-carbethoxybenzimidazole, 1-ethyl-5-sulphonamidobenzimidazole, 1-ethyl-5-N-ethylsulphonamidobenzimidazole).

More particularly we provide also new methine dye salts which differ from the methine dye salts according to the general formulae III, IV, V, VI and VII, therein that the radical, which is bound to the quaternated nitrogen atom, carries a negative charge and that it forms a betaine-like structure with the quaternated nitrogen atom. The eventual obtaining of a betaine-like structure depends on the nature of the used quaternating agent. These methine dye salts according to this invention, having a betaine-like structure are represented by the following general formulae:

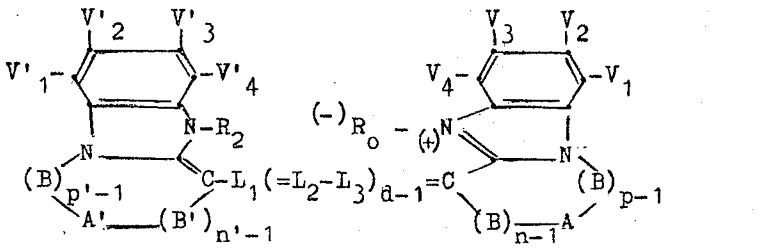
III'
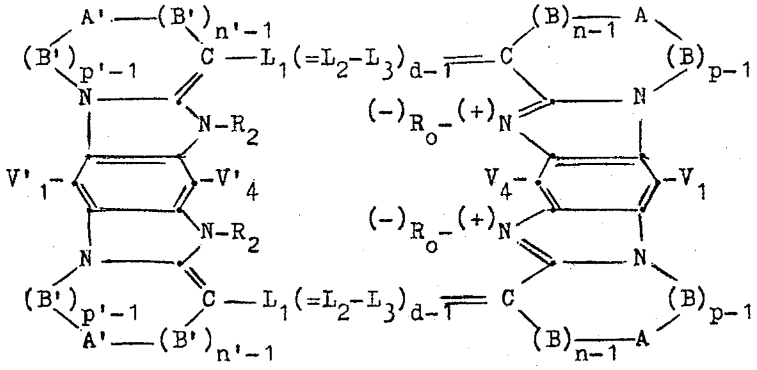
IV'
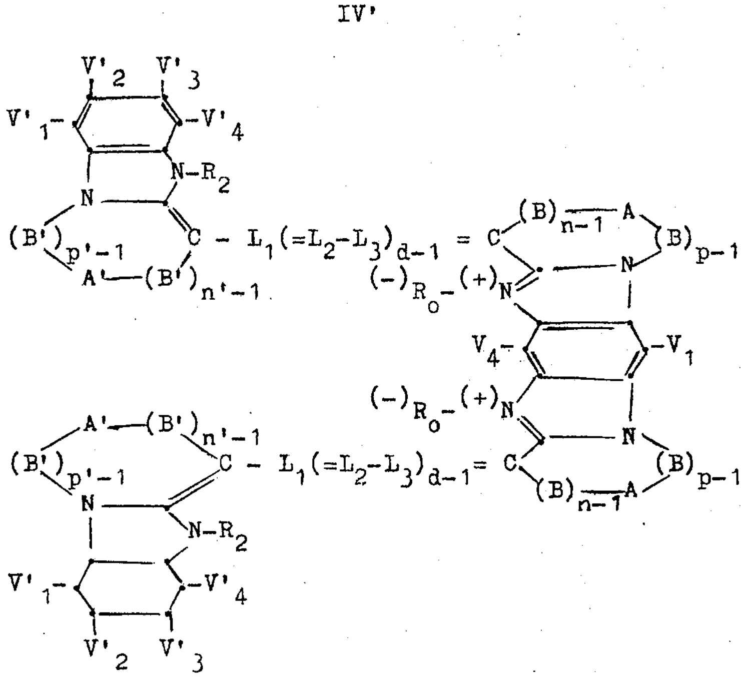
V'
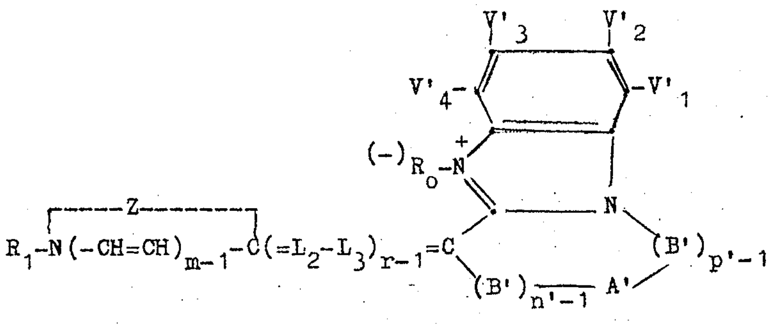
VI'

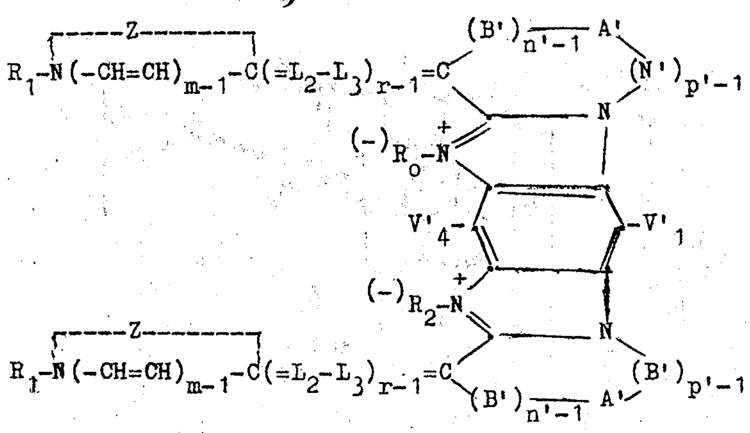

VII' wherein:

$R_o$ represents an alkylene

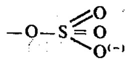

radical as described in the French Pat. Specification No. 1,149,769, an alkylene

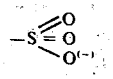

radical as described in the French Pat. Specification 1,223,289, an alkylene

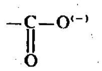

radical as described in the U.S. Pat. Specification No. 2,238,231, an alkylene

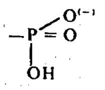

radical as described in the Belgian Pat. Specification No. 568,840, a $-A-CO-O-B-SO_2O^-$ radical as described in the Belgian Pat. Specification 568,759, wherein each of A and B represents an alkylene radical, a -A-W-$N^{(-)}$-V-B radical wherein each of V and W represents a $-SO_2-$ radical, a

radical, or a single bond, but at least one of them a $-SO_2-$ radical, A represents an alkylene radical, and B represents an alkyl group, an amino group, or a substituted amino group, as described in the Belgian Pat. Specification No. 569,130, and $V_1$, $V_2$, $V_3$, $V_4$, $V'_1$, $V'_2$, $V'_3$, $V'_4$, A, A', $(B)_{n-1}$, $(B)_{p-1}$, $(B')_{n'-1}$, $(B')_{p'-1}$, $L_1$, $L_2$, $L_3$, $R_1$, $R_2$, *d*, *n*, *n'*, *m* and *r* have the same significance as described above.

Further we provide new merocyanine dyes represented by the following general formulae:

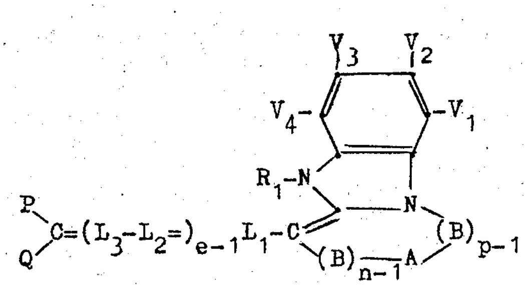

VIII

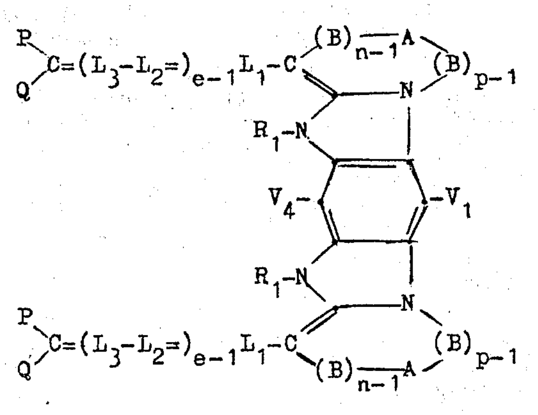

IX wherein:

$V_1$, $V_2$, $V_3$, $V_4$, A, $(B)_{n-1}$, $(B)_{p-1}$ have the same value as in the general formulae I and II, $R_1$, $L_1$, $L_2$ and $L_3$ have the same value as in formula III, e represents an integer from 1 to 2, and P and Q each represents an organic group, at least one of these groups being an electronegative group such as a cyano group or a $-COOR_3$ group, wherein $R_3$ represents a hydrogen atom or an alkyl radical such as a methyl group or an ethyl group, e.g. an alkyl radical of the formula $C_wH_{2w+1}$ wherein w represents an integer from 1 to 4; the radical

, may also represent a nucleus with negative character such as those of the pyrazolone series (e.g. 3-methyl-1-phenyl-5-pyrazolone, 1-phenyl-5-pyrazolone, 1-(2-benzothiazolyl)-3-methyl-5-pyrazolone, etc.), those of the isoxazolone series (e.g. 3-phenyl-5(4H)-isoxazolone, 3-methyl-5(4H)-isoxazolone etc.), those of the oxindole series (e.g. 1-alkyloxindoles etc.), those of the 2,4,6-triketohexahydropyrimidine series (e.g. barbituric acid or 2-thiobarbituric acid as well as their 1-alkyl (e.g. 1-methyl, 1-ethyl, 1-n-propyl, 1-n-heptyl, etc.), or 1,3-dialkyl (e.g. 1,3-dimethyl, 1,3-diethyl, 1,3-di-n-propyl, 1,3-di-isopropyl, 1,3-dicyclohexyl, 1,3-di(β-methoxyethyl), or 1,3-diaryl (e.g. 1,3-diphenyl, 1,3-di(p-chlorophenyl), 1,3-di(p-ethoxycarbonylphenyl), or 1-aryl (e.g. 1-phenyl, 1-p-chlorophenyl, 1-p-ethoxycarbonylphenyl), or 1-alkyl-3-aryl (e.g. 1-ethyl-3-phenyl, 1-n-heptyl-3-phenyl) derivatives), those of the 2-thio-2,4-thiazolidinedione (rhodanine) series (e.g. 3-ethyl-2-thio-2,4-thiazolidinedione, 3-allyl-2-thio-2,4-thiazolidinedione, 3-phenyl-2-thio-2,4-thiazolidinedione), those of the 2-oxo(3H)-imidazo[1,2-a] pyridine series, those of the 5,7-dioxo-6,7-dihydro-5-thiazolo[3,2-α] pyrimidine series (e.g. 5,7-dioxo-3-phenyl-6,7-dihydro-5-thiazolo[3,2-α] pyrimidine), those of the 2-thio-2,4-oxazolidinedione series (e.g. 3-ethyl-2-thio-2,4-oxazolidinedione), those of the thianaphthenone series (e.g., 3-(2H)-thianaphtnenone), those of the 2-thio-2,5-thiazolidinedione series (e.g. 3-ethyl-2-thio-2,5-thiazolidinedione), those of the 2,4-thiazolidinedione series (e.g. 2,4-thiazolidinedione, 3-ethyl-2,4-thiazolidinedione, 3-phenyl-2,4-thiazolidinedione, 3-(1-naphthyl)-2,4-thiazolidinedione), those of the thiazolidinone series (e.g. 4-thiazolidinone, 3-ethyl-4-thiazolidinone, 3-phenyl-4-thiazolidinone, 3-alpha-naphthyl-4-thiazolidinone), those of the 4-thiazolinone series (e.g. 2-ethylmercapto-4-thiazolinone, 2-alkylphenylamino-4-thiazolinone, 2-diphenylamino-4-thiazolinone), those of the 2-imino-4-oxazolidinone (pseudohydantoin) series, those of the 2,4-imidazolinedione (hydantoin) series (e.g. 2,4-imidazolinedione, 3-ethyl-2,4-imidazolinedione, 3-phenyl-2,4-imidazolindione, 3-(1-naphthyl)-2,4-imidazolinedione, 1,3-diethyl-2,4-imidazolinedione, 1-ethyl-3-phenyl-2,4-imidazolinedione, 1-ethyl-3-(1-naphthyl)-2,4-imidazolinedione, 1,3-diphenyl-2,4-imidazolinedione), those of the 2-thio-2,4-imidazolinedione (2-thiohydantoin) series (e.g. 2-thio-2,4-imidazolinedione, 3-ethyl-2-thio-2,4-imidazolinedione, 3-phenyl-2-thio-2,4-imidazolinedione, 3-(1-naphthyl)-2-thio-2,4-imidazolinedione, 1,3-diethyl-2-thio-2,4-imidazolinedione, 1-ethyl-3-phenyl-2-thio-2,4-imidazolinedione, 1-ethyl-3-(1-naphthyl)-2-thio-2,4-imidazolinedione, 1,3-diphenyl-2-thio-2,4-imidazolinedione), or those of the 5-imidazolinone series (e.g. 2-n-propylmercapto-5-imidazolinone), (especially a heterocyclic nucleus with negative character containing 5 to 6 atoms in the heterocyclic ring, 3 to 4 of said atoms being carbon atoms, one of said atoms being a nitrogen atom, and one of said atoms being a nitrogen atom, an oxygen atom or a sulphur atom).

In the preparation of methine dye salts, merocyanine dyes, rhodacyanine dyes, polymerocyanine dyes and styryl dyes, according to this invention, 1,2 condensed benzimidazolium quaternary salts are used represented by the general formulae :

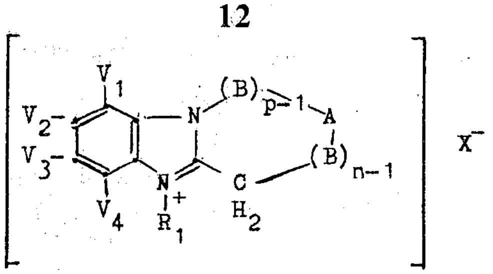

X and

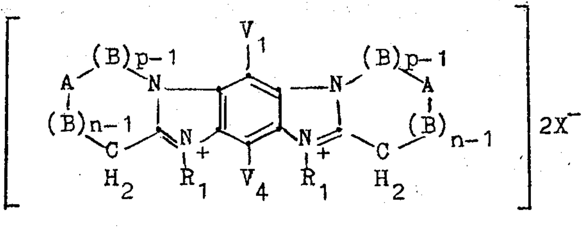

XI wherein $V_1$, $V_2$, $V_3$, $V_4$, A, $(B)_{n-1}$, $(B)_{p-1}$, n, p, $R_1$ and $X^-$ have the same significance as set forth above.

The 1,2 condensed benzimidazolium quaternary salts according to formulae X and XI can either directly be converted by one of the known methods into a methine dye, or a dye intermediate currently used in the chemistry of cyanine dyes can be formed in order to obtain therewith the methine dye.

Methine dye salts, merocyanine dyes, rhodacyanine dyes, polymerocyanine dyes and styryl dyes according to the present invention may be obtained by starting from these new 1,2-condensed benzimidazolium quaternary salts or dye intermediates by application of the usual condensation methods known to those skilled in the art.

The following description of some methods is not complete and therefore is not to be considered as limiting the scope of our invention but merely as a survey of the most usual condensation methods.

New asymmetrical methine dye salts according to the present invention can be prepared by condensing 1,2 condensed benzimidazolium quaternary salts of the general formulae X and XI with a cycloammonium quaternary salt represented by the following formula:

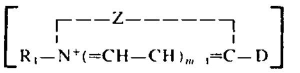

XII wherein :

$R_1$, X, Z and m have the same value as set forth above in formulae VI and VII, and D represents a halogen atom, an alkylmercapto group, an aryl mercapto group, a β-arylamino vinyl group, a θ-arylamino-1,3-butadienyl group, a β-alkylmercapto vinyl group, a β-arylmercapto vinyl group, a β-acetanilido vinyl group or a β-p-tolusulphanilido vinyl group, which vinyl groups may carry a substituent.

The condensations are advantageously carried out in the presence of a basic condensing agent, for example a trialkylamine such as triethylamine, a dialkylaniline, a heterocyclic tertiary amine such as pyridine or N-alkylpiperidine or the like. The condensation can also be carried out in the presence of an inert diluent such as methanol, ethanol, 1,4-dioxane, etc.

New asymmetrical methine dye salts according to the present invention can also be prepared by condensing 1,2-condensed benzimidazolium quaternary salts of the general formulae X and XI with a heterocyclic base known in cyanine dye chemistry, of the following formula :

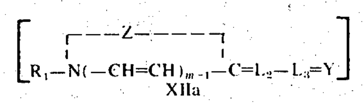

XIIa wherein :

$L_2$, $L_3$, $R_1$, Z and m have the same value as set forth above in formulae VI and VII, and Y represents a reactive functional group such as an oxygen atom, a sulphur atom, a selenium atom or an aryl-N= group.

The condensations of this type are advantageously carried out in acid medium or in the presence of a compound forming an acid medium, e.g. in the presence of an acid anhydride such as acetic anhydride.

New asymmetrical methine dye salts according to the present invention can also be prepared by condensing intermediates represented by the following formulae

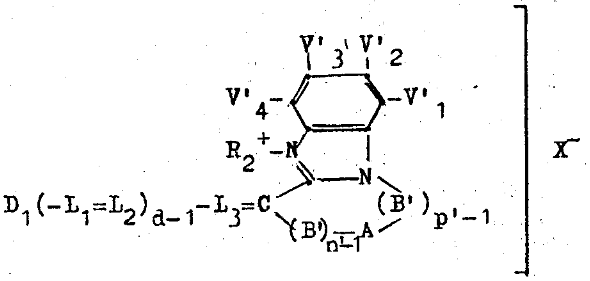

XIII

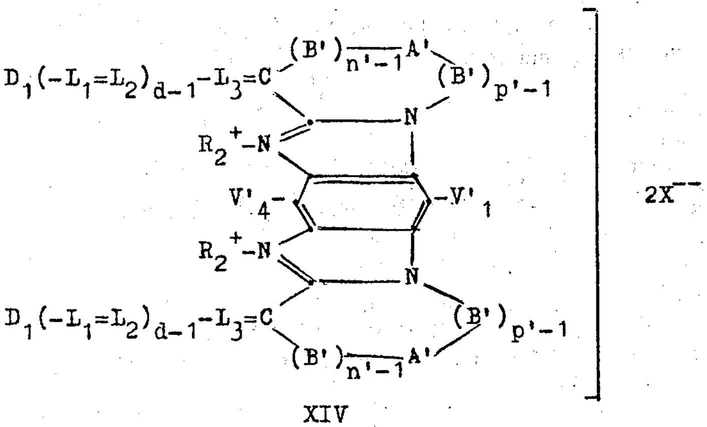

XIV wherein:

$D_1$ represents an alkylmercapto group, an arylmercapto group, an arylamino group, and acetanilido group or p-tolusulphanilido group, $R_2$, $L_1$, $L_2$, $L_3$, $V'_1$, $V'_2$, $V'_3$, $v'_4$, A', $(B')_{n'-1}$, $(B')_{p'-1}$, d and X have the same significance as set forth above, with cycloammonium quaternary salts containing a methyl group in α-or γ-position, such as those represented by the general formula XII where D is a methyl group.

The condensations of this type are advantageously carried out in the presence of a basic condensing agent.

New asymmetrical methine dye salts according to the present invention can also be prepared by condensing intermediates represented by the following formulae

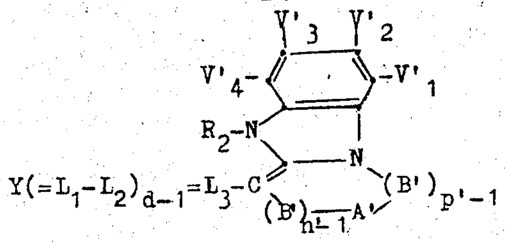

XIIIa

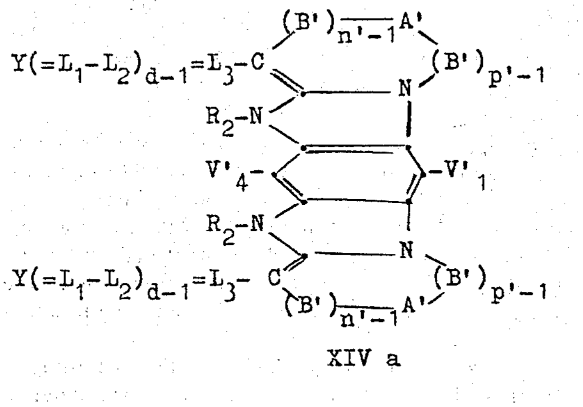

XIV a wherein:

Y, $R_2$, $L_1$, $L_2$, $L_3$, $V'_1$, $V'_2$, $V'_3$, $V'_4$, A', $(B')_{n'-1}$, $(B')_{p'-1}$, and *d* have the same significance as set forth above, with cycloammonium quaternary salts containing a methyl group in α- or γ-position, such as those represented by the general formula XII but wherein D represents a methyl group.

The condensations of this type are advantageously carried out in the presence of an acid anhydride.

Other asymmetrical methine dye salts according to the present invention can be prepared by condensing respectively a compound of formula X with a compound of formula XIV, a compound of formula XIII with a compound of formula XI, a compound of formula XIII with a compound of formula X, and a compound of formula XIV with a compound of formula XI.

Some of the intermediates represented by the formula XIII or XIV can be prepared by condensing a 1,2-condensed benzimidazolium quaternary salt represented by the formula X and XI with a compound represented by one of the formulae:

$$Ar\text{-}N{=}(L_1\text{-}L_2{=})_{d-1}\ L_3\text{-}NH\text{-}Ar \qquad XVa$$

and $$Ar\text{-}N{=}(L_1\text{-}L_2{=})_{d-1}\ L_3\text{-}S\text{-}alkyl \qquad XVb$$

wherein $L_1$, $L_2$, $L_3$ and *d* have the same significance as set forth above.

The compounds according to formulae XIII and XIV wherein $D_1$ represents an acetanilido group can be prepared by condensing a 1,2 condensed benzimidazolium salt according to formula X or XI with a compound according to formula XVa and then boiling the obtained intermediate product with acetic anhydride.

The new symmetrical methine dye salts according to the present invention can be prepared by condensing a 1,2 condensed benzimidazolium quaternary salt of the formula X with a compound of the formula XIII, or a 1,2- condensed benzimidazolium quaternary salt of the formula XI with a compound of the formula XIV, the radicals $V'_1$, $V'_2$, $V'_3$, $V'_4$, A', $(B')_{p-1}$ , $(B')_{n-1}$ , $R_2$ having the same significance as $V_1$, $V_2$, $V_3$, $V_4$, A, $(B)_{p-1}$ , $(B)_{n-1}$ and $R_1$ respectively.

The new symmetrical methine dye salts according to the present invention can also be prepared by condensing a 1,2 condensed benzimidazolium quaternary salt represented by the formula X or XI with an ortho-carboxylic acid alkyl ester, such as ethyl ortho-formate, advantageously in a nitrobenzene solution, or in the presence of a carboxylic anhydride e.g. acetic anhydride.

The new betaine-like methine dye salts according to the present invention are, depending on the betaine-like radical, prepared analogously to the methods described in the French Pat. Specification No. 1,149,769, the French Pat. Specification Nos. 1,223,289 and 2,238,231, the German Pat. Specification No. 929,080 and the Belgian Pat. Specification Nos. 568,759, 568,840 and 569,130. The preparation of such dye salts is further illustrated in the examples of the present invention.

The new merocyanine dyes according to the present invention can be prepared by condensing a 1,2 condensed benzimidazolium quaternary salt represented by the formula X or XI with a heterocyclic compound represented by the formula:

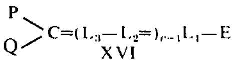
XVI wherein:

P, Q, $L_1$, $L_2$, $L_3$ and e have the same significance as described in formulae VIII and IX, and E represents a reactive negative atom or grouping, e.g. a halogen atom, such as a chlorine atom, a bromide atom, or an iodine atom, a cyano group, an alkyl- or aryl-mercapto group, an alkoxy group, an arylamino group, an acetarylido group, a p-tolussulphanilido group etc.

The new di- and tetramethine merocyanine dyes according to the present invention can also be prepared by condensing an intermediate represented by the formula XIII or XIV given above, with a compound represented by one of the following formulae:

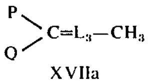
XVIIa and

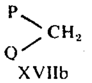
XVIIb wherein:

P, Q and $L_3$ have the same significance as set forth above.

The new styryl dyes according to the present invention can be prepared by condensing a 1,2 condensed benzimidazolium salt according to fomula X or XI with a p-dialkyl-aminobenzaldehyde advantageously in the presence of a carboxylic acid anhydride, for example acetic anhydride.

Hereinafter follows the description of some methods for the preparation of heterocyclic bases corresponding to formulae I and II. These methods are illustrated by reaction schemes and detailed examples of preparation. These methods, however, are not limiting the scope of our invention. The preparations are divided in classes of analogous preparations and each class is illustrated by one or more detailed examples of preparations. The preparations of the bases are indicated by the letter A, which is preceded by a number indicating the class of the preparation and followed by a serial number.

This classification facilitates the survey of the several preparation methods and the reference thereto in the description of the preparations of the quaternary salts and the heterocyclic bases.

CLASS 0A.

Preparation 0A 01.

2,3-dihydro-1H-pyrrolo[1,2-a]banzimidazole, of the formula

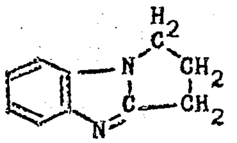

is prepared according to W. Reppe et al, Ann. 596, 209 (1955).

PREPARATION 0A 02.

2,3-dihydro-1H-pyrrolo[1,2-a]naphtho[2,3-d]imidazole:

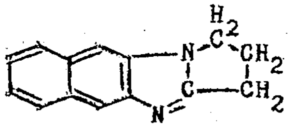

is prepared according to W. Reppe et al, Ann. 596 206 (1955). 0A PREPARATION OA 03.

1,2,3,4-tetrahydropyridino[1,2-a]beozimidazole

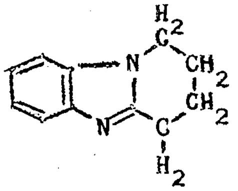

is prepared according to Mosby, J. Org. Chem. 24, 420 (1959).

CLASS 1A.

The heterocyclic bases of this class are prepared according to the following reaction scheme, which was elaborated by K. H. Saunders, J. Chem. Soc. 3275 (1955) :

First step :

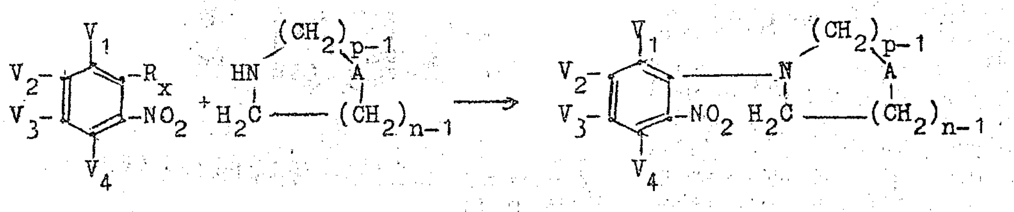

I. II. III.

Second step :

III.

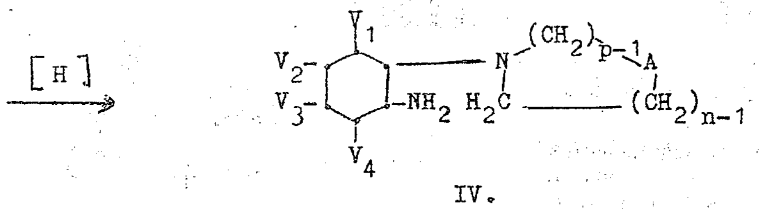

IV.

Third step :

IV.

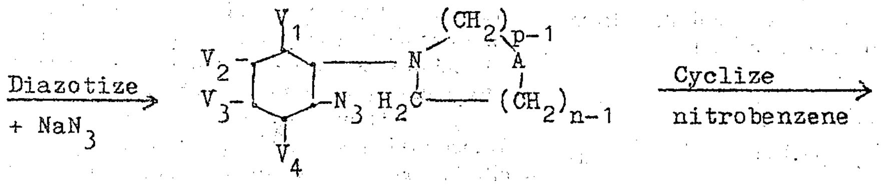

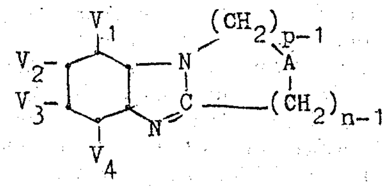

V.

wherein :

$R_x$ represents a nitro group or a halogen atom, and A, $V_1$, $V_2$, $v_3$, $V_4$, *n* and *p* have the same significance as described above.

The first reaction step is carried out according to different methods which depend on the structure of the intermediates and the chosen reaction medium. The second reaction step is always carried out in nearly the same way. Just as the first reaction step, the third reaction step is carried out according to different methods. All these methods are illustrated by detailed preparations. The intermediates and the heterocyclic bases which are prepared according to these detailed preparations are listed in table 1 A.

1. Detailed preparations illustrating the first reaction step of class 1 A.

PREPARATION A

N-(2-nitro-4-chlorophenyl)-pyrrolidine is prepared as follows:

96 g of 2,5-dichloronitrolbenzene are added to 71 g of pyrrolidine at a temperature of 50°C. This temperature is maintained for 15 min on a water-bath. By adding water the reaction product precipitates and is sucked off. Recrystallization from isopropanol yields 102 g of N-(2-nitro-4-chlorophenyl)-pyrrolidine. Melting point : 73°C.

PREPARATION B

N-(2-nitro-4-fluorophenyl)-pyrrolidine is prepared as follows:

76.4 g of 2,5-difluoronitrobenzene prepared according to Weygand, Ber. 84 (1951), 107 is added dropwise with stirring to 89 cm3 of pyrrolidine on a water bath at 50°c. Heating is continued for further 10 min. at 90°C. The reaction mixture is poured into water and the oily substance is extracted with benzene. After washing of the benzene-extract with water and drying with sodium sulphate, the benzene is distilled off under reduced pressure. The residue is recrystallized from isopropanol. Melting point : 48°C. Yield : 88 g.

PREPARATION C

N-(2-nitro-4-carbethoxyphenyl)-pyrrolidine is prepared as follows:

15.6 g of pyrrolidine are added dropwise to a hot solution (± boiling temperature) of 23 g of 3-nitro-4-chloroethylbenzoate (prepared according to Hubner, Ann. 222, 183) in 60 cm3 of anhydrous ethanol. After adding pyrrolidine the reaction mixture is refluxed for 1 h by heating on a water-bath. The reaction mixture is poured into water and the formed precipitate is sucked off. Melting point : 78°C. Yield : 26 g.

PREPARATION D

N-(2-nitro-4-carbethoxy-5-chlorphenyl)-pyrrolidine is prepared as follows:

A solution of 55 g of 2-chloro-4,5-dinitro-ethylbenzoate in 250 cm3 of methanol is added dropwise with stirring at 50°C to 28.4 g of pyrrolidine. After heating for 10 min on a water-bath followed by cooling the precipitate is sucked off, washed with a mixture of alcohol and water and recrystallized from methanol. Melting point : 105°C. Yield : 45 g.

The starting product 2-chloro-4,5-dinitroethylbenzoate is prepared as follows :

143 g of 2-chloro-4,5-dinitrobenzoic acid prepared according to Goldstein and Studer, Helv. 20 (1937) 1409 and 140 cm3 of thionyl chloride are heated on a water-bath for 3 h. After evaporating the excess of thionyl chloride, 220 cm3 of ethanol are slowly added. The obtained mixture is poured into 2 l. ofwater. The precipitated ester is sucked off and washed with water. After recrystallizing twice from ethanol the ester obtained melts at 78°C. Yield : 157.5 g.

PREPARATION E 2-(pyrrolidino)-5-(pyrrolidino-sulphonyl)-nitrobenzene is prepared as follows:

102.4 g of 3-nitro-4-chlorobenzene sulphochloride (preparation described in Ber. 24 (1891) 3.190) are added portion-wise to 148 cm3 of pyrrolidine at 50°C. Heating is continued for 15 min on a boiling water-bath. The reaction mixture is poured into water and the precipitate is sucked off. After recrystallization from ispropanol the product obtained melts at 133°C. Yield : 91.2 g.

PREPARATION F

N-(2-nitro-4-fluorophenyl)-piperidine is prepared as follows:

115 g of 2-bromo-5-fluoronitrolbenzene and 109 cm3 of piperidine are heated with stirring to 95°C on a water-bath for 90 min. Next, water is added to the reaction mixture; a precipitate is formed which is sucked off and recrystallized from isopropanol. Yield : 63 g. Melting point : 53°C.

2. Detailed preparation illustrating the second reaction step of class 1 A

PREPARATION G

N-(2-amino-4-chlorophenyl)-pyrrolidine is obtained by catalytic reduction in ethanol of N-(2-nitro-4-chlorophenyl) pyrrolidine. After evaporation of the solvent a brown oily residue is obtained, which is used as such in the next reaction step.

3. Detailed preparations illustrating the third reaction step of class 1 A

PREPARATION H 7-chloro-1,2,3,4-tetrahydropyridino[1,2-a]benzimidazole:

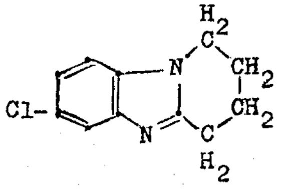

is prepared according to K. H. Saunders, J. Chem. Soc. 3275 (1955).

PREPARATION I 6-chloro-1,3-dihydro-1H-pyrrolo[1,2-a]benzimidazole :

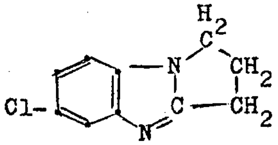

is prepared as follows:

82.4 g of N-(2-amino-4-chlorophenyl)-pyrrolidine are dissolved in 625 cm3 of 2 N hydrochloric acid and diazotized with a solution of 29.4 g of sodium nitrite in 70 cm3 of water. The obtained solution is then poured into an aqueous solution of 35.3 g of sodium azide and 168 g of sodium acetate in 650 cm3 of water. The formed azide is sucked off and dissolved in 500 cm3 of nitrobenzene. This solution is added dropwise to 500 cm3 of nitrobenzene, heated at 170°C. When the reaction is over, the nitrobenzene is distilled off under reduced pressure until a residual volume of about 100 cm3. After cooling, the formed benzimidazole compound crystallizes out and is sucked off. The 6-chloro-2,3-dihydro-1H-pyrrolo[1,2-a]benzimidazole base is purified by recrystallization from the mixture benzene/hexane. Yield: 37.2 g. Melting point: 137°C.

PREPARATION J 8-chloro-3,4-dihydro-1H-1,4-oxazino[4,3-a]benzimidazole

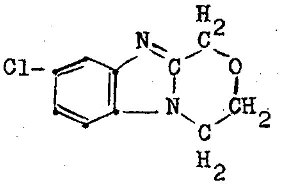

is prepared according to K. H. Saunders, J. Chem. Soc. 3275 (1955).

Table 1 A

| First Reaction Step | | | | | | |
|---|---|---|---|---|---|---|
| | Starting Product I | | | | Prepared analogously to detailed preparation | Melting point of reaction product III °C |
| Significance of $R_x$ | Significance of $V_1$ | $V_2$ | $V_3$ | $V_4$ | | |
| 1) In the case A = $CH_2$ and p+n = 4 | | | | | | |
| Cl | H | H | Cl | H | a | 73 |
| Cl | Cl | H | H | H | a | Bp.134–136 (3mm Hg) |
| Cl | H | Cl | Cl | H | a | 80 |
| F | H | H | F | H | b | 48 |
| Br | H | H | Br | H | a | 76 |
| Cl | H | H | $H_5C_2OOC-$ | H | c | 78 |
| Br | $H_5C_2OOC-$ | H | H | H | c | 53 |
| $NO_2$ | H | Cl | $H_5C_2OOC-$ | H | d | 105 |
| Cl | H | H | 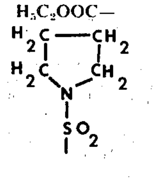 | H | c | 133 |

Table 1 A-continued

| Significance of $R_x$ | Starting Product I — Significance of $V_1$ | $V_2$ | $V_3$ | $V_4$ | First Reaction Step — Prepared analogously to detailed preparation | Melting point of reaction product III °C |
|---|---|---|---|---|---|---|
| Cl | H | H | $CH_3$ | H | a | 60 |
| $NO_2$ | H | Br | $H_5C_2OOC-$ | H | d | 105 |
| | | | | | 2) In the case A = $CH_2$ and p+n = 5 | |
| — | H | H | Cl | H | — | — |
| Br | H | H | F | H | f | 53 |
| — | H | Cl | Cl | H | (1) | — |
| — | H | H | Br | H | (1) | — |
| Br | H | H | CN— | H | f | 112 |
| Cl | H | H | 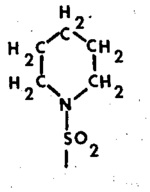 | H | c | 106 |
| Cl | H | H | $F_3C-$ | H | a | 55 |
| Cl | H | Cl | H | H | a | — |
| | | | | | 3) In the case A = oxygen atom and p+n = 5 | |
| — | H | H | H | — | — | — |
| Br | H | H | CN— | H | a | 130 |
| Cl | H | Cl | Cl | H | c | 75 |

| Second Reaction step — Prepared analogously to detailed preparation | Melting point of reaction product IV °C | Third Reaction Step — Prepared analogously to detailed preparation | Chemical name of the heterocyclic base (V) | Melting point of the heterocyclic base | Number of reference |
|---|---|---|---|---|---|
| | 1) In the case A = $CH_2$ and p+n = 4 | | | | |
| g | — | i | 6-chloro-2,3-dihydro-1H-pyrrolo[1,2-a]benzimidazole | 137 | 1A01 |
| g | — | i | 8-chloro-2,3-dihydro-1H-pyrrolo[1,2-a]benzimidazole | 122 | 1A02 |
| g | — | i | 6,7-dichloro-2,3-dihydro-1H-pyrrolo[1,2-a]benzimidazole | 215 | 1A03 |
| g | — | i | 6-fluoro-2,3-dihydro-1H-pyrrolo[1,2-a]benzimidazole | 128 | 1A04 |
| g | — | i | 6-bromo-2,3-dihydro-1H-pyrrolo[1,2-a]benzimidazole | 150 | 1A05 |
| g | — | i | 6-carbethoxy-2,3-dihydro-1H-pyrrolo[1,2-a]benzimidazole | 134 | 1A06 |
| g | — | i | 8-carbethoxy-2,3-dihydro-1H-pyrrolo[1,2-a]benzimidazole | 96 | 1A07 |
| g | 90 | i | 6-carbethoxy-7-chloro-2,3-dihydro-1H-pyrrolo[1,2-a]benzimidazole | 138 | 1A08 |
| g | 174 | i | 6-(pyrrolidino-sulfonyl)-2,3-dihydro-1H-pyrrolo[1,2-a]benzimidazole | 239 | 1A09 |
| g | — | i | 6-methyl-2,3-dihydro-1H-pyrrolo[1,2-a]benzimidazole | 146 | 1A10 |
| g | 95 | i | 6-carbethoxy-7-bromo-2,3-dihydro-1H-pyrrolo[1,2-a]benzimidazole | 114 | 1A11 |
| | 2) In the case A = $CH_2$ and p+n = 5 | | | | |
| — | — | h | 7-chloro-1,2,3,4-tetrahydropyridino[1,2-a]benzimidazole | 15-3 | 1A12 |
| g | — | h | 7-fluoro-1,2,3,4-tetrahydropyridino[1,2-a]benzimidazole | 110 | 1A13 |
| g | — | h | 7,8-dichloro-1,2,3,4-tetrahydropyridino[1,2-a]benzimidazole | 184 | 1A14 |
| g | — | h | 7-bromo-1,2,3,4-tetrahydropyridino[1,2-a]benzimidazole | 163 | 1A15 |
| g | — | h | 7-cyano-1,2,3,4-tetrahydropyridino[1,2-a]benzimidazole | 176 | 1A16 |
| g | 139 | h | 7-(1-piperidino-sulfonyl)-1,2,3,4-teterahydropyridino[1,2-a]benzimidazole | 229 | 1A17 |

Table 1 A-continued

| Second Reaction step | | Third Reaction Step | | | |
|---|---|---|---|---|---|
| Prepared analogously to detailed preparation | Melting point of reaction product IV °C | Prepared analogously to detailed preparation | Chemical name of the heterocyclic base (V) | Melting point of the heterocyclic base | Number of reference |
| g | 52 | h | 7-trifluoromethyl-1,2,3,4-tetrahydropyridino[1,2-a]benzimidazole | 140-1 | 1A18 |
| g | — | h | 8-chloro-1,2,3,4-tetrahydropyridine[1,2-a]benzimidazole | — | 1A19 |
| 3) In the case A = oxygen atom and p+n = 5 | | | | | |
| — | — | j | 8-chloro-3,4-dihydro-1H-1,4-oxazino[4,3-a]benzimidazole | — | 1A20 |
| g | 177 | j | 8-cyano-3,4-dihydro-1H-1,4-oxazino[4,3-a]benzimidazole | 186 | 1A21 |
| g | 146 | h | 7,8-dichloro-3,4-dihydro-1H-1,4-oxazino[4,3-a]benzimidazole | 192 | 1A22 |

(1) Lefevre & Turner, J. Chem. Soc. (1927) 1117

CLASS 2A.

The heterocyclic bases of this class are prepared according to the following reaction scheme, which is sub-divided in three steps:

First step :

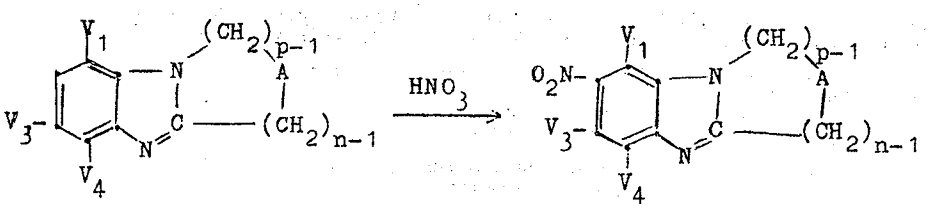

I. II.

Second step :

II.

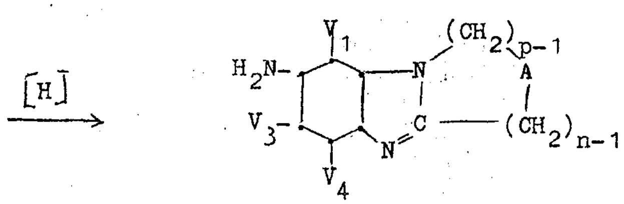

III.

Third step :

III.

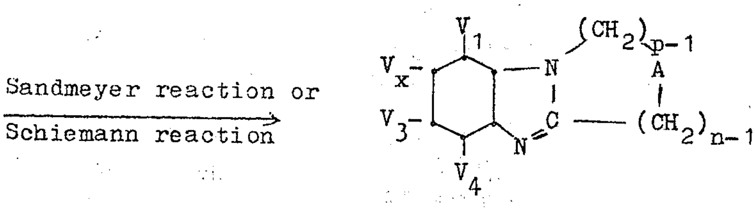

IV.

wherein:

A, $V_1$, $V_3$, $V_4$, $n$ and $p$ have the same significance as above, and $V_x$ represents the radicals which can be introduced by the Sandmeyer or Schiemann reaction.

The first and second reaction step are always carried out in the same way and are resp. illustrated by the detailed preparations *k* and *l*.

The third reaction step is carried out according to three different methods which are illustrated by the detailed preparations *m*, *n* and *o*.

The heterocyclic bases which are prepared analogously to these detailed preparations are listed in Table 2A.

1. Detailed preparation illustrating the first reaction step of class 2A.

PREPARATION K 6-bromo-7-nitro-2,3-dihydro-1H-pyrrolo[1,2-a]benzimidazole is prepared as follows:

19.1 g of 6-bromo-2,3-dihydro-1H-pyrrolo[1,2-a]benzimidazole prepared according to preparation 1Aare dissolved in 60 cm3 of concentrated sulphuric acid, and nitrated at 0°–5°C with a mixture of 7.7 cm3of nitric acid (d : 1.42) and 25 cm3 of concentrated sulphuric acid. The reaction mixture is poured into water, neutralized with ammonium hydroxide and after sucking off the precipitate is recrystallized from ethanol. Melting point: 201°C. Yield: 17 g.

2. Detailed preparation illustrating the second reaction step of class 2A.

PREPARATION L 6-bromo-7-amino-2,3-dihydro-1H-pyrrolo[1,2-a]benzimidazole is prepared as follows:

15.2 g of 6-bromo-7-nitro-2,3-dihydro-1H-pyrrolo[1,2-a]benzimidazole are reduced in methyl glycol in the presence of Raney nickel. After reduction, the solvent is evaporated and the amine is recrystallized from ethanol. Melting point: 264°C. Yield: 10.2 g.

3. Detailed preparations illustrating the third reaction step of class 2A

PREPARATION M 6-bromo-7-cyano-2,3-dihydro-1H-pyrrolo[1,2-a]benzimidazole:

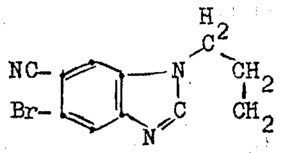

is prepared as follows:

9.2 g of 6-bromo-7-amino-2,3-dihydro-1H-pyrrolo[1,2-a]benzimidazole are dissolved in a mixture of 30 cm3 of water and 9 cm3 of hydrochloric acid. Diazotation is carried out with a solution of 2.5 g of sodium nitrite in 15 cm3 of water. The diazonium salt is neutralized with sodium carbonate and while stirring poured into a solution of 6.89 g of cuprous cyanide and 12.3 g of potassium cyanide in 100 cm3 of water. Stirring is continued for 30 min at room temperature and a further 15 min on a water-bath at 50° to 60°C. After cooling, the precipitate is sucked off. The base is purified by sublimation (200°C/2mm Hg) and recrystallized from a mixture of benzene and n-hexane. Melting point: 224°C. Yield: 4.7 g.

PREPARATION N 7-chloro-2,3-dihydro-1H-pyrrolo[1,2-a]benzimidazole of the formule:

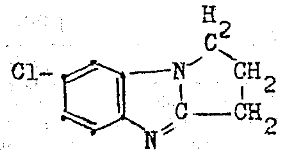

is prepared as follows:

A suspension of 17.3 g of 7-amino-2,3-dihydro-1H-pyrrolo [1,2-a]benzimidazole prepared according to W. Reppe, Ann. 596, 209 (1955) in 200 cm3 of 5 N hydrochloric acid is diazotized with a solution of 7.2 g of sodium nitrite in 30 cm3 of water. The obtained solution is added to a solution of 8 g of cuprous chloride in 35 cm3 of concentrated hydrochloric acid at 50°–60°C. After cooling the precipitate is sucked off, washed with water and suspended in water. By adding to this suspension a 25 % aqueous solution of ammonia the heterocyclic base is set free and sucked off. After drying, recrystallization from benzene yields 4.1 g of 7-chloro-2,3-dihydro-1H-pyrrolo[1,2-a]benzimidazole. Melting point: 136°C.

PREPARATION O.

7-fluoro-2,3-dihydro-1H-pyrrolo[1,2-a]benzimidazole of the formula:

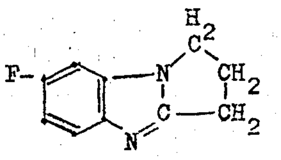

is prepared as follows:

43.6 g of 7-amino-2,3-dihydro-1H-pyrrolo[1,2-a]benzimidazole according to W. Reppe, Ann. 596 (1955) 209, are dissolved in a 31 % aqueous solution of fluoboric acid and diazotized with a solution of 18.5 g of sodium nitrite in 50 cm3 of water. After neutralization with sodium carbonate under cooling the diazonium fluoborate obtained is sucked off and washed with methanol and ether. Yield: 58 g. Melting point: 170°–180°C (with decomposition).

This diazonium fluoborate is added portionwise to 250 cm3 of boiling tetraline in order to decompose the diazonium fluoborate in the corresponding fluorocompound. The supernatant tetraline is decanted and the residue is extracted with a warm 2 N hydrochloric acid solution. To liberate the base sodium carbonate is added. The base is extracted with chloroform and after evaporating the solvent, the residue is distilled under reduced pressure. Yield: 7 g. Boiling point: 166°C/3 mm. Melting point: 124°C.

Table 2A

| First Reaction Step | | | | | Second Reaction Step | |
|---|---|---|---|---|---|---|
| Starting product I Significance of $V_1$ | $V_3$ | $V_4$ | Prepared analogously to detailed preparation | Melting point of Reaction product II °C | Prepared analogously to detailed preparation | Melting point of Reaction product III °C |
| 1) In the case A = $CH_2$ and p+n = 4 | | | | | | |
| H | H | H | — | — | (1) | — |
| H | Br | H | k | 201 | l | 264 |
| H | Cl | H | k | 203 | l | 264 |
| H | F | H | k | 236 | l | 230 |
| H | H | H | — | — | (1) | — |
| H | H | H | — | — | (1) | — |
| H | H | H | — | — | (1) | — |
| 2) In the case A = $CH_2$ and p+n = 5 | | | | | | |
| H | Br | H | k | 184 | l | 217 |
| H | Cl | H | k | 194 | l | 210 |
| H | F | H | k | 264 | l | 199 |
| H | H | H | — | — | (2) | — |
| 3) In the case A = oxygen atom and p+n = 5 | | | | | | |
| H | Cl | H | k | 220 | l | 264 |

Table 2A-continued

| Third Reaction Step | | | | |
|---|---|---|---|---|
| Significance of Vx | Prepared analogously to detailed preparation | Chemical name of the heterocyclic base (IV) | Melting point of the heterocyclic base °C | Number of reference |
| | | 1) In the case A = $CH_2$ and p+n = 4 | | |
| — | — | 7-amino-2,3-dihydro-1H-pyrrolo [1,2-a]benzimidazole | — | 2A00 |
| CN | m | 6-bromo-7-cyano-2,3-dihydro-1H-pyrrolo[1,2-a]benzimidazole | 224 | 2A01 |
| CN | m | 6-chloro-7-cyano-2,3-dihydro-1H-pyrrolo[1,2-a]benzimidazole | 215 | 2A02 |
| CN | m | 6-fluoro-7-cyano-2,3-dihydro-1H-pyrrolo[1,2-a]benzimidazole | 210 | 2A03 |
| CN | m | 7-cyano-2,3-dihydro-1H-pyrrolo [1,2-a]benzimidazole | 155 | 2A04 |
| Cl | n | 7-chloro-2,3-dihydro-1H-pyrrolo [1,2-a]benzimidazole | 136 | 2A05 |
| F | o | 7-fluoro-2,3-dihydro-1H-pyrrolo [1,2-a]benzimidazole | 124 | 2A06 |
| | | 2) In the case A = $CH_2$ and p+n = 5 | | |
| CN | m | 7-bromo-8-cyano-1,2,3,4-tetrahydropyridino-[1,2-a]benzimidazole | 210 | 2A07 |
| CN | m | 7-chloro-8-cyano-1,2,3,4-tetrahydropyridino-[1,2-a]benzimidazole | 212 | 2A08 |
| CN | m | 7-fluoro-8-cyano-1,2,3,4-tetrahydropyridino[1,2-a]benzimidazole | 253 | 2A09 |
| CN | m | 8-cyano-1,2,3,4-tetrahydropyridino-[1,2-a]benzimidazole | 194 | 2A10 |
| | | 3) In the case A = oxygen atom and p+n = 5 | | |
| CN | m | 7-ocyano-8-chloro-3,4-dihydro-1H-1,4-oxazino[4,3-a]benzimidazole | 300 | 2A11 |

(1) W. Reppe Ann. 596 (19550 209
(2) K. H. Saunders. J. Chem. Soc. (1955) 3277

CLASS 3 A.

This class concerns the preparation of carboxyl-substituted heterocyclic bases.

Detailed preparation are given hereinafter:

PREPARATION 3A01

6-carboxy-2,3-dihydro-1H-pyrrolo[1,2-a]benzimidazole:

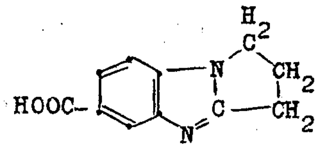

is prepared as follows:

A solution of 5 g of 6-carbethoxy-2,3-dihydro-1H-pyrrolo [1,2-a]benzimidazole (1A06) in 15 cm3 of ethanol and 25 cm3 of 2,5 N sodium hydroxide are refluxed for 5 min. After cooling the reaction mixture is slightly acidified with diluted acetic acid and the precipitate formed is sucked off and washed with water and ethanol. Yield: 4 g. Melting point: 300°c.

PREPARATION 3A02

8-carboxy-2,3-dihydro-1H-pyrrolo[1,2-a]benzimidazole:

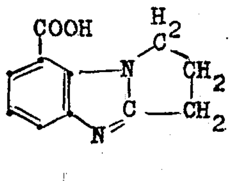

is prepared analogously to preparation 3A01 starting from 8-carbethoxy-2,3-dihydro-1H-pyrrolo[1,2-a]benzimidazole (1A07). Melting point: 310°–312°C.

PREPARATION 3A03

6-carboxy-7-chloro-2,3-dihydro-1H-pyrrolo-[1,2-a]benzimidazole:

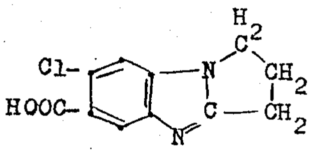

is prepared analogously to preparation 3A01 starting from 6-carbethoxy-7-chloro-2,3-dihydro-1H-pyrrolo[1,2-a]-benzimidazole (1A08). Melting point: >270°.

CLASS 4 A.

This class concerns the preparation of acylamino substituted heterocyclic bases.

The following detailed preparation is given as an illustration:

PREPARATION 4A01

7-acetylamino-2,3-dihydro-1H-pyrrolo[1,2-a]benzimidazole:

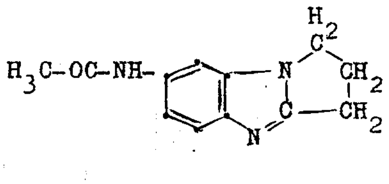

is prepared as follows:

8.65 g of 7-amino-2,3-dihydro-1H-pyrrolo[1,2-a]benzimidazole (2A00) prepared according to W. Reppe Ann. 596 (1955) p. 209 are suspended in 50 cm3 of benzene. To this suspension is added dropwise 6.2 g of acetic anhydride. The mixture is boiled for 15 min and after cooling the precipitated acetyl compound is sucked off. Recrystallization from ethanol yields 7.3 g of 7-acetylamino-2,3-dihydro-1H-pyrrolo[1,2-a]benzimidazole. Melting point: 250°–255°C. Two further recrystallizations from ethanol raise the melting point to 260°–262°C.

CLASS 5A.

This class concerns the preparation of 6-cyano-2,3-dihydro-1H-pyrrolo[1,2-a]benzimidazole.

PREPARATION5A01

6-cyano-2,3-dihydro-1H-pyrrolo[1,2-a]benzimidazole

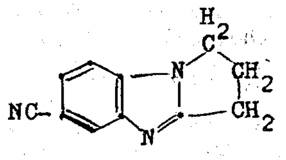

is prepared as follows:

18.3 g of cuprous cyanide are added at reflux temperature to a solution of 40.3 g of 6-bromo-2,3-dihydro-1H-pyrrolo[1,2-a]benzimidazole (1A05) in 200 cm3 of nitrobenzene. The reaction mixture is refluxed for 90 min. and then cooled till 100°C. A solution of 34 g of sodium cyanide in 100 cm3 of water is added whereupon the mixture is shaken for 5 min. Then 40 cm3 of chloroform and 40 cm3 of water are added. The organic layer is separated, washed with a solution of sodium cyanide and twice with water. Finally the solution is boiled with decolourizing carbon, evaporated and recrystallized from ethanol. Melting point: 190°C.

CLASS 6A.

This class concerns the preparation of 6,11-dihydro-benzimidazolo[1,2-b]isochinoline.

PREPARATION 6A01

6,11-dihydro-benzimidazolo[1,2-b]isoquinoline

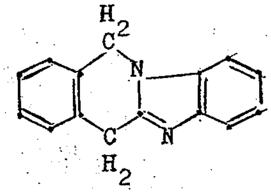

is prepared as follows:

24.8 g of 3,6-dihydro-4,5-benzo-2-pyrone (prepared according to F. G. Mann and F. H. C. Stewart: J. Chem. Soc., 1954, 2819) and 18.1 g of o-phenylene diamine are heated for 15 h at 250° in a sealed tube. The reaction mixture is distilled under reduced pressure, and the distillation product recrystallized from ethylacetate. Yield: 16.7 g. Melting point: 202°C.

CLASS 7A.

This class concerns the preparation of 1,2,3,4,8,9,10,11-octahydrodipyridino[1,2-a:1',2'-a']-benzo[1,2-d:5,4-d']-diimidazole.

PREPARATION 7A01

1,2,3,4,8,9,10,11-octahydrodipyridino[1,2-a:1', 2'-a']-benzo [1,2-d: 5,4-d']-diimidazole

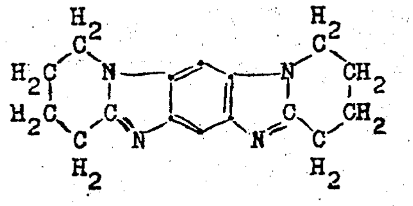

is prepared according to K. H. Saunders, J. Chem. Soc. 1955, 3275.

The heterocyclic bases corresponding to the general formulae I and II are usually converted into quaternary salts for being used in the preparation of the methine dyes according to this invention. According to the used quaternating agent, a quaternary salt with a free anion or a quaternary salt with a betaine-like structure is obtained. Quaternating agents which are used in order to obtain a quaternary salt with a free anion are e.g. methyl iodide, ethyl iodide, β-carboxyethyl bromide, β-hydroxyethyl bromide, or the quaternating agents which are described in the British Pat. Specification Nos. 886,270 and 886,271 or the quaternating agents described in the French Pat. Specification No. 1,223,289.

Quaternating agents which are used in order to obtain directly a quaternary salt with a betaine-like structure are e.g. compounds of the following formula:

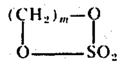

wherein $m$ represents an integer from 1 to 5, such as propylene sulfate or butylene sulfate, which are more particularly described in the French Pat. Specification No. 1,149,769 and the saltonecompounds described in the British Pat. Specification 742,112.

In order to obtain either type of quaternary salts, a free heterocyclic nitrogen base as described above is reacted with one of the above quaternating agents usually in an excess of 15 to 20 % and at a temperature comprised between 50° and 150°C, either in the presence of a neutral diluting agent such as acetone or in a sealed tube.

The quaternary salts, which are used in the preparation of the methine dyes according to this invention, are mostly prepared according to the classical scheme by the reaction of the corresponding base with a quaternating agent.

The quaternary salts with the following structural formula:

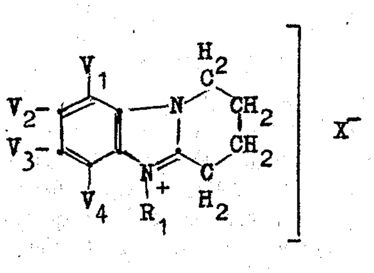

wherein:

$V_1$, $V_2$, $V_3$, $V_4$, $R_1$ and X have the same significance as set forth above, can also be prepared according to the following reaction scheme:

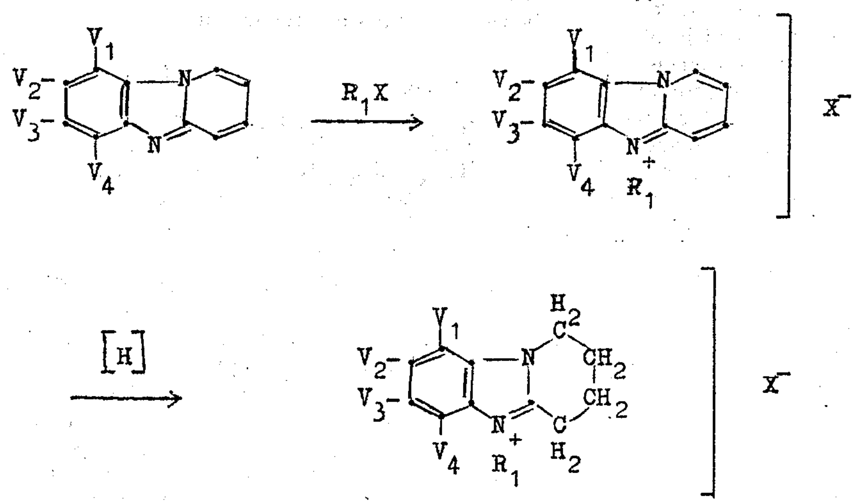

Some detailed preparations are given as an example for the method of preparing the quaternary salts used in this invention. Quaternary salts used in this invention are classified in table Q. In this table are given: the reference number, the name of the quaternary salt, the reaction time, the reaction temperature and an indication whether a diluent or a sealed tube is used. The reference numbers of the quaternary salts are composed of the reference numbers of the corresponding bases followed by the letter Q and a number referring to the used quaternating agent.

The reference numbers for the used quaternating agents are the following:

| | |
|---|---|
| methyl iodide | 1. |
| ethyl iodide | 2. |
| β-hydroxyethyl bromide | 3. |
| β-carboxyethyl bromide | 4. |
| ω-acetyl sulfonamidopropyl bromide | 5. |
| ω-acetyl sulfonamidobutyl bromide | 6. |
| methyl sulphonyl carbamyl methyl bromide | 7. |
| 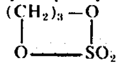 | 8. |

The following are detailed preparations as examples for the preparation of quaternary salts which are used in the preparation of methine dyes according to this invention.

PREPARATION 0A01-Q1

4-methyl-2,3-dihydro-1H-pyrrolo[1,2-a]benzimidazolium iodide is prepared as follows:

6.3 g of 2,3-dihydro-1H-pyrrolo[1,2-a]benzimidazole and 5.7 g of methyl iodide dissolved in 15 cm3 of acetone are refluxed for 30 min. on a water-bath. The quaternary salt crystallizes. After cooling, the crystalline product is sucked off and washed with ether. Yield: 10 g. Melting point: 220°C.

PREPARATION 0A01-Q2

4-ethyl-2,3-dihydro-1H-pyrrolo[1,2-a]benzimidazolium iodide is prepared as follows:

16 g of 2,3-dihydro-1H-pyrrolo[1,2-a]benzimidazole and 23.5 g of ethyl iodide are heated for 15 h at 110°C in a sealed tube. After cooling the quaternary salt is washed with ether. Yield: 27.3 g. Melting point: 198°C.

PREPARATION 1A09-Q1

4-methyl-6(pyrrolidino-sulphonyl)-2,3-dihydro-1H-pyrrolo [1,2-a]benzimidazolium iodide is prepared as follows:

3.4 g of 6-(pyrrolidinosulphonyl)-2,3-dihydro-1H-pyrrolo [1,2-a]benzimidazole and 1.2 cm3 of methyl iodide are heated at 95°C for 6 h in a sealed tube. The quaternary salt formed is washed with acetone and ether. Melting point: above 270°C. Yield: 4.9 g.

PREPARATION 1A12-Q2

5-ethyl-7-chloro-1,2,3,4-tetrahydropyridino[1,2 -a]-benzimidazolium iodide is prepared as follows:

6.2 g of 7-chloro-1,2,3,4-tetrahydropyridino[1,2-a]benzimidazole and 6.2 g of ethyl iodide are heated for 15 h at 110°C in a sealed tube. After cooling the formed quaternary salt is washed with acetone and ether. Yield 9.3 g. Melting point above 250°C.

PREPARATION 1A20-Q2

8-chloro-10-ethyl-3,4-dihydro-1H-[1,4]oxazino[4,3-a]benzimidazdium iodide is prepared as follows:

10.4 g of 8-chloro-3,4-dihydro-1H[1,4]oxazino[4,3-a]benzimidazole and 10 g of ethyl iodide are heated for 16 h at 110°C in a sealed tube. After cooling, the resulting quaternary salt is washed with acetone and ether. Yield: 17.9 g. Melting point: 186°C.

PREPARATION 1A19-Q2

5-ethyl-8-chloro-1,2,3,4-tetrahydropyridino[1,2-a]benzimidazolium iodide

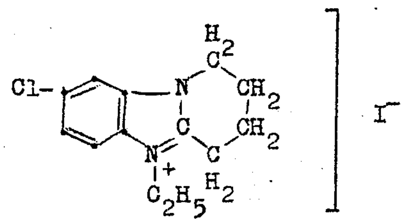

is prepared as follows:

a. 8-amino-pyridino[1,2-a]benzimidazole:

The preparation of 8-aminopyridino[1,2-a]benzimidazole is described by Morgan & Stewart, J. Chem. Soc. 1292 (1938).

b. 8-chloropyridino[1,2-a]benzimidazole:

8.8 g of 8-aminopyridino[1,2-a]benzimidazole are dissolved in 80 cm3 of 5 N hydrochloric acid and diazotized with a solution of 3.7 g of sodium nitrite in 10 cm3 of water. The solution of the diazonium salt is poured into a solution of cuprous chloride and filtered with suction. The filtrate is alkalized by ammonium hydroxide and the precipitate sucked off. Recrystallization from benzene-hexane yields 2.5 g of the benzimidazole base. Melting point: 207°C.

c. 5-ethyl-8-chloropyridino[1,2-a]benzimidazolium iodide:

2 g of 8-chloropyridino[1,2-a]benzimidazole and 1.7 g of ethyl iodide are heated for 15h at 110°C in a sealed tube. After cooling the quaternary salt is washed with acetone and ether. Yield: 3 g. Melting point above 250°C.

d. 5-ethyl-8-chloro-1,2,3,4-tetrahydropyridino[1,2-a]benzimidazolium iodide:

3 g of the preceding quaternary salt are dissolved in ethylene glycol monomethyl ether and hydrogenated at 80°C in the presence of Raney nickel. After evaporation of the solvent 1.1 g of 5-ethyl-8-chloro-1,2,3,4-tetrahydropyridino[1,2-a]benzimidazolium iodide is obtained. Melting point: 250°C.

PREPARATION 2A00-Q1

4-methyl-7-amino-2,3-dihydro-1H-pyrrolo[1,2-a]benzimidazolium iodide

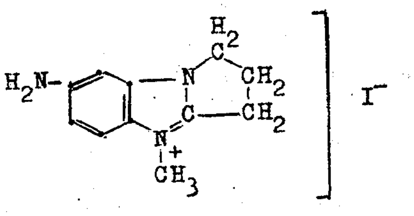

is prepared as follows:

8.6 g of 7-amino-2,3-dihydro-1H-pyrrolo[1,2-a]benzimidazole, prepared according to W. Reppe, Ann. 596, (1955) 209, are dissolved by heating in 50 cm3 of methanol. 4 cm3 of methyl iodide are added dropwise and the mixture boiled for 15 min. The precipitated quaternary salt is sucked off and washed with acetone and ether. Melting point: 282°C.

ACETYLATION OF THE QUATERNARY SALT 5A01-Q3

4(β-acetoxyethyl)-6-cyano-2,3-dihydro-1H-pyrrolo[1,2-a]benzimidazolium bromide

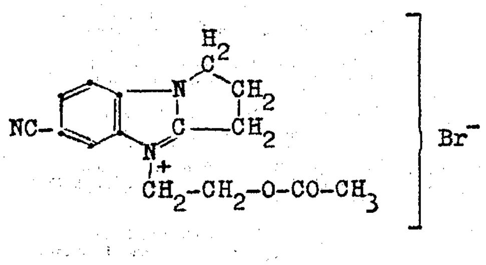

is prepared as follows:

4 g of 5A01-Q3 are dissolved in 40 cm3 of acetic anhydride and refluxed for 10 min. After cooling the mixture is precipitated with ether and the obtained product is washed with water-free acetone and then with water-free ether. Melting point: 208°C.

Table Q

| Number of reference of the quaternary salt | Chemical name of the quaternary salt. | Formula of the quaternizing agent | Reaction time | Reaction temperature °C | Used diluent or sealed tube | Melting point of the quaternary salt °C |
|---|---|---|---|---|---|---|
| | 1) In the case A = $CH_2$ and p+n = 4 | | | | | |
| 0A01-Q1 | 4-methyl-2,3-dihydro-1H-pyrrolo[1,2-a]benzimidazolium iodide | $CH_3I$ | 30' | refluxing | acetone | 220° |
| 0A01-Q2 | 4-ethyl-2,3-dihydro-1H-pyrrolo[1,2-a]benzimidazolium iodide | $C_2H_5I$ | 15h | 110° | + | 198° |
| 0A01-Q3 | 4-(β-hydroxyethyl)-2,3-dihydro-1H-pyrrolo[1,2-a]benzimidazolium bromide | $HO-C_2H_4-Br$ | 6h | 105° | + | 180° |
| 0A02-Q2 | 4-ethyl-2,3-dihydro-1H-pyrrolo[1,2-a]naphtho[2,3-d]imidazolium iodide | $C_2H_5I$ | 24h | 110° | + | 250° |
| 1A01-Q2 | 4-ethyl-6-chloro-2,3-dihydro-1H-pyrrolo[1,2-a]benzimidazolium iodide | " | 15h | 110° | + | 242° |
| 1A02-Q2 | 4-ethyl-8-chloro-2,3-dihydro-1H-pyrrolo[1,2-a]benzimidazolium iodide | " | 30h30" | 105–110° | + | 238° |
| 1A03-Q2 | 4-ethyl-6,7-dichloro-2,3-dihydro-1H-pyrrolo[1,2-a]benzimidazolium iodide | $C_2H_5I$ | 16h | 110° | + | >250° |
| 1A03-Q3 | 4-(β-hydroxyethyl)-6,7-dichloro-2,3-dihydro-1H-pyrrolo[1,2-a]benzimidazolium bromide | $HO-C_2H_4-Br$ | 4h | 110° | + | >250° |
| 1A03-Q6 | 4-(ω-acetylsulfonamidobutyl)-6,7-dichloro-2,3-dihydro-1H-pyrrolo[1,2-a]benzimidazolium bromide | $CH_3-CO-NH-SO_2-(CH_2)_4-Br$ | 4h | 140° | no diluent | 252° |
| 1A03-Q7 | 4-(N-methylsulfonyl carbamyl methyl)-6,7-dichloro-2,3-dihydro-1H-pyrrolo[1,2-a]benzimidazolium bromide | $CH_3-SO_2-NH-CO-CH_2-Br$ | 4h | 140° | no diluent | >260° |
| 1A04-Q2 | 4-ethyl-6-fluoro-2,3-dihydro-1H-pyrrolo[1,2-a]benzimidazolium iodide | $C_2H_5I$ | 16h | 110° | + | 237° |
| 1A05-Q2 | 4-ethyl-6-bromo-2,3-dihydro-1H-pyrrolo[1,2-a]benzimidazolium iodide | " | 15h | 110° | + | 250° |
| 1A06-Q1 | 4-methyl-6-carbethoxy-2,3-dihydro-1H-pyrrolo[1,2-a]benzimidazolium iodide | $CH_3I$ | 3h | 90° | + | 238° |
| 1A07-Q1 | 4-methyl-8-carbethoxy-2,3-dihydro-1H-pyrrolo[1,2-a]benzimidazolium iodide | " | 3½h | 90° | + | 190° |
| 1A08-Q1 | 4-methyl-6-carbethoxy-7-chloro-2,3-dihydro-1H-pyrrolo[1,2-a]benzimidazolium iodide | " | 2h | 95° | + | 250° |

Table Q-continued

| Number of reference of the quaternary salt | Chemical name of the quaternary salt. | Formula of the quaternizing agent | Reaction time | Reaction temperature °C | Used diluent or sealed tube | Melting point of the quaternary salt °C |
|---|---|---|---|---|---|---|
| 1A08-Q4 | 4-(β-carboxyethyl)-6-carbethoxy-7-chloro-2,3-dihydro-1H-pyrrolo[1,2-a]benzimidazolium bromide | $HOOC-(CH_2)_2-Br$ | 3h | 125° | + | 192° |
| 1A08-Q8 | 4-(γ-sulfatopropyl)-6-carbethoxy-7-chloro-2,3-dihydro-1H-pyrrolo[1,2-a]benzimidazolium betaine | 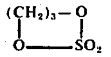 | 2h | 120° | + | 140-5° |
| 1A08-Q6 | 4-(ω-acetylsulfonamidobutyl)-6-carbethoxy-7-chloro-2,3-dihydro-1H-pyrrolo[1,2-a]benzimidazolium bromide | $CH_3-CO-NH-SO_2-(CH_2)_4-Br$ | 4h | 120° | nitromethane | — |
| 1A08-Q7 | 4-(N-methylsulfonyl carbamyl methyl)-6-carbethoxy-7-chloro-2,3-dihydro-1H-pyrrolo[1,2-a]benzimidazolium bromide | $CH_3-SO_2-NH-CO-CH_2-Br$ | 2h | 120° | + | 120-5° |
| 1A09-Q1 | 4-methyl-6-(pyrrolidino-sulfonyl)-2,3-dihydro-1H-pyrrolo[1,2-a]benzimidazolium iodide | $CH_3I$ | 6h | 95° | + | >270° |
| 1A09-Q2 | 4-ethyl-6-(pyrrolidino-sulfonyl)-2,3-dihydro-1H-pyrrolo[1,2-a]benzimidazolium iodide | $C_2H_5I$ | 16h | 105° | + | 220° |
| 1A10-Q2 | 4-ethyl-6-methyl-2,3-dihydro-1H-pyrrolo[1,2-a]benzimidazolium iodide | $C_2H_5I$ | 8h | 100° | nitromethane | 202° |
| 1A11-Q4 | 4-(β-carboxyethyl)-6-carbethoxy-7-bromo-2,3-dihydro-1H-pyrrolo[1,2-a]benzimidazolium bromide | $HOOC-(CH_2)_2-Br$ | 2h | 120° | + | — |
| 1A11-Q3 | 4-(γ-sulfatopropyl)-6-carbethoxy-7-bromo-2,3-dihydro-1H-pyrrolo[1,2-a]benzimidazolium betaine | 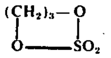 | 2h | 120° | + | — |
| 1A11-Q6 | 4-(ω-acetylsulfonamidobutyl)-6-carbethoxy-7-bromo-2,3-dihydro-1H-pyrrolo[1,2-a]benzimidazolium bromide | $CH_3-CO-NH-SO_2-(CH_2)_4-Br$ | 2h | 120° | + | 100° |
| 1A11-Q7 | 4-(N-methylsulfonyl carbamyl methyl)-6-carbethoxy-7-bromo-2,3-dihydro-1H-pyrrolo[1,2-a]benzimidazolium bromide | $CH_3-SO_2-NH-CO-CH_2-Br$ | 1h | 120° | + | >250° |
| 2A00-Q1 | 4-methyl-7-amino-2,3-dihydro-1H-pyrrolo[1,2-a]benzimidazolium iodide | $CH_3I$ | 15' | reflux temp. | methanol | 282° |
| 2A01-Q2 | 4-ethyl-6-bromo-7-cyano-2,3-dihydro-1H-pyrrolo[1,2-a]benzimidazolium iodide | $C_2H_5I$ | 16h | 110° | + | >250° |
| 2A02-Q2 | 4-ethyl-6-chloro-7-cyano-2,3-dihydro-1H-pyrrolo[1,2-a]benzimidazolium iodide | $C_2H_5I$ | 16h | 110° | + | >250° |
| 2A03-Q2 | 4-ethyl-6-fluoro-7-cyano-2,3-dihydro-1H-pyrrolo[1,2-a]benzimidazolium iodide | $C_2H_5I$ | 16h | 110° | + | 280° |
| 2A04-Q2 | 4-ethyl-7-cyano-2,3-dihydro-1H-pyrrolo[1,2-a]benzimidazolium iodide | $C_2H_5I$ | 8h | 110° | + | 242° |
| 2A04-Q3 | 4-(β-hydroxyethyl)-7-cyano-2,3-dihydro-1H-pyrrolo[1,2-a]benzimidazolium bromide | $HO-C_2H_4Br$ | 3h | 105° | + | 246° |
| 2A05-Q2 | 4-ethyl-7-chloro-2,3-dihydro-1H-pyrrolo[1,2-a]benzimidazolium iodide | $C_2H_5I$ | 5½h | 110° | + | 238° |
| 2A06-Q2 | 4-ethyl-7-fluoro-2,3-dihydro-1H-pyrrolo[1,2-a]benzimidazolium iodide | $C_2H_5I$ | 15h | 110° | + | 210° |
| 3A01-Q1 | 4-methyl-6-carboxy-2,3-dihydro-1H-pyrrolo[1,2-a]benzimidazolium iodide | $CH_3I$ | 15h | 100° | + | 304° |
| 3A02-Q1 | 4-methyl-8-carboxy-2,3-dihydro-1H-pyrrolo[1,2-a]benzimidazolium iodide | $CH_3I$ | 16h | 125° | + | 265° |
| 3A03-Q1 | 4-methyl-6-carboxy-7-chloro-2,3-dihydro-1H-pyrrolo[1,2-a]benzimidazolium iodide | $CH_3I$ | 17h | 125° | + | 270-2° |
| 4A01-Q2 | 4-ethyl-7-acetylamino-2,3-dihydro-1H-pyrrolo[1,2-a]benzimidazolium iodide | $C_2H_5I$ | 16h | 110° | + | 230° |
| 5A01-Q2 | 4-ethyl-6-cyano-2,3-dihydro-1H-pyrrolo[1,2-a]benzimidazolium iodide | $C_2H_5I$ | 16h | 105° | + | >250° |
| 5A01-Q3 | 4-(β-hydroxyethyl)-6-cyano-2,3-dihydro-1H-pyrrolo[1,2-a]benzimidazolium bromide | $HO-C_2H_4-Br$ | 15h | 125° | nitromethane | 207-9° |
| 5A01-Q7 | 4-(N-methyl sulfonylcarbamyl methyl)-6-cyano-2,3-dihydro-1H-pyrrolo[1,2-a]benzimidazolium bromide | $CH_3-SO_2-NH-CO-CH_2-Br$ | 3h | 125° | nitromethane | 200° |
| | 2. In the case A = $CH_2$ and p+n = 5 | | | | | |
| 0A03-Q1 | 5-methyl-1,2,3,4-tetrahydropyridino[1,2-a]benzimidazolium iodide | $CH_3I$ | 30' | reflux | acetone | 210° |
| 0A03-Q2 | 5-ethyl-1,2,3,4-tetrahydropyridino[1,2-a]benzimidazolium iodide | $C_2H_5I$ | 15h | 110° | + | 246° |

Table Q-continued

| Number of reference of the quaternary salt | Chemical name of the quaternary salt. | Formula of the quaternizing agent | Reaction time | Reaction temperature °C | Used diluent or sealed tube | Melting point of the quaternary salt °C |
|---|---|---|---|---|---|---|
| 0A03-Q8 | 5-(γ-sulfatopropyl)-1,2,3,4-tetrahydropyridino[1,2-a]benzimidazolium betaine | 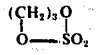 | 3h | reflux | acetone | 260° |
| 0A03-Q5 | 5-(ω-acetylsulfonamidopropyl)-1,2,3,4-tetrahydropyridino[1,2-a]benzimidazolium bromide | $CH_3—CO—NH—SO_2—(CH_2)_3—Br$ | 3h | reflux | acetone | >260° |
| 0A03-Q6 | 5-(ω-acetylsulfonamidobutyl)-1,2,3,4-tetrahydropyridino[1,2-a]benzimidazolium bromide | $CH_3—CO—NH—SO_2—(CH_2)_4—Br$ | 4h | reflux | acetone | 206–8° |
| 0A03-Q7 | 5-(N-methyl sulfonylcarbamyl methyl)-1,2,3,4-tetrahydropyridino[1,2-a]benzimidazolium bromide | $CH_3—SO_2—NH—CO—CH_2—Br$ | 5h | reflux | acetone | 238° |
| 1A12-Q2 | 5-ethyl-7-chloro-1,2,3,4-tetrahydropyridino[1,2-a]benzimidazolium iodide | $C_2H_5I$ | 15h | 110° | + | >250° |
| 1A12-Q4 | 5-(β-carboxyethyl)-7-chloro-1,2,3,4-tetrahydropyridino[1,2-a]benzimidazolium bromide | $HOOC—(CH_2)_2—Br$ | 16h | 120° | + | 228° |
| 1A12-Q8 | 5-(γ-sulfatopropyl)-7-chloro-1,2,3,4-tetrahydropyridino[1,2-a]benzimidazolium betaine | 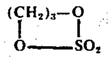 | 2h | 120° | + | >260°11 |
| 1A13-Q2 | 5-ethyl-7-fluoro-1,2,3,4-tetrahydropyridino[1,2-a]benzimidazolium iodide | $C_2H_5I$ | 15h | 110° | + | >250° |
| 1A14-Q2 | 5-ethyl-7,8-dichloro-1,2,3,4-tetrahydropyridino[1,2-a]benzimidazolium iodide | $C_2H_5I$ | 16h | 110° | + | >250° |
| 1A14-Q3 | 5-(β-hydroxyethyl)-7,8-dichloro-1,2,3,4-tetrahydropyridino[1,2-a]benzimidazolium bromide | $HO—C_2H_4—Br$ | 4h | 110° | + | >250° |
| 1A14-Q7 | 5-(N-methyl-sulfonylcarbamyl methyl)-7,8-dichloro-1,2,3,4-tetrahydropyridino[1,2-a]benzimidazolium bromide | $CH_3—SO_2—NH—CO—CH_2—Br$ | 3h | reflux | acetone | >260° |
| 1A15-Q2 | 5-ethyl-7-bromo-1,2,3,4-tetrahydropyridino[1,2-a]benzimidazolium iodide | $C_2H_5I$ | 15h | 110° | + | >250° |
| 1A16-Q2 | 5-ethyl-7-cyano-1,2,3,4-tetrahydropyridino[1,2-a]benzimidazolium iodide | $C_2H_5I$ | 15h | 100° | + | 306° |
| 1A17-Q2 | 5-ethyl-7-(1-piperidino sulphonyl)-1,2,3,4-tetrahydropyridino[1,2-a]benzimidazolium iodide | $C_2H_5I$ | 15h | 110° | + | >250° |
| 1A18-Q2 | 5-ethyl-7-trifluoromethyl-1,2,3,4-tetrahydropyridino[1,2-a]benzimidazolium iodide | $C_2H_5I$ | 3h | 100° | nitro methane | 260° |
| 1A18-Q1 | 5-methyl-7-trifluoromethyl-1,2,3,4-tetrahydropyridino[1,2-a]benzimidazolium iodide | $CH_3I$ | 1h30' | reflux | acetone | 270° |
| 1A19-Q2 | 5-ethyl-8-chloro-1,2,3,4-tetrahydropyridino[1,2-a]benzimidazolium iodide | $C_2H_5I$ | 15h | 110° | + | 250° |
| 2A07-Q2 | 5-ethyl-7-bromo-8-cyano-1,2,3,4-tetrahydropyridino[1,2-a]benzimidazolium iodide | $C_2H_5I$ | 16h | 110° | + | >300° |
| 2A08-Q2 | 5-ethyl-7-chloro-8-cyano-1,2,3,4-tetrahydropyridino[1,2-a]benzimidazolium iodide | $C_2H_5I$ | 15h | 110° | + | >250° |
| 2A09-Q2 | 5-ethyl-7-fluoro-8-cyano-1,2,3,4-tetrahydropyridino[1,2-a]benzimidazolium iodide | $C_2H_5I$ | 15h | 110° | + | >250° |
| 2A10-Q2 | 5-ethyl-8-cyano-1,2,3,4-tetrahydropyridino[1,2-a]benzimidazolium iodide | $C_2H_5I$ | 15h | 110° | + | >260° |
| 6A01-Q1 | 5-methyl-6,11-dihydro-benzimidazolo[1,2-b]isoquinolinium iodide | $CH_3I$ | 4h | 95° | + | 260° |
| 7A01-Q2 | 5,7-diethyl-1,2,3,4,8,9,10,11-octahydrodipyridino[1,2-a:1',2'-a']benzo[1,2-d:5,4-d']diimidazolium diiodide | $C_2H_5I$ | 16h | 110° | + | >260° |
| | 3. In the case A = oxygen atom and p+n = 5 | | | | | |
| 1A20-Q2 | 8-chloro-10-Ethyl-3,4-dihydro-1H-1,4-oxazino[4,3-a]-benzimidazolium iodide. | $C_2H_5I$ | 16h | 110° | + | 186° |
| 1A21-Q2 | 8-cyano-10-ethyl-3,4-dihydro-1H-1,4-oxazino[4,3-a]benzimidazolium | $C_2H_5I$ | 15h | 100° | + | 200–10° |

Table Q-continued

| Number of reference of the quaternary salt | Chemical name of the quaternary salt. | Formula of the quaternizing agent | Reaction time | Reaction temperature °C | Used diluent or sealed tube | Melting point of the quaternary salt °C |
|---|---|---|---|---|---|---|
| | iodide | | | | | |
| 1A22-Q2 | 7,8-dichloro-10-ethyl-3,4-dihydro-1H-1,4-oxazino[4,3-a]-benzimidazolium iodide | $C_2H_5I$ | 16h | 110° | + | 202–5° |
| 2A11-Q1 | 7-cyano-8-chloro-10-methyl-3,4-dihydro-1H-1,4-oxazino[4,3-a]benzimidazolium iodide | $CH_3I$ | 4h | 110° | + | 170° |
| 2A11-Q2 | 7-cyano-8-chloro-10-ethyl-3,4-dihydro-1H-1,4-oxazino[4,3-a]benzimidazolium iodide | $C_2H_5I$ | 16h | 110° | + | — |

The following detailed examples illustrate the way of obtaining the methine dyes according to this invention, without however, limiting the scope thereof.

Methine dyes which are prepared analogously to the detailed examples are given in table M. The dyes have a reference number which is composed of the number of the example followed by their serial number.

In the table are given: the reference number of the dye, its structural formula, the reference number of the starting quaternary salt, the melting point of the obtained dye, the absorption maximum and the value of log ε of the dye.

EXAMPLE 1

The methine dye 01-00 of the formula:

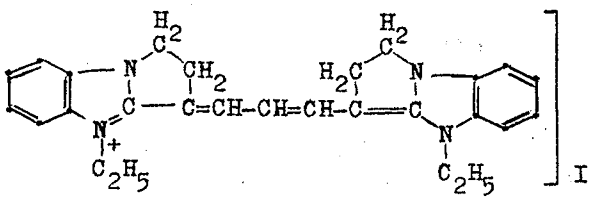

is prepared as follows:

6.3 g of 4-ethyl-2,3-dihydro-1H-pyrrolo[1,2-a]benzimidazolium iodide (0A01-Q2), 7 cm3 of 1,3,3-triethoxy-1-propene and 20 cm3 of nitrobenzene are refluxed for 5 min. After cooling, the dye is precipitated with ether. The precipitate is sucked off and recrystallized four times from ethanol. Melting point: 197°C. Absorption maximum: 596 mμ.

EXAMPLE 2

The methine dye (0.2–00) of the formula

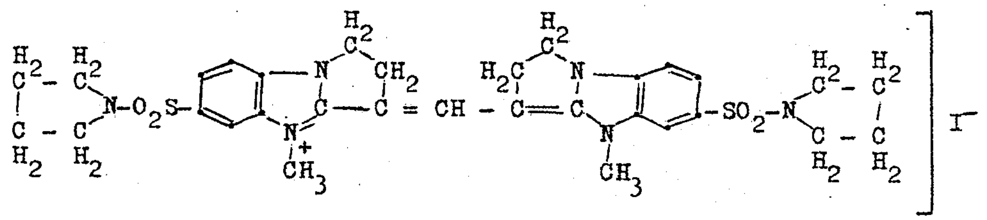

is prepared as follows:

To a solution of 4.9 g of 4-methyl-6-pyrrolidinosulfonyl-2,3-dihydro-1H-pyrrolo[1,2-a]benzimidazolium iodide (1A09-Q1) in 25 cm3 of nitrobenzene 3.5 cm3 of ethylorthoformate are added. The mixture is boiled for 2 h. The dye, which crystallizes on cooling, is purified by recrystallization from dimethylformamide. Melting point: 320°C. Absorption maximum: 530 mμ. Log. ε: 5.32.

EXAMPLE 3

The methine dye (03–00) of the formula:

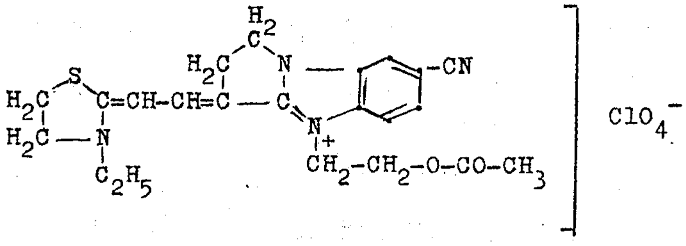

is prepared as follows:

To 3.1 g of 2-(β-anilinovinyl)-3-ethyl-thiazolinium bromide and 3.1 g of 4-(β-hydroxyethyl)-7-cyano-2,3-dihydro-1H-pyrrolo [1,2-a]benzimidazolium bromide (2A04-Q3) in 20 cm3 of acetic anhydride 2.8 cm3 of triethylamine are added and the reaction mixture refluxed for 15 min. After cooling the dye is precipitated with ether and converted into the perchlorate with sodium perchlorate. The dye is recrystallized twice from ethanol. Melting point: 174°C. Absorption maximum: 476 mμ. Log. ε: 5.12.

EXAMPLE 4

The methine dye (04-00) of the formula:

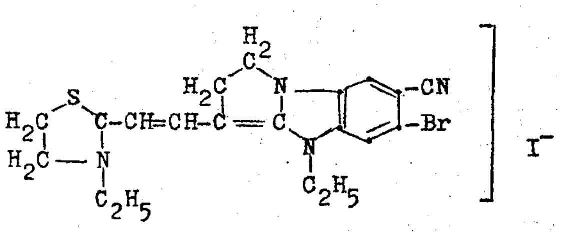

is prepared as follows:

2.1 g of 4-ethyl-6-bromo-7-cyano-2,3-dihydro-1H-pyrrolo[1,2-a]benzimidazolium iodide (2A01-Q2), 1.6 g of 2(β-anilinovinyl)-3-ethylthiazolinium bromide dissolved in 25 cm3 of acetic anhydride and 1.4 cm3 of triethylamine are refluxed for 2 h. After cooling, the dye is sucked off and recrystallized twice from methanol. Melting point: >260°C. Absorption maximum: 480 mμ. Log. ε: 6.135.

EXAMPLE 5

The methine dye (05-00) of the formula:

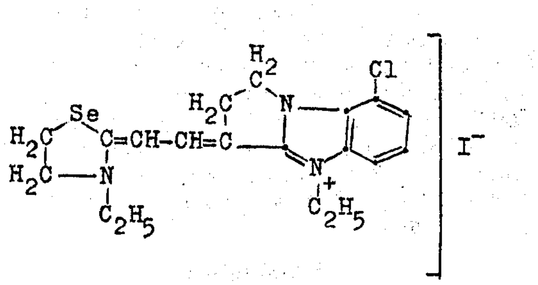

is prepared as follows:

A solution of 4.35 g of 4-ethyl-8-chloro-2,3-dihydro-1H-pyrrolo[1,2-a]benzimidazolium iodide (1A02-Q2) and 5.60 g of 2-acetanilidovinyl-3-ethyl selenazolinium iodide in 30 cm3 of acetic anhydride is refluxed for 5 min with 3.2 cm3 of triethylamine. The dyestuff crystallizes on cooling and is purified by recrystallization from ethanol. Melting point: 285°C. Absorption maximum: 462 mμ. Log. ε: 5.13.

EXAMPLE 6

The methine dye (06-00) of the formula:

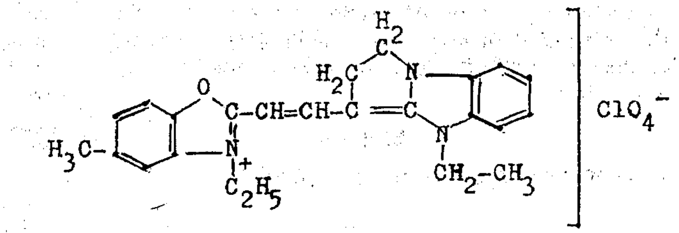

is prepared as follows:

To 2.8 g of 2-(β-phenyliminoethylidene)-3-ethyl-5-methyl-2,3-dihydrobenzoxazole and 3.15 g of 4-ethyl-2,3-dihydro-1H-pyrrolo[1,2-a]benzimidazolium iodide (0A01-Q2) in 30 cm3 of acetic anhydride, 2.8 cm3 of triethylamine are added. This reaction mixture is refluxed for 45 min. After cooling, the dye is precipitated with ether and converted into the iodide which is purified by recrystallizing twice from ethanol. Melting point: above 250°C. Absorption maximum: 470 mμ. Log. ε: 4.99.

EXAMPLE 7

The methine dye (0.7-00) of the formula:

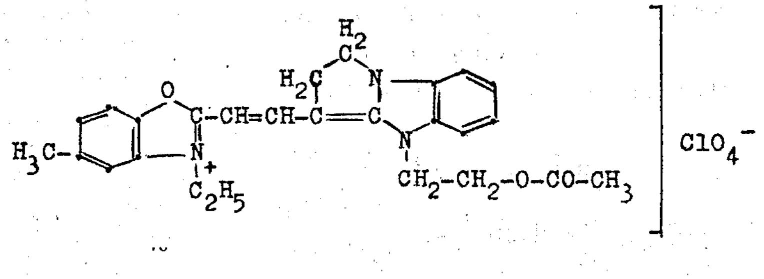

is prepared as follows:

To 5.6 g of 2-(β-phenyliminoethylidene)-3-ethyl-5-methyl-2,3-dihydrobenzoaxazole and 5.6 g of 4-(β-hydroxyethyl)-2,3-dihydro-1H-pyrrolo[1,2-a]benzimidazolium bromide (0A010A -Q3) in 50 cm3 of acetic anhydride, 5.6 cm3 of triethylamine are added with stirring. Stirring is continued for 2 h at room temperature and for 15 min at reflux. After cooling, the dye is precipitated with ether and converted into the perchlorate. The dye is recrystallized three times from ethanol. Melting point above 250°C. Absorption maximum: 474 mμ. Log. ε: 5.07.

EXAMPLE 8

The methine dye (08-00) of the formula:

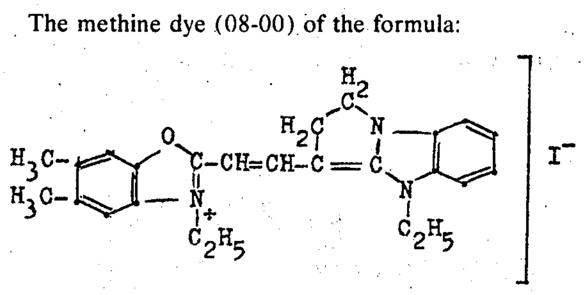

is prepared as follows:

To 2.9 g of 2-(β-phenyliminoethylidene)-3-ethyl-5,6-dimethyl-2,3-dihydrobenzoxazole and 3.15 g of 4-ethyl-2,3-dihydro-1H-pyrrolo[1,2-a]benzimidazolium iodide (0A01-Q2) in 30 cm3 of acetic anhydride are added 2.8 cm3 of triethylamine with stirring. Stirring is continued for 1 h at room temperature and for 15 min at reflux temperature. After cooling and precipitating with ether, the crude dye is recrystallized from ethanol. Melting point: 169°C. Absorption maximum: 476 mμ. Log ε: 5.08.

EXAMPLE 9

The methine dye (09-00) of the formula:

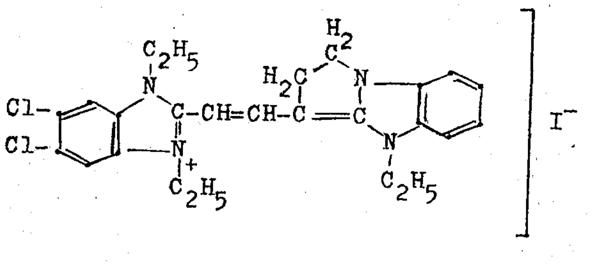

is prepared as follows:

6.8 g of 1-ethyl-2-(N-p-tolusulphonyl-β-anilinovinyl)-3-ethyl-5,6-dichlorobenzimidazolium chloride, 3.9 g of 4-ethyl-2,3-dihydro-1H-pyrrolo[1,2-a]benzimidazolium iodide (0A01-Q2), 30 cm3 of pyridine and 3.5 cm3 of triethylamine are refluxed for 2 h. The dye is precipitated with ether and purified by recrystallization from a mixture of ethylene glycol monomethyl ether and water. Melting point above 250°C. Absorption maximum: 504 mμ. Log. ε: 5.20.

EXAMPLE 10

The methine dye (10-00) of the formula:

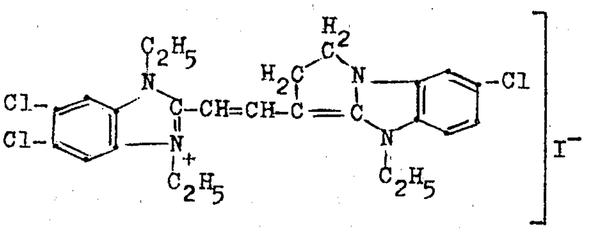

is prepared as follows:

2.5 g of 1-ethyl-2-(N-p-tolusulfonyl-β-anilinovinyl)-3-ethyl-5,6-dichlorobenzimidazolium chloride, 1.5 g of 4-ethyl-7-chloro-2,3-dihydro-1H-pyrrolo[1,2-a ]benzimidazolium iodide (2A05-Q2), 10 cm3 of nitrobenzene and 1.2 cm3 of triethylamine are refluxed for 15 min. After cooling, the dye is precipitated with ether and recrystallized twice from ethanol. Melting point: above 250°C. Absorption maximum: 506 mμ. Log. ε: 5.24.

EXAMPLE 11

The methine dye (11-00) of the formula:

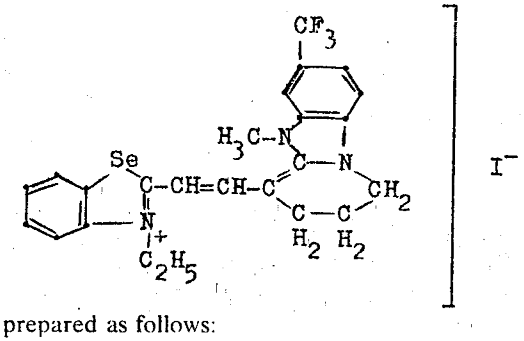

is prepared as follows:

A mixture of 3.8 g of 5-methyl-7-trifluoromethyl-1,2,3,4-tetrahydropyridino[1,2-a]-benzimidazolium iodide (1A18-Q1), 3.3 g of 2-(β-phenylimino-ethylidene)-3-ethyl-2,3-dihydrobenzoselenazole, 25 cm3 of acetic anhydride and 1.4 cm3 of triethylamine is heated for 5 min on a water-bath at 60°C. After cooling, the formed dyestuff is sucked off and three times recrystallized from ethylene glycol monomethyl ether. Melting point: 268°C. Absorption maximum: 512 mμ. Log. ε = 5.024.

EXAMPLE 12

The methine dye (12-00) of the formula:

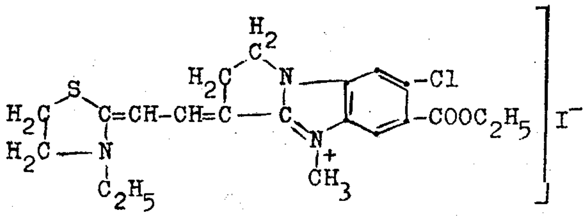

is prepared as follows:

To a solution of 4.06 g of 4-methyl-6-carbethoxy-7-chloro-2,3-dihydro-1H-pyrrolo[1,2-a]benzimidazolium iodide (1A08-Q1) and 3.55 g of 2-(β-acetanilidovinyl)-3-ethylthiazolinium bromide in 60 cm3 of absolute ethanol, 1.4 cm3 of triethylamine are dropwise added at the reflux temperature. The reaction mixture is refluxed for 20 min. After cooling the formed dyestuff is sucked off and washed with water, ethanol and ether. Thereupon the dyestuff is recrystallized from methanol. Melting point: >270°C. Absorption maximum: 470 mμ. Log. ε : 5.145

EXAMPLE 13

The methine dye (13-00) of the formula:

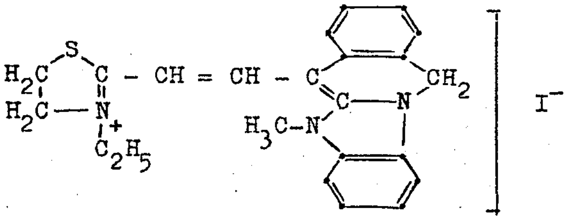

is prepared as follows:

A mixture of 3.62 g of 5-methyl-6,11-dihydrobenzimidazolo [1,2-b]isoquinolinium iodide (6A01-Q1), 3.55 g of 2-(β-acetanilidovinyl)-3-ethylthiazolinium bromide, 25 cm3 of dimethyl formamide and 1.4 cm3 of triethylamine is refluxed for 5 minutes. After cooling the reaction mixture is filtered and the filtrate is diluted with ether whereby the dyestuff precipitates. The dyestuff is sucked off and washed with water and ethanol whereupon it is recrystallized four times from ethanol. Melting point: 275°C. Absorption maximum: 456 mμ. Log. ε : 4.796.

EXAMPLE 14

The methine dye (14-00) of the formula:

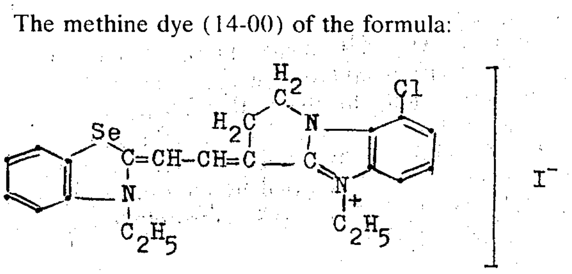

is prepared as follows:

A solution of 5.25 g of 4-ethyl-8-chloro-2,3-dihydro-1H-pyrrolo[1,2-a]benzimidazolium iodide (1A02-Q2) and 4.9 g of 2-(β-phenylimino-ethylidene)-3-ethyl-2,3-dihydro-benzoselenazole in 30 cm3 of acetic anhydride is refluxed for 3 min with 3.2 cm3 of triethylamine. The dyestuff, which crystallizes on cooling, is sucked off and recrystallized from dimethylformamide. Melting point: 290°C. Absorption maximum: 506 mμ. Log. ε : 5.01.

EXAMPLE 15

The methine dye (15-00) of the formula:

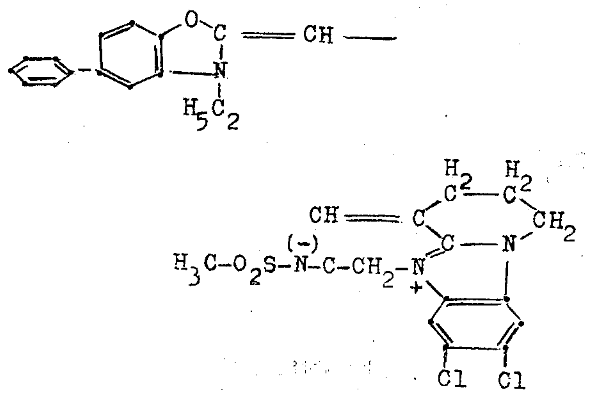

is prepared as follows:

A mixture of 4.56 g of 5-(N-methylsulfonyl-carbamyl methyl)-7,8-dichloro-1,2,3,4-tetrahydropyridino[1,2-a] benzimidazolium bromide (1A14-Q7), 3,4 g of 2-(β-phenyliminoethylidene)-3-ethyl-5-phenyl-2,3-dihydrobenzoxazole, 40 cm3 of dimethyl formamide and 1.4 cm3 of triethyl amine is heated at boiling temperature for 10 sec. whereupon 5 cm3 of acetic anhydride are added. Refluxing is continued for 4 minutes. After cooling, the formed dyestuff is sucked off, washed with water, ethanol and ether and then recrystallized twice from a mixture of phenol and ethanol. Melting point: >260°C. Absorption maximum: 495 mμ. Log ε: 4.956.

EXAMPLE 16

The methine dye (16-00) of the formula:

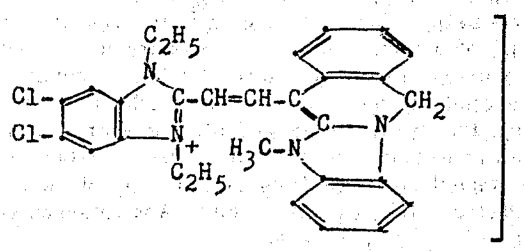

is prepared as follows:

A mixture of 2.75 g of 5-methyl-6,11-dihydrobenzimidazolo [1,2-b]isoquinolinium iodide (6A01-Q1), 1.81 g of 1,3-diethyl-5,6-dichloro-2-[β-(p-tolusulfanilido)vinyl] benzimidazolium chloride, 75 cm3 of methanol and 1.4 cm3 of triethylamine is refluxed for 5 min. After cooling the formed dyestuff is sucked off, washed with ethanol and ether and twice recrystallized from ethylene glycol monomethyl ether. Melting point: > 270°C. Absorption maximum: 502 mμ. Log ε : 4.960.

EXAMPLE 17

The methine dye (17-00) of the formula:

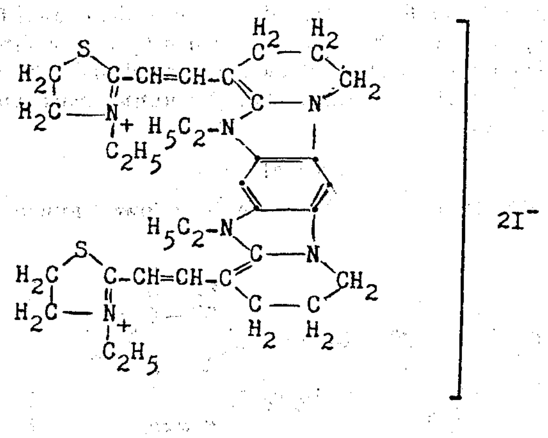

is prepared as follows:

1.73 g of 5,7-diethyl-1,2,3,4,8,9,10,11-octahydrodipyridino[1,2-a:1', 2'-a']benzo[1,2-d:5,4-d']-diimidazolium diiodide (7A01-Q2), 1.9 g of 2-(β-anilinovinyl)-3-ethylthiazolinium bromide dissolved in 20 cm3 of acetic anhydride and 1.7 cm3 of triethylamine are refluxed for 45 minutes. After cooling, the dyestuff is precipitated with ether and purified by recrystallization from ethanol. Melting point: > 320°C. Absorption maximum: 548 mμ. Log ε : 5.30.

EXAMPLE 18

The methine dye (18-00) of the formula:

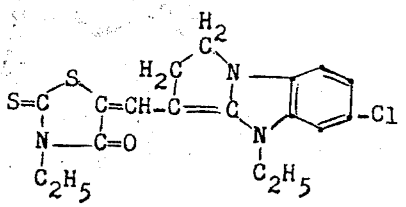

is prepared as follows:

A mixture of 3.5 g of 4-ethyl-6-chloro-2,3-dihydro-1H-pyrrolo[1,2-a]a]benzimidazolium iodide (1A01-Q2), 3.1 g of 3-ethyl-5-acetanilidomethylene-2-thio-2,4-thiazolidinedione, 25 cm3 of pyridine and 2.8 cm3 of triethylamine is refluxed for 1 h. After cooling, the dyestuff is precipitated with water, sucked off and recrystallized from ethylene glycol monomethyl ether. Melting point: 294°C. Absorption maximum: 524 mμ. Log.ε : 4.95

EXAMPLE 19

The methine dye (19-00) of the formula:

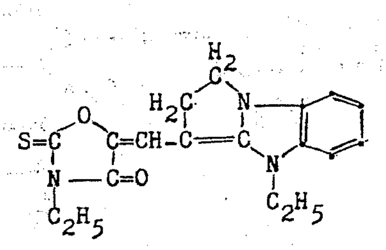

is prepared as follows:

3.14 g of 4-ethyl-2,3-dihydro-1H-pyrrolo[1,2-a]benzimidazolium iodide (0A01-Q2), 2.9 g of 3-ethyl-5-acetanilidomethylene-2-thio-2,4-oxazolidine dione, 25 cm3 of methyl carbitol and 2.8 cm3 of triethylamine are refluxed for 20 min. After cooling, the dyestuff is precipitated with water and purified by recrystallization from a mixture of methyl carbitol and ethanol (1:1). Melting point: 160°C. Absorption maximum: 498 mμ.

EXAMPLE 20

The methine dye (20-00) of the following formula:

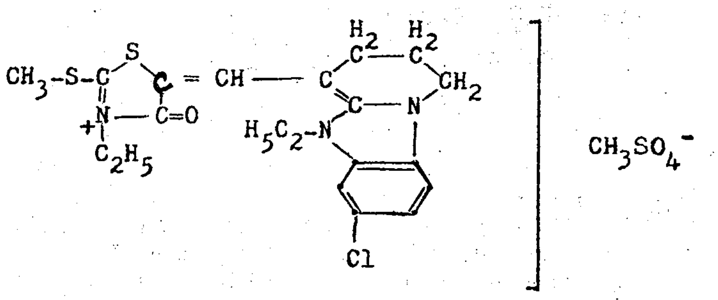

is prepared as follows:

1.8 g of 2-thio-3-ethyl-5-[4(5-ethyl-7-chloro-1,2,3,4-tetrahydropyridino[1,2-a]benzimidazol-yl)-methylidene]-2,4-thiazolidine dione (18-12) are dissolved in 150 cm3 of water-free benzene, 0.58 cm3 of dimethyl sulfate is added and the reaction mixture is refluxed for 4 h on an oil-bath at 120°C. The quaternized merocyanine dye crystallizes on cooling. The dye is sucked off and washed with ether. Melting point: 180°C. Absorption maximum: 526 mμ.

EXAMPLE 21

The methine dye (21-00) of the following formula:

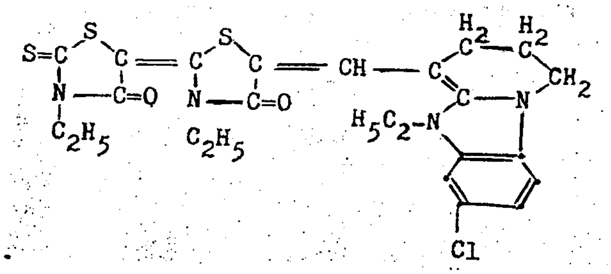

is prepared as follows:

1.7 g of the quaternized merocyanine dye obtained according to example 20, 0.6 g of 3-ethyl-2-thio-2,4-thiazolidine dione, 20 cm3 of pyridine and 0.5 cm3 of triethylamine are refluxed for 2 to 3 minutes. Thereupon 15 cm3 of pyridine are added and the reaction mixture is allowed to cool. The formed dyestuff is sucked off and washed with ethanol and ether. The crude dyestuff is recrystallized three times from pyridine, once from a mixture of dimethyl formamide and n-propanol and once from ethylene glycol monomethyl ether. Melting point: >260°C. Absorption maximum: 592 mμ. Log. ε : 5.124.

EXAMPLE 22

The methine dye (22-00) of the following formula:

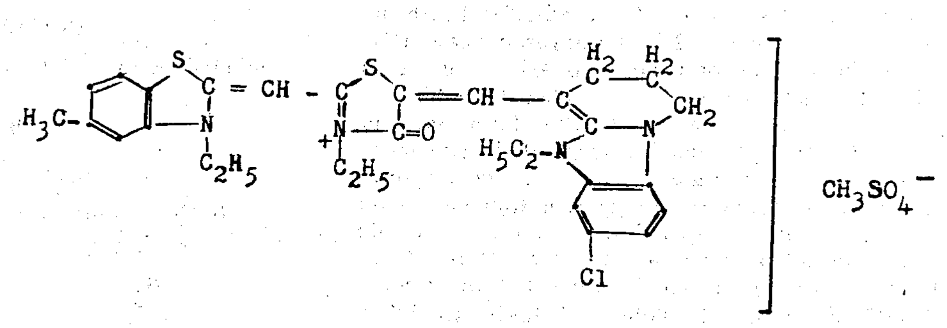

is prepared as follows:

0.53 g of the quaternized merocyanine dye obtained according to example 20 and 0.31 g of 2,5-dimethyl-3-ethylbenzothiazolium methyl sulfate are suspended in 15 cm3 of pyridine and 0.14 cm3 of triethyl amine. This reaction mixture is refluxed for 2 to 3 minutes. The dyestuff crystallizes during the refluxing. After cooling, the dyestuff is sucked off and washed with ethanol and ether. The dyestuff is first recrystallized from ethanol and then from ethylene glycol monomethyl ether. Melting point: > 260°C. Absorption maximum: 605 mμ. Log. ε : 4.943.

EXAMPLE 23

The methine dye (23-00) of the following formula:

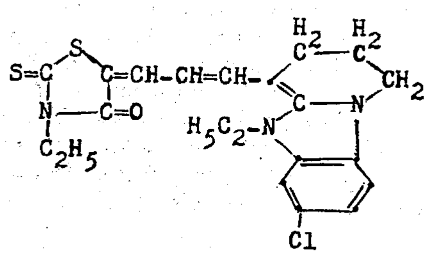

is prepared as follows:

3.32 g of 3-ethyl-5-(ω-acetanilidopropenylidene)-2-thio-2,4-thazolidine dione and 3.625 g of 5-ethyl-7-chloro-1,2,3,4-tetrahydropyridino[1,2-a]benzimidazolium iodide (1A12-Q2) are dissolved in 70 cm3 of dimethyl sulfoxide without boiling the mixture. Then 1.4 cm3 of triethylamine are added and the mixture is heated for 2 h on a water-bath of 90°C. Thereupon the reaction mixture is cooled in an acetone-ice bath until the dimethyl sulfoxide solidifies. Then 210 cm3 of water are added and the mixture is kept overnight in a refrigerator. The solid product is sucked off and twice washed with boiling petroleum naphtha (boiling range: 90°–120°C). The washed product is boiled in 100 cm3 of water and recrystallized from ethanol. Melting point: decomposition. Absorption maximum: 615 mμ.

EXAMPLE 24

The methine dye (24-00) of the following formula:

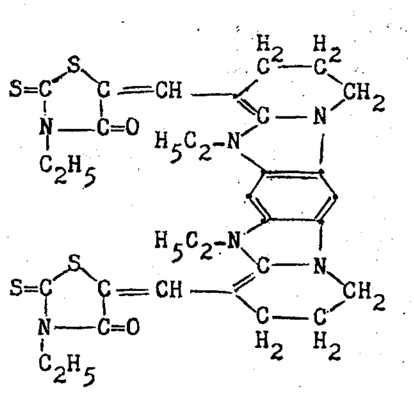

is prepared as follows:

2.89 g of 5,7-diethyl-1,2,3,4,8,9,10,11-octahydrodipyridino-[1,2-a:1',2'-a']benzo[1,2-d:5,4-d']-diimidazolium diiodide (7A01-Q2) are dissolved in 80 cm3 of dimethyl sulfoxide without boiling. Then 3.06 g of 3-ethyl-5-acetanilidomethylene-2-thio-2,4-thiazolidine dione and 2.8 cm3 of triethylamine are added. This mixture is heated for 3 h on a water-bath of 95°C whereupon 1.4 cm3 of triethylamine are added and heating is continued for two hours. 100 cm3 of methanol are added to the solution whilst warm. After the formed dyestuff is sucked off, and washed several times with methanol, once with ethanol and once with petroleum naphtha, the dyestuff is recrystallized twice from a mixture of phenol and methanol. Melting point: >260°C. Absorption maximum: 620 mμ. Log ε : 5.460.

EXAMPLE 25

The methine dye (25-00) of the formula:

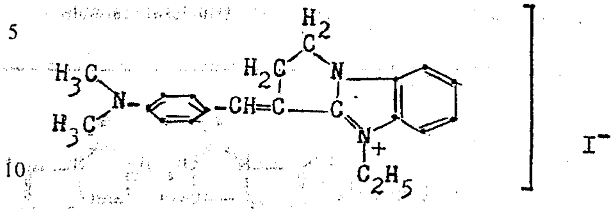

is prepared as follows:

To 1.5 g of dimethylaminobenzaldehyde and 3.14 g of 4-ethyl-2,3-dihydro-1H-pyrrolo[1,2-a]benzimidazolium iodide (0A01-Q2) in acetic anhydride, 2.8 cm3 of triethylamine are added whereupon the mixture is refluxed for 15 min. The dye which crystallizes out on cooling is purified by recrystallizing twice from ethanol. Melting point: 270°C. Absorption maximum: 429 mμ. Log ε : 4.13.

EXAMPLE 26

The methine dye (26-00) of the following formula:

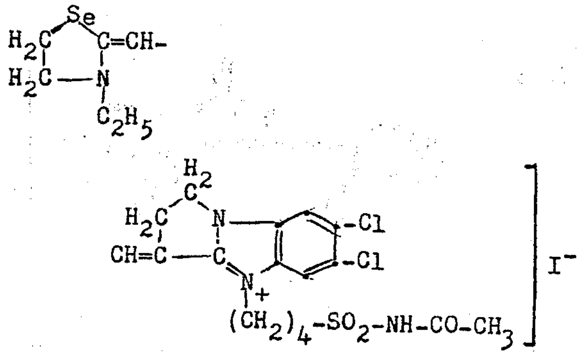

is prepared as follows:

4.85 g of 4-(ω-acetylsulfonamidebutyl)-6,7-dichloro-2,3-dihydro-1H-pyrrolo[1,2-a]benzimidazolium bromide (1A03-Q6) are dissolved in 125 cm3 of 1-methoxy-2-(2-hydroxyethoxy)-ethane (methylcarbitol). The solution is heated to 100°C and at this temperature 4.49 g of 2-(β-acetanilidovinyl)-3-ethylselenazolium iodide and then 2.8 cm3 of triethylamine are added. The reaction mixture is kept for 10 minutes at 100°C whereupon it is cooled. The dyestuff is precipitated by adding 200 cm3 of ether. Thereupon the ether is decanted and the crude dyestuff is washed with methanol. Finally the dyestuff is recrystallized twice from dimethyl formamide. Melting point: >260°C. Absorption maximum: 478 mμ.

Table M

| Number of reference of the methine dye | Stiuctural formula | Number of reference of the quaternary salt | Melting point °C | Absorption max. mu | log ε |
|---|---|---|---|---|---|
| 02-01 | 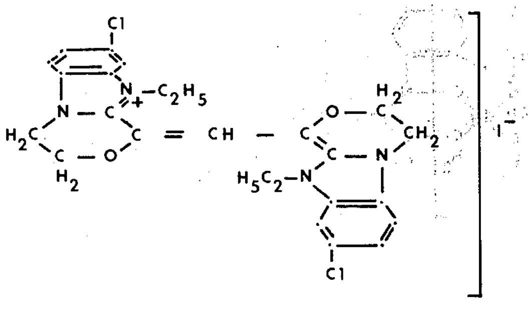 | 1A20-Q2 | 238 | 528 | - |

Table M—Continued
| Number of reference of the methine dye | Structural formula | Number of reference of the quaternary salt | Melting point °C | Absorption max. mu | log ε |
| --- | --- | --- | --- | --- | --- |
| 02-02 | 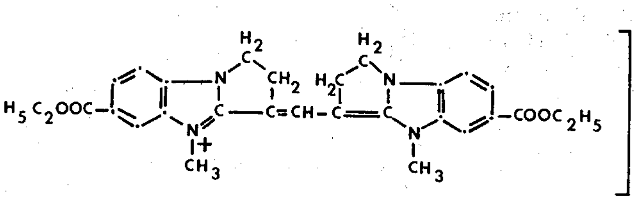 $I^-$ | 1A06-Q1 | 260 | 532 | — |
| 02-03 | 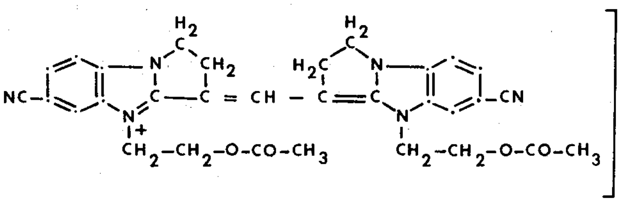 $Br^-$ | 5A01-Q3 | 220-24 | 537 | 4.97 |
| 04-01 | 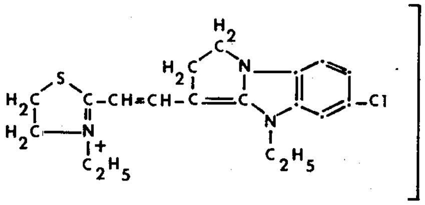 $I^-$ | 1A01-Q2 | >250 | 462 | 5.03 |
| 04-02 | 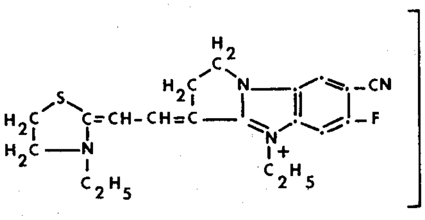 $I^-$ | 2A01-Q2 | 302 | 474 | 5.09 |
| 04-03 | 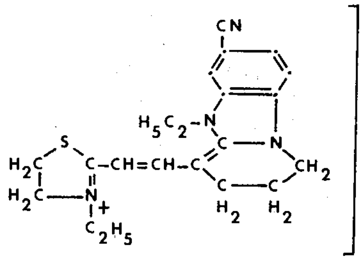 $I^-$ | 1A16-Q2 | ± 270 | 474 | 5.034 |
| 04-04 | 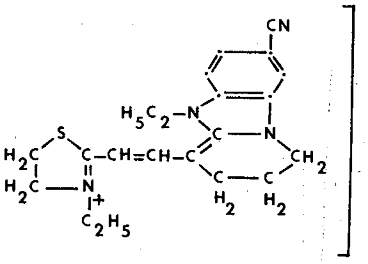 $I^-$ | 2A10-Q2 | >260 | 472 | 5.01 |

Table M—Continued
| Number of reference of the methine dye | Structural formula | Number of reference of the quaternary salt | Melting point °C | Absorption max. mu | log ε |
|---|---|---|---|---|---|
| 04-05 | 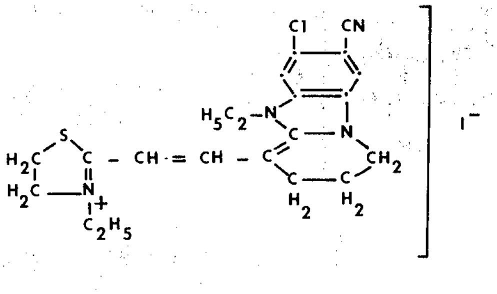 | 2A03-Q2 | >250 | 480 | 5.08 |
| 04-06 | 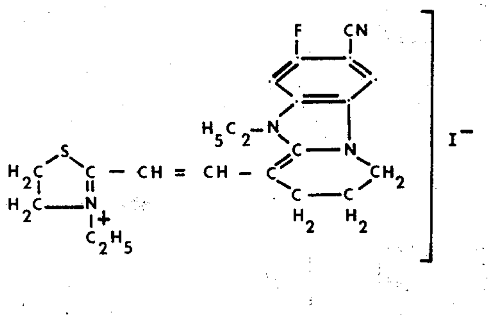 | 2A09-Q2 | >250 | 480 | 5.10 |
| 04-07 | 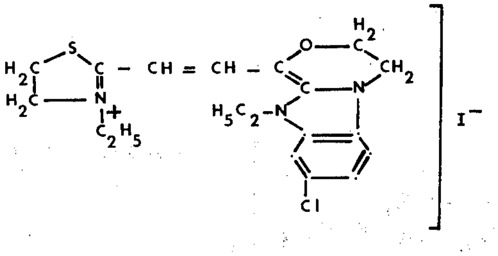 | 1A20-Q2 | 240 | 483 | 4.95 |
| 04-08 | 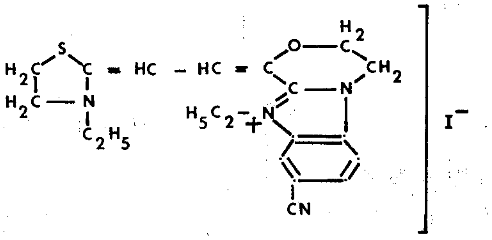 | 1A21-Q2 | >250 | 500 | 5.058 |
| 04-09 | 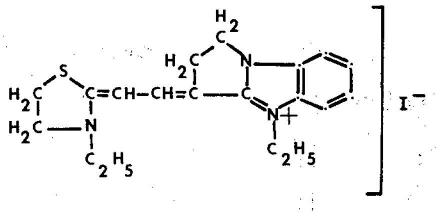 | 0A01-Q2 | >250 | 454 | 4.95 |
| 04-10 | 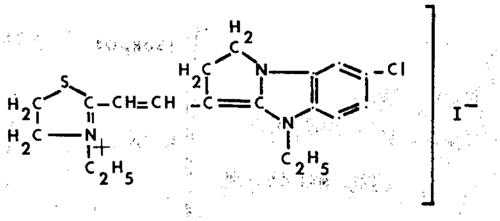 | 2A05-Q2 | >250 | 465 | 5.03 |

Table M—Continued
| Number of reference of the methine dye | Structural formula | Number of reference of the quaternary salt | Melting point °C | Absorption max. mu | log ε |
|---|---|---|---|---|---|
| 04-11 | 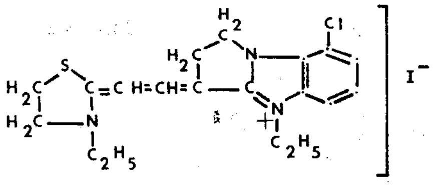 | 1A02-Q2 | 291-2 | 463 | 4.962 |
| 04-12 | 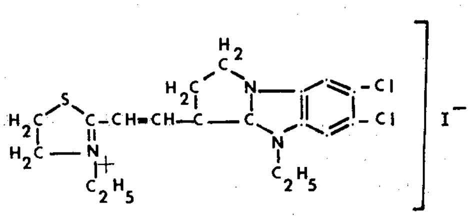 | 1A03-Q2 | >260 | 468 | 5.206 |
| 04-13 | 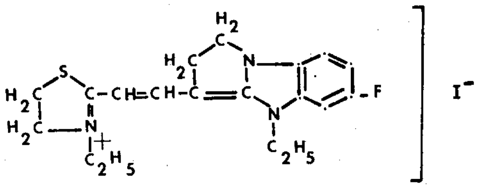 | 1A04-Q2 | >260 | 458 | 4.991 |
| 04-14 | 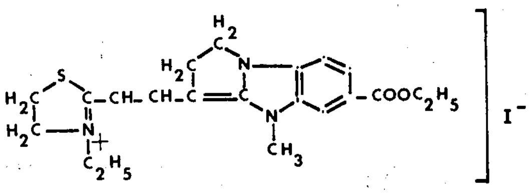 | 1A06-Q1 | >260 | 466 | 5.088 |
| 04-15 | 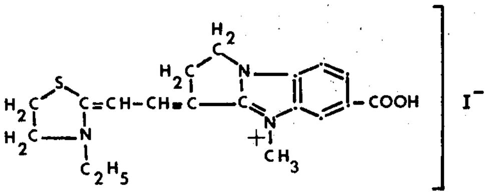 | 3A01-Q1 | >270 | 468 | 5.030 |
| 04-16 | 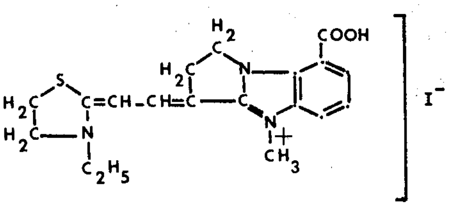 | 3A02-Q1 | >270 | 470 | 5.006 |
| 04-17 | 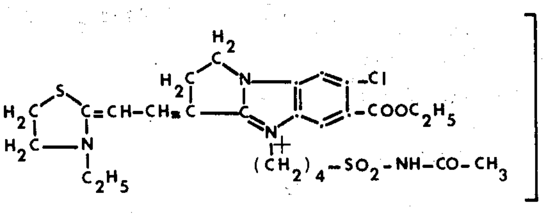 | 1A08-Q6 | >260 | 474 | 5.025 |

Table M–Continued
| Number of reference of the methine dye | Structural formula | Number of reference of the quaternary salt | Melting point °C | Absorption max. mu | log ε |
|---|---|---|---|---|---|
| 04 - 18 | 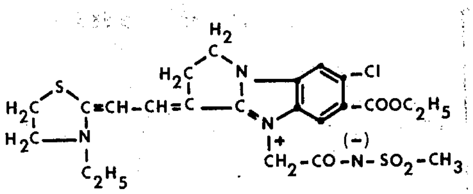 | 1A08-Q7 | > 260 | 480 | 5.075 |
| 04 - 19 | 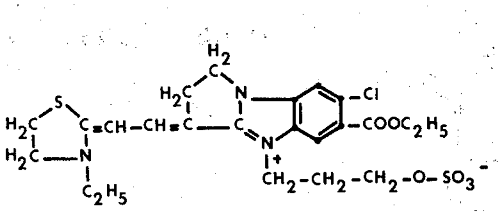 | 1A08-Q8 | > 260 | 477 | 4.917 |
| 04 - 20 | 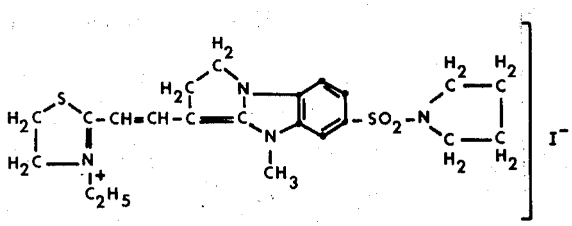 | 1A09-Q1 | >250 | 468 | 5.009 |
| 04–21 | 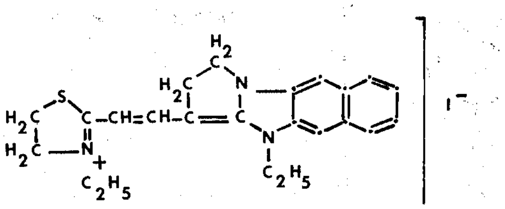 | 0A02–Q2 | > 250 | 478 | 5.14 |
| 04–22 | 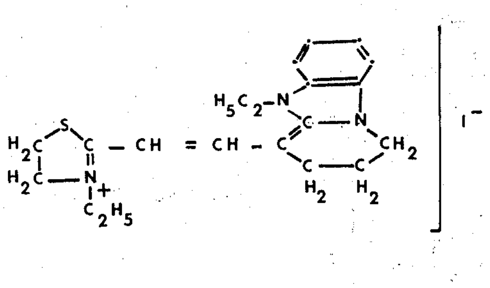 | 0A03–Q2 | > 250 | 458 | 4.95 |
| 04–23 | 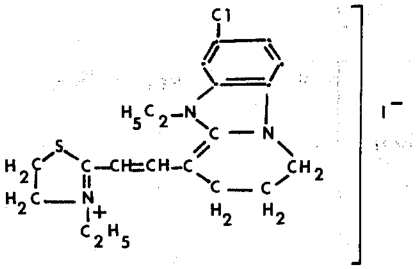 | 1A12–Q2 | 240 | 466 | 4.91 |

Table M– Continued
| Number of reference of the methine dye | Structural formula | Number of reference of the quaternary salt | Melting point °C | Absorption max. mu | log ε |
|---|---|---|---|---|---|
| 04–24 | 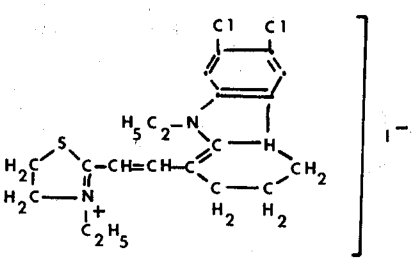 | 1A 14–Q2 | >260 | 470 | 5.241 |
| 04–25 | 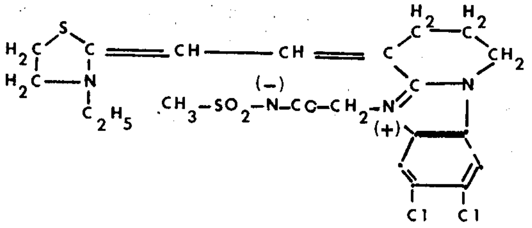 | 1A14–Q7 | >260 | 481 | – |
| 04–26 | 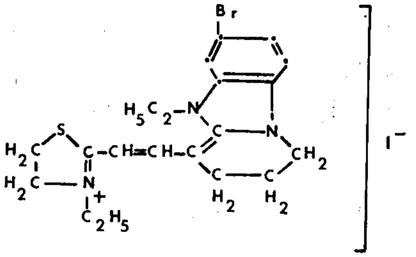 | 1A15–Q2 | > 260 | 468 | 4.982 |
| 04–27 | 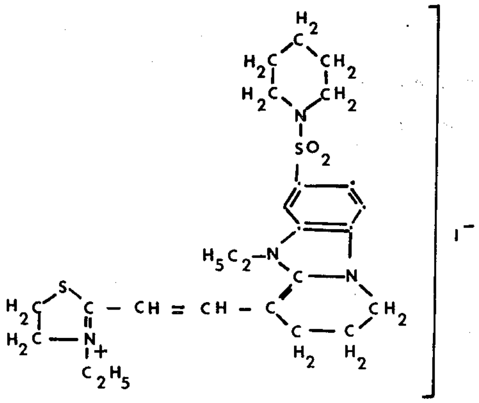 | 1A17–Q2 | >250 | 472 | 5.155 |
| 04–28 | 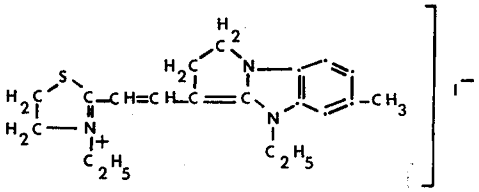 | 1A10–Q2 | >260 | 458 | 4.93 |
| 04–29 | 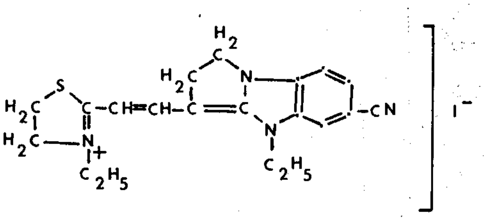 | 5A01–Q2 | 281 | 474 | 5.068 |

Table M–Continued
| Number of reference of the methine dye | Structural formula | Number of reference of the quaternary salt | Melting point °C | Absorption max. mu | log ε |
|---|---|---|---|---|---|
| 04–30 | 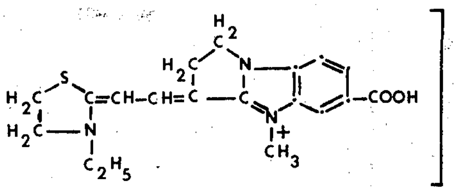 I⁻ | 3A03–Q1 | >250 | 470 | 5.10 |
| 04–31 | 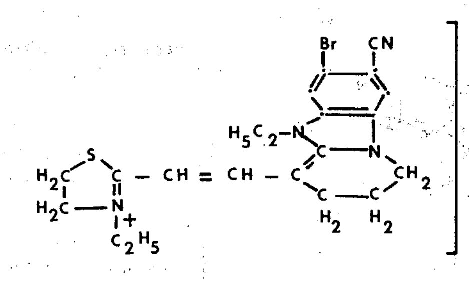 I⁻ | 2A07–Q2 | 292 | 480 | 5.111 |
| 04–32 | 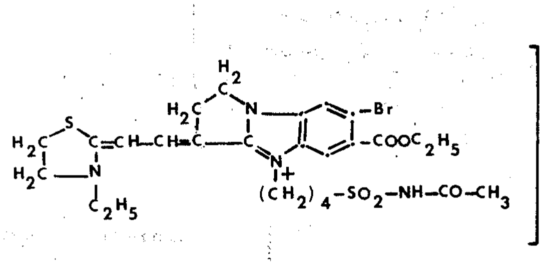 Br⁻ | 1A11–Q6 | >250 | 474 | 5.070 |
| 04–33 | 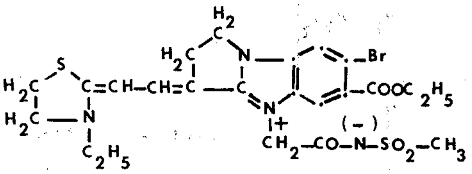 | 1A11–Q7 | >260 | 479 | 5.006 |
| 04–34 | 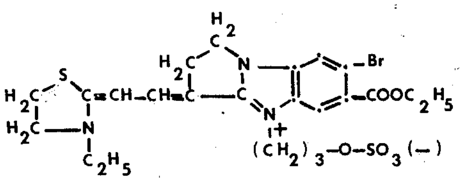 | 1A11–Q8 | >260 | 479 | 4.986 |
| 04–35 | 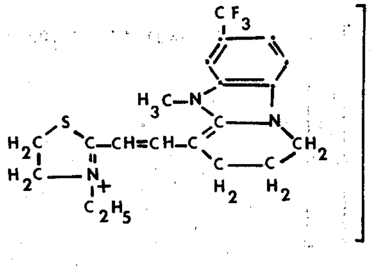 I⁻ | 1A18–Q1 | 256 | 466 | 5.014 |

Table M—Continued
| Number of reference of the methine dye | Structural formula | Number of reference of the quaternary salt | Melting point °C | Absorption max. mu | log ε |
|---|---|---|---|---|---|
| 04-36 | 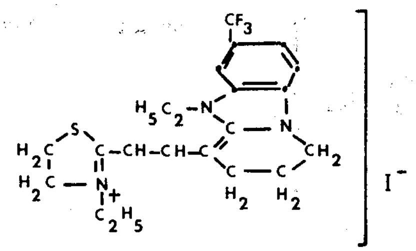 | 1A18 -Q2 | 260 | 467 | 5.04 |
| 04-37 | 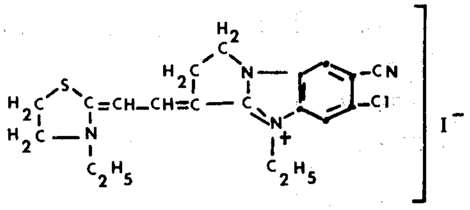 | 2A01 -Q2 | >260 | 478 | 5.13 |
| 06-01 | 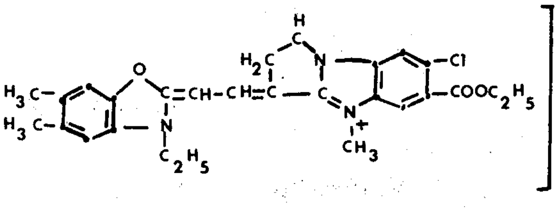 | 1A08-Q1 | >310 | 490 | 5.22 |
| 06-02 | 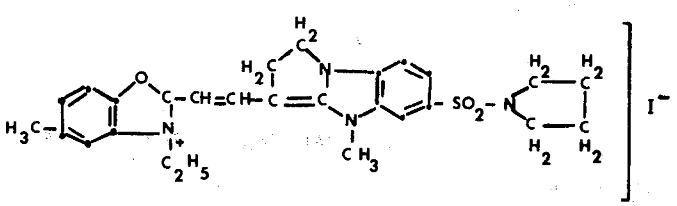 | 1A09-Q1 | 295 | 486 | 5.205 |
| 06-03 | 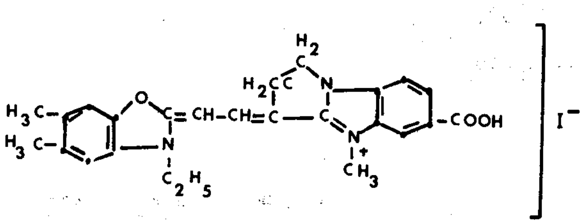 | 3A01-Q1 | >270 | 486 | 5.194 |
| 06-04 | 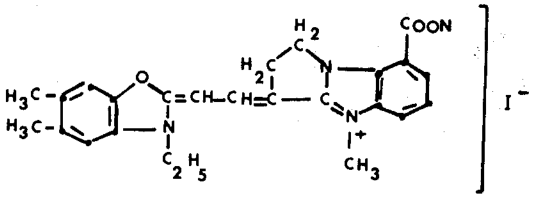 | 3A02-Q1 | >270 | 492 | 5.153 |
| 06-05 | 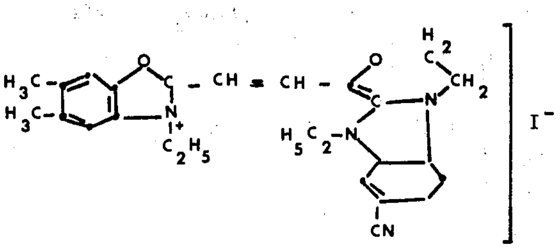 | 1A21-Q2 | 302 4 | 520 | 5.158 |

Table M – Continued
| Number of reference of the methine dye | Structural formula | Number of reference of the quaternary salt | Melting point °C | Absorption max. mu | log ε |
|---|---|---|---|---|---|
| 06-06 | 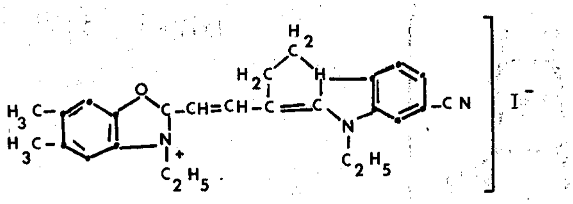 | 5A01-Q2 | 285 | 496 | 5.218 |
| 06-07 | 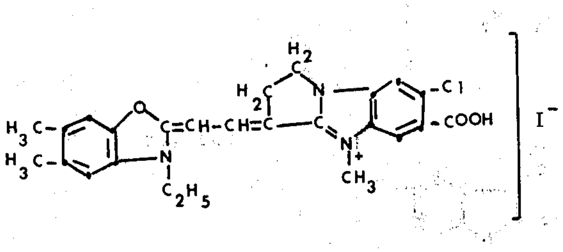 | 3A03-Q1 | >270 | 492 | 5.273 |
| 07-01 | 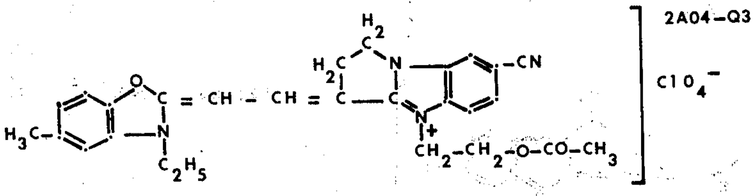 | 2A04-Q3 | 220 | 492 | 5.12 |
| 08-01 | 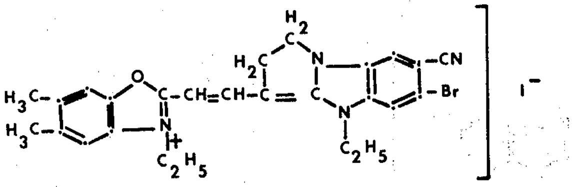 | 2A01-Q2 | >260 | 498 | 5.281 |
| 08-02 | 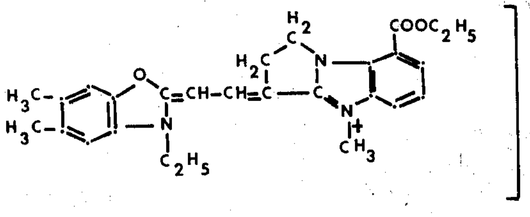 | A07-Q1 | >270 | 492 | 5.125 |
| 08-03 | 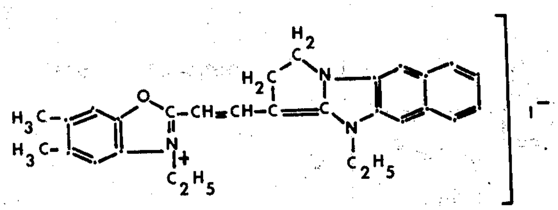 | 0A02-Q2 | > 250 | 498 | 5.37 |
| 08-04 | 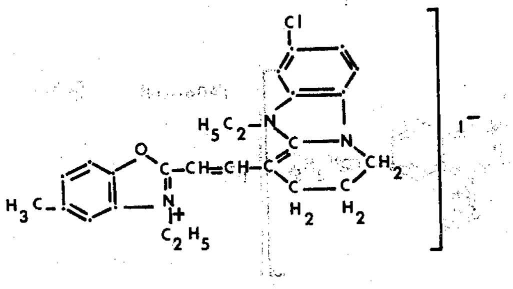 | 1A12-Q2 | > 250 | 480 | 5.10 |

Table M—Continued
| Number of reference of the methine dye | Structural formula | Number of reference of the quaternary salt | Melting point °C | Absorption max. mu | log ε |
|---|---|---|---|---|---|
| 08–05 | 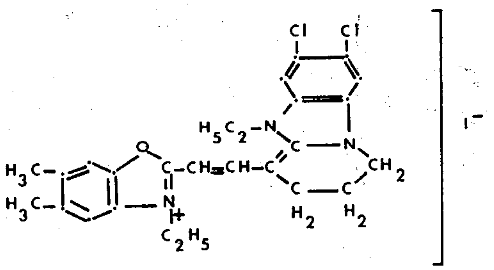 | 1A14–Q2 | >250 | 492 | 5.14 |
| 08–06 | 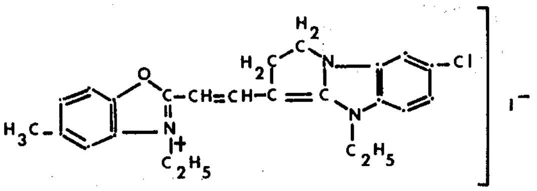 | 2A05–Q2 | > 250 | 478 | 5.18 |
| 08–07 | 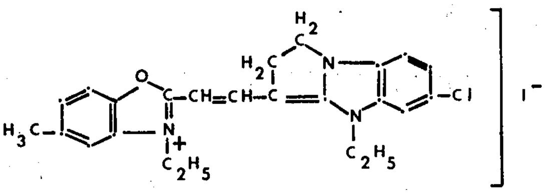 | 1A01–Q2 | >250 | 478 | – |
| 08–08 | 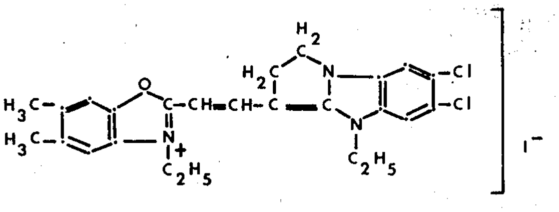 | 1A05–Q2 | > 260 | 494 | 5.163 |
| 08–09 | 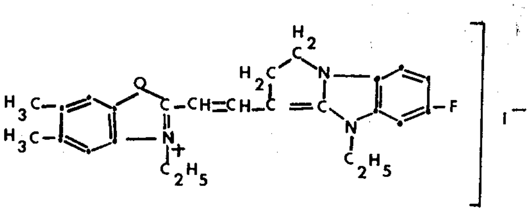 | 1A04–Q2 | >260 | 484 | 5.156 |
| 08–10 | 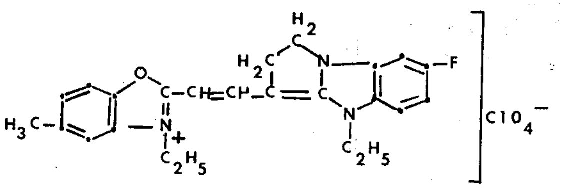 | 2A06–Q2 | >250 | 472 | 5.08 |
| 08–11 | 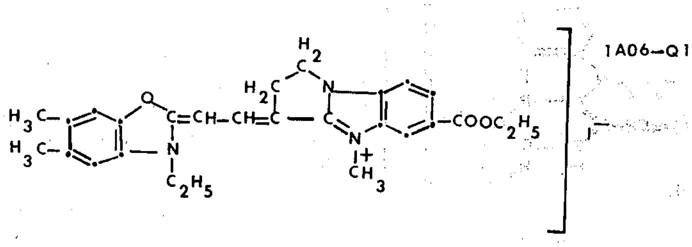 | 1A06–Q1 | >270 | 488 | 5.207 |

Table M-Continued
| Number of reference of the methine dye | Structural formula | Number of reference of the quaternary salt | Melting point °C | Absorption max. mu | log ε |
|---|---|---|---|---|---|
| 08-12 | 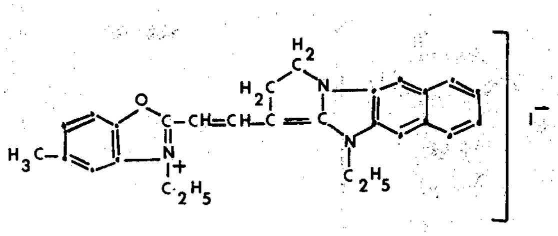 | 0A02-Q2 | >250 | 494 | 5.25 |
| 08-13 | 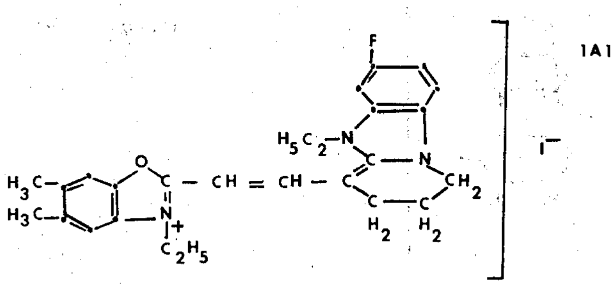 | 1A13-Q2 | >260 | 480 | 4.926 |
| 08-14 | 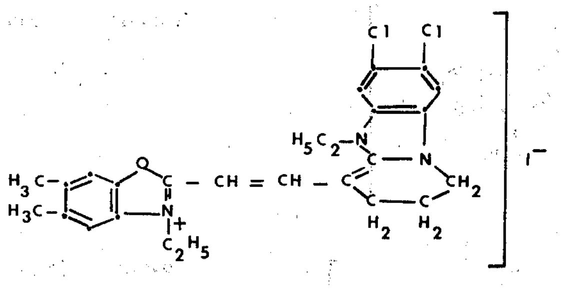 | 1A14-Q2 | >250 | 492 | 5.14 |
| 08-15 | 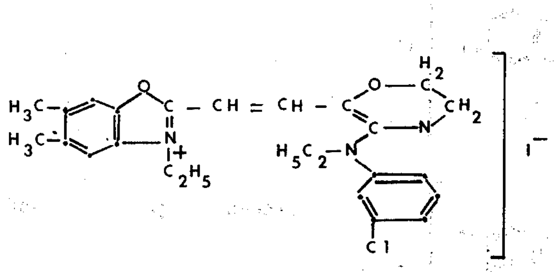 | 1A21-Q2 | >260 | 506 | 4.976 |
| 08-16 | 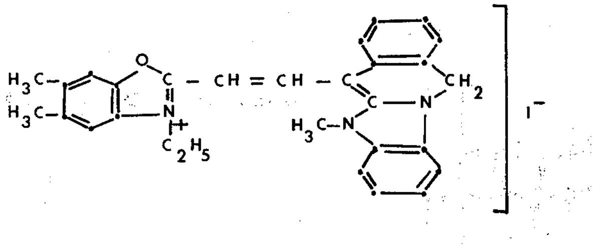 | 6A01-Q1 | 275 | 477 | 4.925 |
| 08-17 | 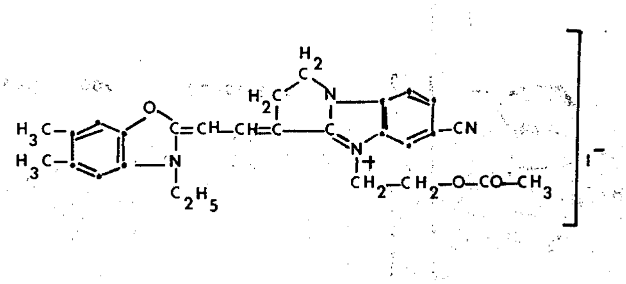 | 5A01-Q3 | >260 | 501 | 5.184 |

Table M—Continued
| Number of reference of the methine dye | Structural formula | Number of reference of the quaternary salt | Melting point °C | Absorption max. mu | log ε |
|---|---|---|---|---|---|
| 08-18 | 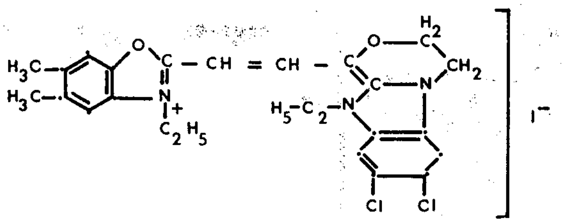 | 1A22-Q2 | >260 | 516 | 5.157 |
| 08-19 | 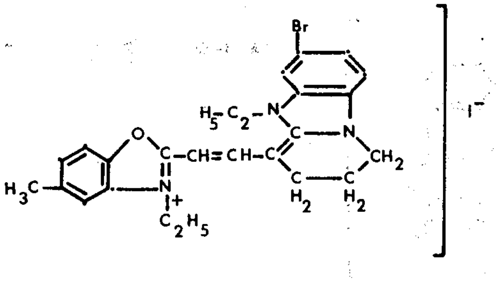 | 1A15-Q2 | >250 | 480 | – |
| 09-01 | 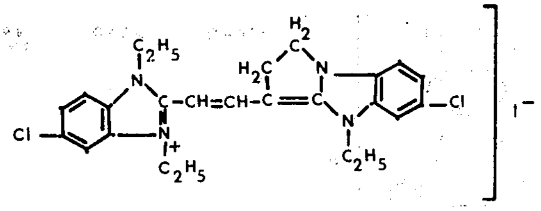 | 1A01-Q2 | 240 | 502 | 5.30 |
| 09-02 | 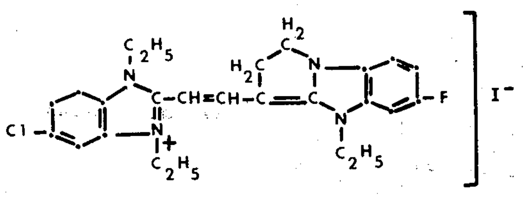 | 1A04-Q2 | >260 | 500 | 5.24 |
| 09-03 | 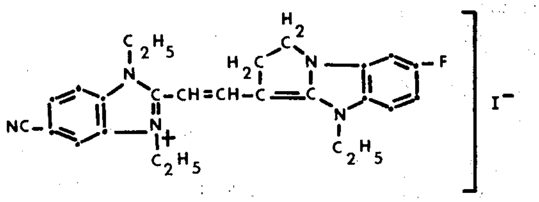 | 2A06-Q2 | >250 | 500 | 5.15 |
| 09-04 | 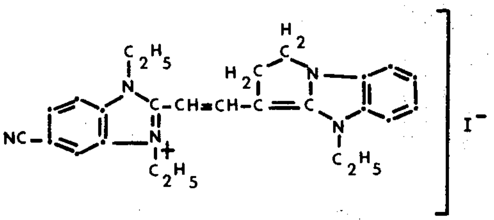 | 2A04-Q2 | >250 | 512 | 5.32 |
| 09-05 | 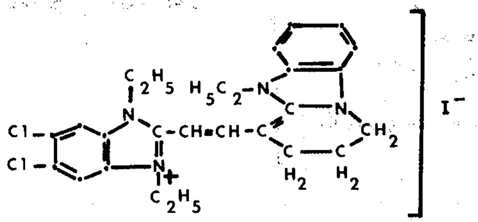 | 1A12-Q2 | 200 | 508 | 4.91 |

Table M-Continued
| Number of reference of the methine dye | Structural formula | Number of reference of the quaternary salt | Melting point °C | Absorption max. mu | log ε |
| --- | --- | --- | --- | --- | --- |
| 09-06 | 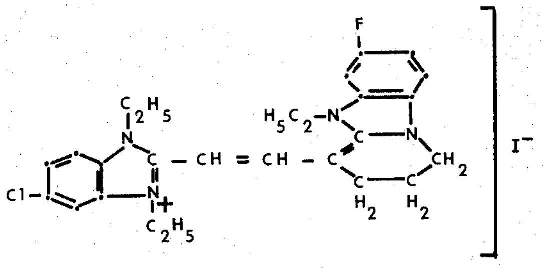 | 1A13-Q2 | 230 | 500 | – |
| 09-07 | 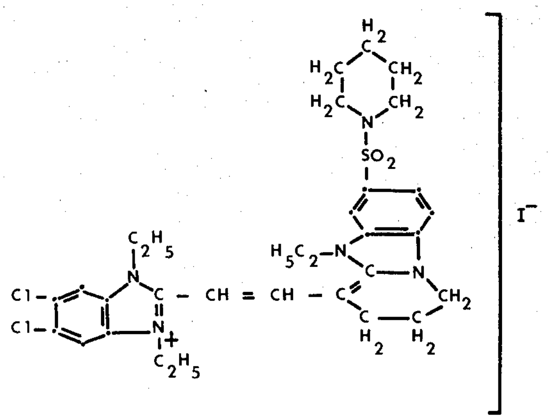 | 1A17-Q2 | 286 | 514 | 5.41 |
| 09-08 | 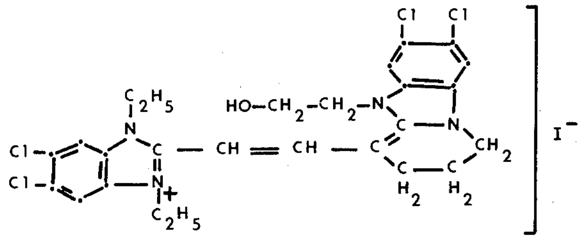 | 1A14-Q3 | >260 | 528 | 5.16 |
| 09-09 | 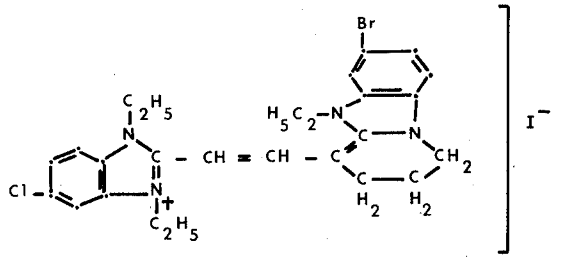 | 1A15-Q2 | >260 | 508 | 5.16 |
| 09-10 | 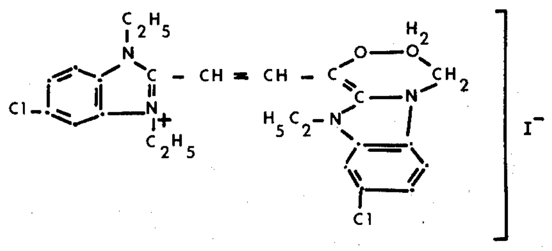 | 1A 0-Q2 | > 260 | 533 | 5.29 |

Table M—Continued
| Number of reference of the methine dye | Structural formula | Number of reference of the quaternary salt | Melting point °C | Absorption max. mu | log ε |
|---|---|---|---|---|---|
| 09-11 | 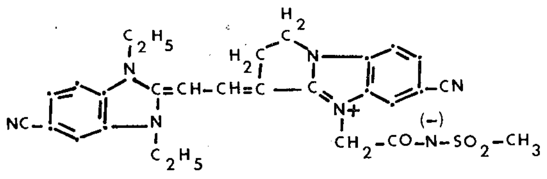 | 5A01-Q7 | >250 | 515 | 5.331 |
| 10-01 | 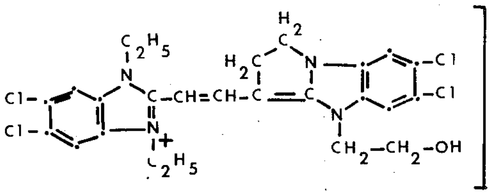 | 1A03-Q3 | 260 | 516 | 4.85 |
| 10-02 | 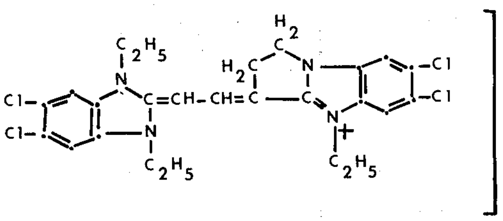 | 1A03-Q2 | >260 | 510 | 5.481 |
| 10-03 | 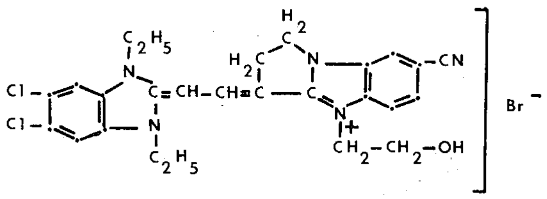 | 2A04-Q3 | >250 | 512 | 5.39 |
| 10-04 | 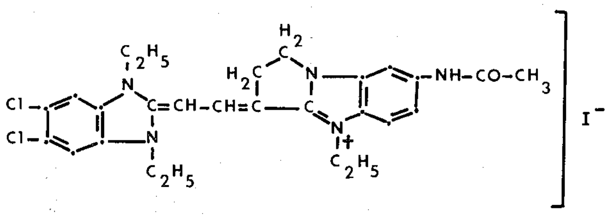 | 4A01-Q2 | 260 | 506 | – |
| 10-05 | 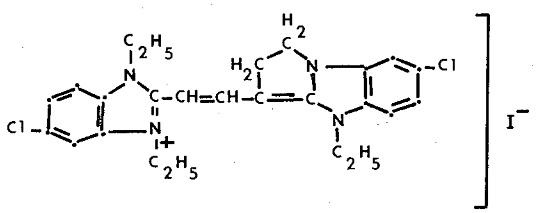 | 2A05-Q2 | >250 | 504 | 5.38 |
| 10-06 | 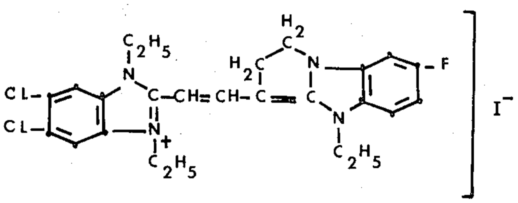 | 2A06-Q2 | >250 | 504 | 5.22 |

Table M–Continued
| Number of reference of the methine dye | Structural formula | Number of reference of the quaternary salt | Melting point °C | Absorption max. mu | log ε |
|---|---|---|---|---|---|
| 10–07 | 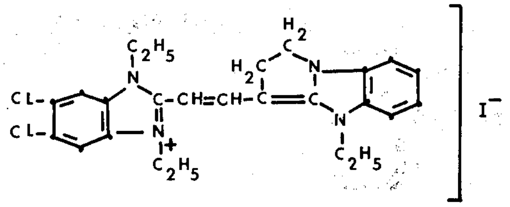 | 2A04–Q2 | > 250 | 510 | 5.35 |
| 10–08 | 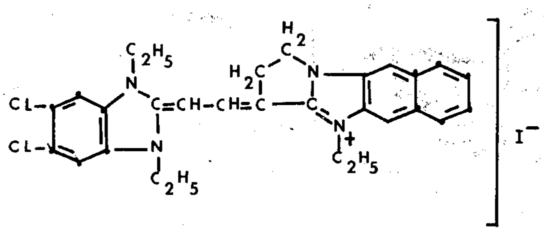 | 0A02–Q2 | > 250 | 517 | 5.43 |
| 10–09 | 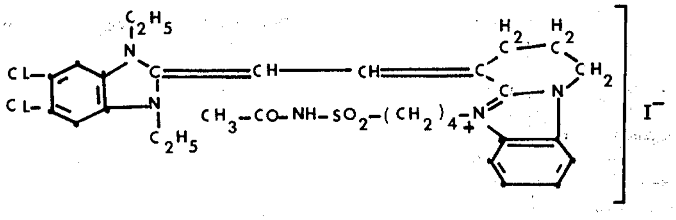 | 0A03–Q6 | >260 | 516 | 5.298 |
| 10–10 | 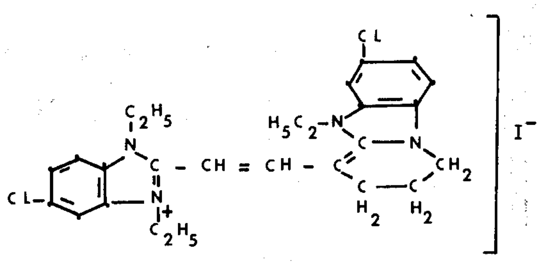 | 1A12–Q2 | >250 | 507 | 5.15 |
| 10–11 | 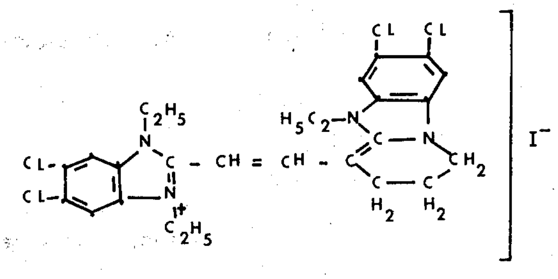 | 1A14–Q2 | > 250 | 515 | 5.37 |
| 10–12 | 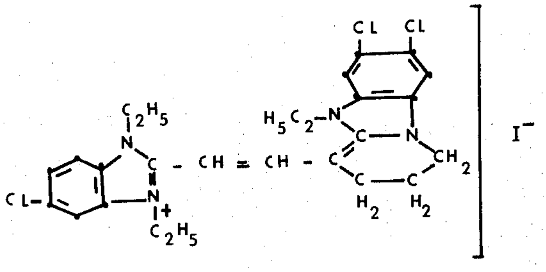 | 1A14–Q2 | > 250 | 512 | 5.30 |

Table M-Continued
| Number of reference of the methine dye | Structural formula | Number of reference of the quaternary salt | Melting point °C | Absorption max. mu | log ε |
|---|---|---|---|---|---|
| 0-13 | 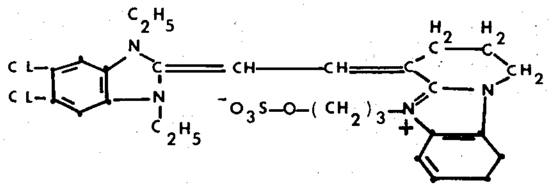 | 0 A03-Q8 | >260 | 515 | 4.937 |
| 10-14 | 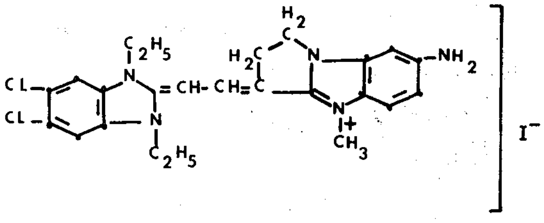 | 2A00-Q1 | - | - | - |
| 12-01 | 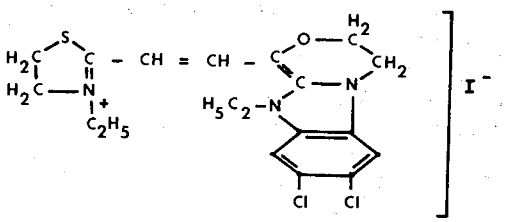 | 1A22-Q2 | >260 | 495 | 5.048 |
| 12-02 | 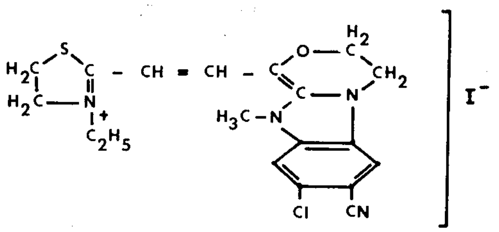 | 2A11-Q1 | >260 | 500 | 4.793 |
| 18-01 | 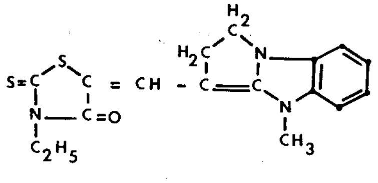 | 0A01-Q1 | 265-267 | 516-488 | 4.57-4.49 |
| 18-02 | 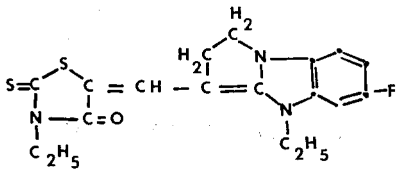 | 1A04-Q2 | 276-278 | 520 | 4.98 |
| 18-03 | 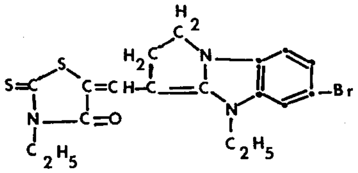 | 1A05-Q2 | 260 | 524 | 5.01 |

Table M-Continued
| Number of reference of the methine dye | Structural formula | Number of reference of the quaternary salt | Melting point °C | Absorption max. mu | log ε |
|---|---|---|---|---|---|
| 18-04 | 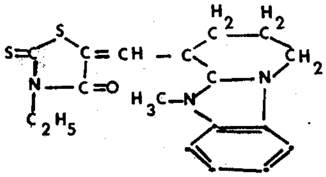 | 0A03-Q1 | 262-263 | 524 | 5.02 |
| 18-05 | 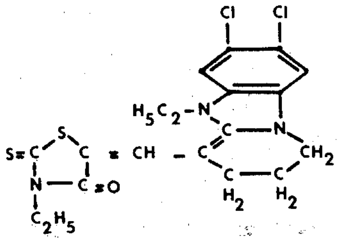 | 1A14-Q2 | 280 | 528 | 5.16 |
| 18-06 | 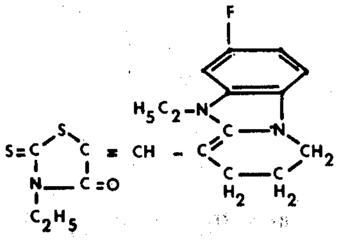 | 1A13-Q2 | 164-165 | 522 | - |
| 18-07 | 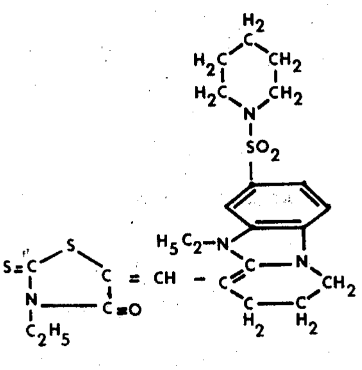 | 1A17-Q2 | 278 | 528 | 5.154 |
| 18-08 | 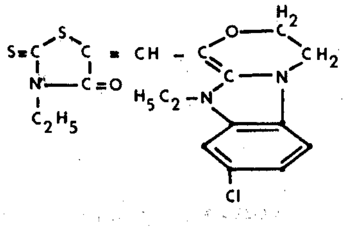 | 1A20-Q2 | 305 | 548 | 4.92 |
| 18-09 | 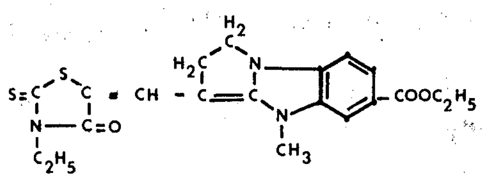 | 1A06-Q1 | > 270 | 536 | 5.231 |

Table M—Continued
| Number of reference of the methine dye | Structural formula | Number of reference of the quaternary salt | Melting point °C | Absorption max. mu | log ε |
|---|---|---|---|---|---|
| 18-10 | 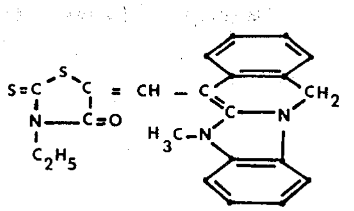 | 6A01-Q1 | 260 | 518 | 4.832 |
| 18-11 | 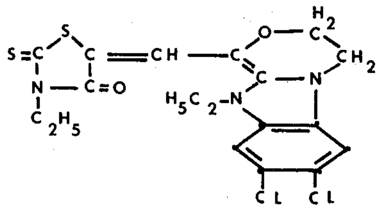 | 1A2 2-Q2 | >260 | 552 | 4.745 |
| 18-12 | 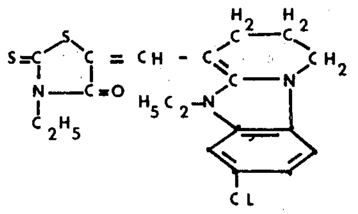 | 1A12-Q2 | 244 | 526 | 4.96 |
| 19-01 | 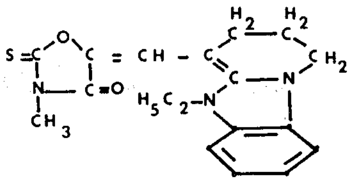 | 1A12-Q2 | 192 | 522 | - |
| 26-01 | 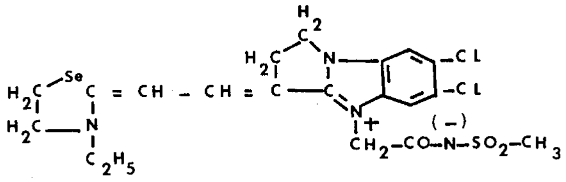 | 1A03-Q7 | >260° | 472 | - |
| 26-02 | 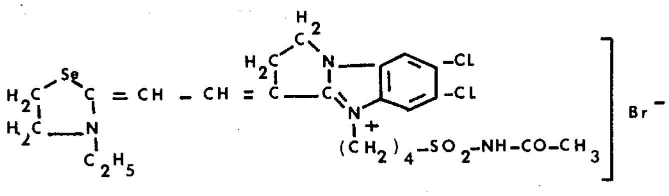 | 1A03-Q6 | 240° | 470 | - |
| 26-03 | 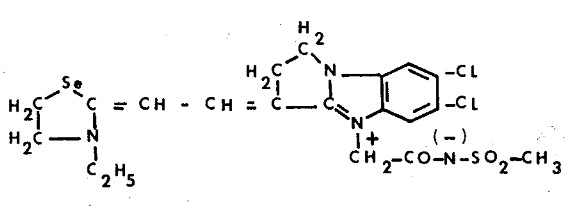 | 1AQ3-Q | > 260° | 477 | - |

As shown in the following table P, the new methine dyes according to our invention spectrally sensitize photographic silver halide emulsions when incorporated therein.

It appeared that in comparison with the known N-alkylbenzimidazole dyes the major part of the new benzimidazole dyes, containing on the benzimidazole nucleus in the 1,2-positions an adjacent N-homo- or N-heteroalkylene nucleus, possesses a more bathochromic sensitization spectrum.

Also several of the new methine dyes are better compatible with the usual colour couplers. Especially noteworthy is that in comparison with the known N-alkyl substituted methine dyestuffs the new sensitizing dyes show a second sensitization maximum. So we can find in the new class of sensitizing dyes on the one hand dyes having only one sensitization maximum and which are therefor suitable for being applied in high-contrasty emulsions and on the other hand sensitizing dyes having a second sensitization maximum which are more suitable for being applied in emulsions for continuous tone reproduction.

Although the new methine dyes are especially useful for extending the spectral sensitivity of the customarily employed silver halide emulsions, the methine dyes according to this invention possess also optical sensitizing properties for inorganic photoconductive compounds such as zinc oxide and for organic photoconductive compounds such as those described in the French Pat. Specifications Nos. 1,271,986, 1,254,348, 1,275,778, 1,261,206 and in the Belgian Pat. Specifications Nos. 594,974, 589,239, 587,794, 595,696 and 597,616 and for the organic polymeric photoconductive compounds such as those described in the French Pat. Specifications Nos. 1,249,634, 1,254,023, 1,254,024 and 1,291,570.

The new methine dyes can be incorporated in the photoconductive layer by one of the methods customarily employed in the art.

It may be noticed that the new methine dyes, although they are especially useful for extending the spectral sensitivity of the customarily employed gelatino silver chloride, gelatino silver chloro-bromide, gelatino silver bromide, gelatino silver bromo-iodide and gelatino silver chloro-bromo-iodide emulsions, photographic emulsions containing water-permeable colloids other than gelatin, such as agar-agar, zeine, collodion, water-soluble cellulose derivatives, polyvinyl alcohol or other hydrophilic synthetic or natural resins or polymeric compounds, may equally well be sensitized according to the present invention.

To prepare photographic emulsions sensitized according to the invention with one or more of the new methine dyes, the methine dyes are incorporated in the photographic emulsion by one of the methods customarily employed in the art. In practice, it is convenient to add the methine dyes to the emulsion in the form of a solution in an appropriate solvent. The new methine dyes can be incorporated at any stage of the preparation of the emulsion and should be uniformly distributed throughout the emulsion. The concentration of the dyes in the emulsion can vary widely, for example from 1 to 200 mg per kg of flowable emulsion and will vary according to the effect desired. The suitable and most economical concentration for any given emulsion will be apparent to those skilled in the art, upon making the ordinary tests and observations customarily used in the art of emulsion making.

The new methine dyes are preferably incorporated into photographic emulsions the general sensitivity of which has been increased by physical and chemical ripening. As suitable chemical sensitizers may be mentioned the well-known sulphur sensitizers such as allylisothiocyanate, allylthiourea, sodium thiosulphate, potassium selenocyanide and the natural sensitizers originating in the gelatin, reducing sensitizers such as the imino-aminomethane sulphinic acid and the derivatives thereof, cadmium salts, and the salts of noble metals such as gold, platinum and palladium.

The photographic emulsions optically sensitized according to the invention may further be supersensitized and/or hypersensitized by one of the methods known to those skilled in the art.

In preparing the photographic emulsions according to the invention, the usual and suitable addenda such as antifogging agents, stabilizers, antibronzing agents, hardeners, wetting agents, plasticizers, development accelerators, colour couplers, fluorescent brighteners and ultra-violet screening compounds can moreover be incorporated in the emulsion in the manner customarily employed in the art. In this respect it may be mentioned that the sensitivity of the silver halide emulsions sensitized according to the process of the present invention is not adversely affected but rather enhanced by the presence therein of certain fluorescent compounds. Another advantage of the process for sensitizing silver halide emulsions according to the present invention is the compatibility of the new methine dyes, with anionic wetting agents and with colour couplers, which is of great importance in the application of the new methine dye salts for sensitizing the silver halide emulsions of a light-sensitive element for colour photography.

Emulsions sensitized with the new methine dyes can be coated in the usual manner on a suitable support such as glass, cellulose derivative film, resin film or paper.

The following table will serve to illustrate further the manner of practizing the invention. The optimum amounts of sensitizing methine dyes are incorporated into different portions of photographic gelatino-silver halide emulsions prepared with varying contents and kinds of halides. The different portions of emulsions are then coated on a support and exposed in the usual manner. The measurements are made with a spectrograph and a sensitometer. For the determination of the "total" speed the exposure of the sensitized light-sensitive material is executed without filter with a normal light or an incandescent lamp. For the determination of the speed "minus blue" the exposure of the sensitized light-sensitive material is executed through a yellow filter which transmits no light of wave-lengths shorter than 510 mμ, for example a filter sold under the name "Geva 4" by Gevaert Photo-Producten N.V., Belgium. The following are several examples of such emulsions together with the speeds obtained after development of the exposed emulsions. These speed values are calculated in relation to the speed values of respectively the same, but non-sensitized emulsions.

Table P

| Reference number of the dye | weight of dye in the emulsion mg/kg | emulsion type | sensiti-zation max. mμ | speed (-blue) | total speed |
|---|---|---|---|---|---|
| 01-00 | 10 | AgCl | 640 | 510 | — |
| 02-00 | 30 | AgCl | 575 | 925 | — |
| 02-01 | 20 | AgCl | 590 | — | 420 |
| 02-02 | 30 | AgCl | 575 | 810 | — |
| 02-03 | 20 | AgCl | 590 | 725 | — |
| 03-00 | 20 | AgCl/AgBr | 520 | 550 | — |
| 04-00 | 30 | AgBr/AgI | 540 | 375 | — |
| 04-01 | 20 | AgCl/AgBr | 500 | — | 110 |
| 04-02 | 20 | AgCl/AgBr | 520 | 500 | — |
| 04-03 | 20 | AgCl/AgBr | 520 | 465 | — |
| 04-04 | 10 | AgCl/AgBr | 525 | — | 375 |
| 04-05 | 30 | AgBr/AgI | 540 | 425 | — |
| 04-06 | 30 | AgBr/AgI | 540 | 390 | — |
| 04-07 | 20 | Agcl/AgBr | 520 | — | 400 |
| 04-08 | 30 | AgCl | 540 | — | 710 |
| 04-09 | 20 | AgCl/AgBr | 490 | — | 300 |
| 04-10 | 20 | AgCl | 510 | — | 425 |
| 04-11 | 20 | AgCl | 515 | — | 400 |
| 04-12 | 20 | AgCl | 515 | — | 510 |
| 04-13 | 20 | AgCl/AgBr | 500 | — | 220 |
| 04-14 | 40 | AgCl/AgBr | 520 | — | 495 |
| 04-15 | 20 | AgCl | 505 | — | 210 |
| 04-16 | 20 | AgCl | 500 | — | 190 |
| 04-17 | 20 | AgCl/AgBr | 520 | — | 500 |
| 04-18 | 20 | AgCl/AgBr | 520 | — | 480 |
| 04-19 | 20 | AgCl/AgBr | 520 | — | 400 |
| 04-20 | 20 | AgCl | 510 | — | 190 |
| 04-21 | 20 | AgCl/AgBr | 525 | — | 610 |
| 04-22 | 20 | AgCl/AgBr | 500 | — | 200 |
| 04-23 | 20 | AgCl/AgBr | 510 | — | 325 |
| 04-24 | 10 | AgCl/AgBr | 520 | — | 310 |
| 04-25 | 10 | AgCl/AgBr | 515 | — | 290 |
| 04-26 | 20 | AgCl/AgBr | 500 | — | 220 |
| 04-27 | 20 | AgCl | 520 | 310 | — |
| 04-28 | 20 | AgCl/AgBr | 490 | — | 285 |
| 04-29 | 20 | AgCl/AgBr | 520 | 420 | — |
| 04-30 | 20 | AgCl | 505 | — | 375 |
| 04-31 | 20 | AgCl | 515 | 395 | — |
| 04-32 | 20 | AgCl | 520 | 385 | — |
| 04-33 | 30 | AgCl/AgBr | 520 | 410 | — |
| 04-34 | 30 | AgCl/AgBr | 520 | 390 | — |
| 04-35 | 30 | AgCl/AgBr | 500 | — | 410 |
| 04-36 | 30 | AgCl/AgBr | 500 | — | 420 |
| 04-37 | 20 | AgCl | 525 | — | 575 |
| 05-00 | 40 | AgCl/AgBr | 500 | — | 610 |
| 06-00 | 20 | AgCl/AgBr | 510 | — | 130 |
| 06-01 | 30 | AgCl | 540 | — | 1150 |
| 06-02 | 20 | AgCl/AgBr | 520 | — | 675 |
| 06-03 | 30 | AgCl | 520 | — | 310 |
| 06-04 | 30 | AgCl | 535 | — | 710 |
| 06-05 | 20 | AgCl/AgBr | 560 | — | 750 |
| 06-06 | 30 | AgCl/AgBr | 540 | — | 700 |
| 06-07 | 20 | AgCl | 530 | — | 520 |
| 07-00 | 30 | AgBr/AgI | 540 | 600 | — |
| 07-01 | 20 | AgCl/AgBr | 520 | — | 780 |
| 08-00 | 30 | AgCl/AgBr | 510 | — | 175 |
| 08-01 | 30 | AgCl/AgBr | 540 | — | 820 |
| 08-02 | 30 | AgCl | 540 | — | 1400 |
| 08-03 | 20 | AgCl | 545 | — | 700 |
| 08-04 | 30 | AgCl | 525 | — | 620 |
| 08-05 | 30 | AgCl | 540 | — | 825 |
| 08-06 | 20 | AgCl/AgBr | 520 | 420 | — |
| 08-07 | 20 | AgCl/AgBr | 520 | — | 415 |
| 08-08 | 30 | AgCl/AgBr | 520 | — | 710 |
| 08-09 | 30 | AgCl/AgBr | 520 | — | 810 |
| 08-10 | 20 | AgCl/AgBr | 520 | — | 510 |
| 08-11 | 30 | AgCl | 540 | — | 910 |
| 08-12 | 30 | AgCl | 540 | — | 940 |
| 08-13 | 20 | AgCl/AgBr | 520 | — | 220 |
| 08-14 | 20 | AgCl/AgBr | 545 | — | 420 |
| 08-15 | 20 | AgCl/AgBr | 520 | — | 490 |
| 08-16 | 30 | AgCl | 540 | — | 910 |
| 08-17 | 20 | AgCl | 555 | — | 730 |
| 08-18 | 20 | AgCl/AgBr | 580 | — | 250 |
| 09-00 | 20 | AgCl | 560 | 3100 | — |
| 09-01 | 30 | AgCl/AgBr | 580 | 1600 | — |
| 09-02 | 20 | AgCl | 535 | — | 740 |
| 09-03 | 30 | AgCl | 540 | 2450 | — |
| 09-04 | 30 | AgCl | 560 | 1250 | — |
| 09-05 | 20 | AgCl | 570 | 1350 | — |
| 09-06 | 20 | AgCl | 570 | 2450 | — |
| 09-07 | 20 | Agcl | 580 | 2600 | — |
| 09-08 | 20 | AgCl | 614 | 3000 | — |
| 09-09 | 20 | AgCl | 580 | 3100 | — |
| 09-10 | 20 | AgCl | 615 | 2900 | — |
| 09-11 | 30 | AgCl | 560 | 1400 | — |

Table P-continued

| Reference number of the dye | weight of dye in the emulsion mg/kg | emulsion type | sensiti-zation max. mμ | speed (-blue) | total speed |
|---|---|---|---|---|---|
| 10-00 | 20 | AgCl | 575 | 3200 | — |
| 10-01 | 30 | AgCl | 580 | — | 900 |
| 10-02 | 20 | AgCl | 580 | 1600 | — |
| 10-03 | 20 | AgCl | 560 | 1925 | — |
| 10-04 | 20 | AgCl | 540 | — | 450 |
| 10-05 | 20 | AgCl | 570–580 | — | 600 |
| 10-06 | 20 | AgCl | 570 | 3060 | — |
| 10-07 | 20 | AgCl | 600 | 3150 | — |
| 10-08 | 20 | AgCl | 595 | — | 1600 |
| 10-09 | 20 | AgCl | 590 | — | 1800 |
| 10-10 | 20 | AgCl | 540(575) | 3225 | — |
| 10-11 | 20 | AgCl | 580 | 3175 | — |
| 10-12 | 20 | AgCl | 580 | 3150 | — |
| 10-13 | 20 | AgCl | 580 | 1750 | — |
| 10-14 | 20 | AgCl | 580 | — | 410 |
| 11-00 | 30 | AgBr/AgI | 560 | — | 675 |
| 12-00 | 20 | AgCl/AgBr | 520 | — | 625 |
| 12-01 | 20 | AgCl/AgBr | 540 | — | 510 |
| 12-02 | 30 | AgCl/AgBr | 550 | — | 425 |
| 13-00 | 20 | AgCl/AgBr | 520 | — | 525 |
| 14-00 | 30 | AgBr/AgI | 555 | — | 820 |
| 15-00 | 30 | AgCl/AgBr | 555 | — | 725 |
| 16-00 | 20 | AgCl | 570 | — | 820 |
| 17-00 | 30 | AgCl/AgBr | 575 | — | 415 |
| 18-00 | 30 | AgCl | 590 | — | 1050 |
| 18-01 | 30 | AgCl | 570 | 120 | — |
| 18-02 | 30 | AgCl | 570 | — | 850 |
| 18-03 | 30 | AgCl | 575 | 310 | — |
| 18-04 | 30 | AgCl | 570 | — | 1550 |
| 18-05 | 20 | AgCl | 575 | — | 920 |
| 18-06 | 20 | AgCl | 580 | — | 1275 |
| 18-07 | 30 | AgCl | 580 | — | 1180 |
| 18-08 | 30 | AgCl | 600 | — | 845 |
| 18-09 | 30 | AgCl | 590 | — | 1120 |
| 18-10 | 30 | AgCl | 570 | — | 1050 |
| 18-11 | 30 | AgCl | 605 | — | 825 |
| 18-12 | 20 | AgCl | 580 | — | 710 |
| 19-00 | 30 | AgCl | 550 | 250 | — |
| 19-01 | 20 | AgCl | 575 | — | 710 |
| 21-00 | 30 | AgCl/AgBr | 650 | — | 1450 |
| 22-00 | 30 | AgCl/AgBr | 640 | — | 1050 |
| 23-00 | 20 | AgCl/AgBr | 670 | — | 825 |
| 24-00 | 20 | AgCl | 645 | — | 720 |
| 25-00 | 100 | AgCl | 430–485 | — | 590 |
| 26-00 | 20 | AgCl/AgBr | 525 | — | 575 |
| 26-01 | 20 | AgCl/AgBr | 560 | — | 645 |
| 26-02 | 20 | AgCl/AgBr | 520 | — | 590 |
| 26-03 | 20 | AgCl/AgBr | 525 | — | 610 |

What we claim is:

1. A compound of the formula:

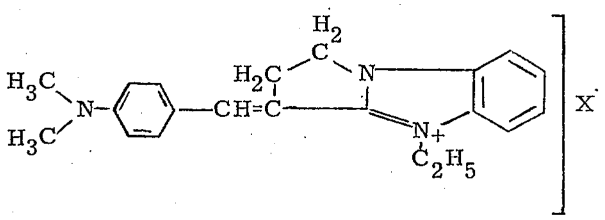

wherein X represents an anion.

2. A sensitizing dye for photographic silver halide emulsions selected from the class consisting of merocyanine and styryl dyes, said dyes derived from 1,2-alkylene benzimidazole or 1,2-alkylene naphthimidazole in which the alkylene group contains from 3 to 4 carbon atoms in the chain connecting the nitrogen atom in the 1-position and the carbon atom in the 2-position of the imidazole ring.

3. A compound of the formula:

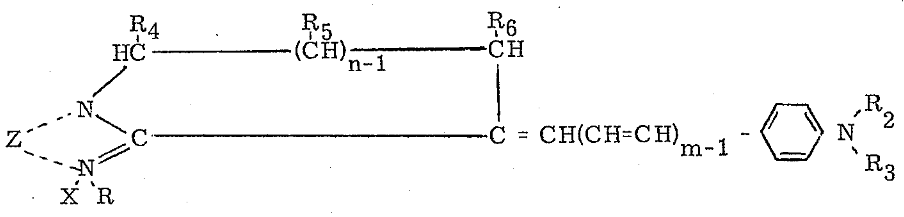

wherein:

Z represents the non-metallic atoms necessary to complete a heterocyclic nucleus selected from the group consisting of benzimidazole and naphthimidazole;

*n* represents an integer of from 1 to 2;

*m* represents an integer from 1 to 2;

R represents a member selected from the class consisting of lower alkyl, a hydroxy-lower alkyl, an acetoxy-lower alkyl, a sulpho-lower alkyl, and a carboxy-lower alkyl;

$R_4$, $R_5$, and $R_6$ each represents a hydrogen atom, lower alkyl or phenyl

X represents an acid radical, and $R_2$ and $R_3$ each represents a member selected from the group consisting of hydrogen, lower alkyl, and phenyl.

4. A compound of the formula

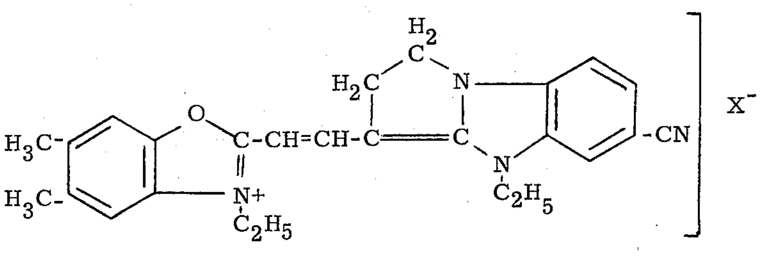

wherein X represents an anion.

5. A compound of the formula

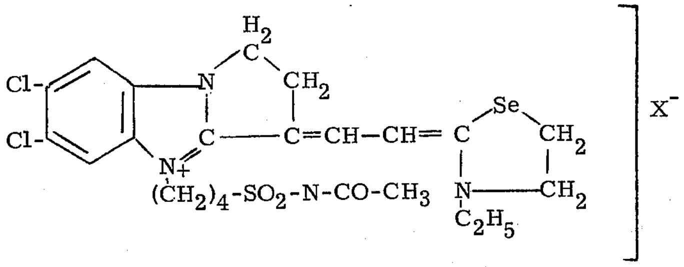

wherein X represents an anion.

6. A compound of the formula

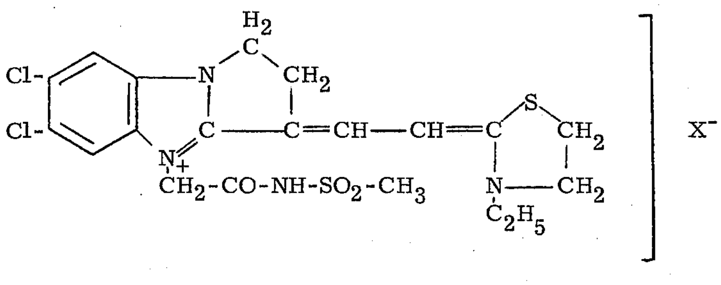

wherein X represents an anion.

7. A compound of the formula

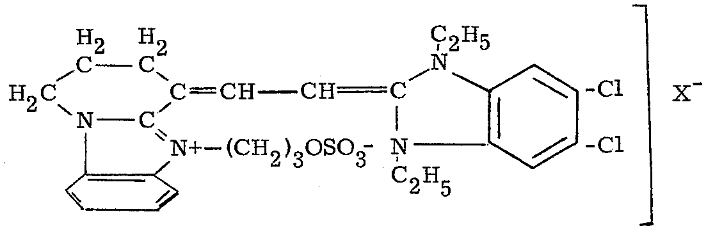

wherein X represents an anion.

* * * * *